US012800971B2

(12) United States Patent
Yoshida et al.

(10) Patent No.: US 12,800,971 B2
(45) Date of Patent: *Nov. 17, 2026

(54) OPTICALLY ANISOTROPIC LAYER

(71) Applicant: FUJIFILM Corporation, Tokyo (JP)

(72) Inventors: Shinpei Yoshida, Kanagawa (JP); Yuta Takahashi, Kanagawa (JP); Kentaro Yamura, Kanagawa (JP); Keisuke Kodama, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 176 days.

This patent is subject to a terminal disclaimer.

(21) Appl. No.: 18/828,773

(22) Filed: Sep. 9, 2024

(65) Prior Publication Data

US 2024/0427208 A1 Dec. 26, 2024

Related U.S. Application Data

(63) Continuation of application No. 18/162,379, filed on Jan. 31, 2023, now Pat. No. 12,124,144, which is a (Continued)

(30) Foreign Application Priority Data

Aug. 4, 2020 (JP) ................................ 2020-132280

(51) Int. Cl.

*G02F 1/137* (2006.01)
*G02F 1/1333* (2006.01)

(Continued)

(52) U.S. Cl.

CPC ........ *G02F 1/137* (2013.01); *G02F 1/133362* (2013.01); *G02F 1/133636* (2013.01); *G02F 1/133738* (2021.01); *G02F 1/133742* (2021.01)

(58) Field of Classification Search

CPC .............. G02F 1/137; G02F 1/133362; G02F 1/133636; G02F 1/133738;

(Continued)

(56) References Cited

U.S. PATENT DOCUMENTS

2010/0059709 A1 3/2010 Bachels et al.
2012/0038860 A1* 2/2012 Kim ................. G02F 1/134363 349/99

(Continued)

FOREIGN PATENT DOCUMENTS

CN 106575010 A 4/2017
CN 108431651 A 8/2018

(Continued)

OTHER PUBLICATIONS

Office Action, which was issued by the Korean Intellectual Property Office on Oct. 30, 2025, in connection with Korean Patent Application No. 10-2023-7003275.

(Continued)

*Primary Examiner* — Mariam Qureshi

(74) *Attorney, Agent, or Firm* — Edwards Neils LLC; Jean C. Edwards, Esq.

(57) ABSTRACT

An optically anisotropic layer formed of a liquid crystal compound, having first and second layers in direct contact with different alignment states, the first layer is formed by fixing an alignment state of the liquid crystal compound in homogeneous alignment, and the second layer in homeotropic alignment, and the optically anisotropic layer satisfies a relationship of Expression (2A) Xmax/Xmin<1.10 when a region within a square having a largest size that can be drawn on a surface of the optically anisotropic layer is subdivided into 64 square-shaped sub-regions having the same area, a thickness d1 of the first layer and a thickness d2 of the second layer at a center position of the sub-region (Continued)

are obtained, X=d1/(d1+d2) Expression (1) for each sub-region is calculated, and among the calculated 64 X's, are a maximum value Xmax and a minimum value Xmin.

8 Claims, 12 Drawing Sheets

Related U.S. Application Data continuation of application No. PCT/JP2021/027756, filed on Jul. 27, 2021.

(51) Int. Cl.
*G02F 1/13363* (2006.01)
*G02F 1/1337* (2006.01)

(58) Field of Classification Search
CPC ........... G02F 1/133543; G02F 1/13363; G02F 1/1337; G02F 1/1347; G02F 1/13471; G02B 1/11; G02B 5/3083; G02B 5/3016; C09K 19/02; H10K 50/858; H10K 50/868
See application file for complete search history.

(56) References Cited

U.S. PATENT DOCUMENTS

| | | | | |
|---|---|---|---|---|
| 2012/0169960 | A1* | 7/2012 | Kuo | G02B 5/3016 349/96 |
| 2014/0284583 | A1 | 9/2014 | Saitoh et al. | |
| 2016/0377906 | A1* | 12/2016 | Feuillade | G02F 1/133711 349/194 |
| 2017/0153370 | A1 | 6/2017 | Maruyama | |
| 2018/0370184 | A1 | 12/2018 | Ito et al. | |
| 2020/0012147 | A1 | 1/2020 | Osato et al. | |

FOREIGN PATENT DOCUMENTS

| | | | |
|---|---|---|---|
| CN | 109477926 | A | 3/2019 |
| JP | 2004-258623 | A | 9/2004 |
| JP | 2006-078617 | A | 3/2006 |
| JP | 2015-161714 | A | 9/2015 |
| JP | 5960743 | A | 8/2016 |
| JP | 2016-539374 | A | 12/2016 |
| WO | 2016/017728 | A1 | 2/2016 |
| WO | 2020/066910 | A1 | 4/2020 |

OTHER PUBLICATIONS

International Search Report issued in PCT/JP2021/027756 on Oct. 12, 2021.
Written Opinion issued in PCT/JP2021/027756 on Oct. 12, 2021.
International Preliminary Report on Patentability completed by WIPO on Feb. 7, 2023 in connection with International Patent Application No. PCT/JP2021/027756.
Non-Final Office Action issued by the U.S. Patent and Trademark Office on Sep. 26, 2023, in connection with U.S. Appl. No. 18/162,379.
Office Action issued by the Japanese Patent Office on Dec. 5, 2023, in connection with Japanese Patent Application No. 2022-541457.
Office Action issued by the Japanese Patent Office on Mar. 19, 2024, in connection with Japanese Patent Application No. 2022-541457.
Final Office Action issued by the U.S. Patent and Trademark Office on Mar. 20, 2024, in connection with U.S. Appl. No. 18/162,379.
Office Action, issued by the Korean Intellectual Property Office on Jan. 31, 2025, in connection with Korean Patent Application No. 10-2023-7003275.
Office Action, issued by the State Intellectual Property Office of China on Jul. 15, 2025, in connection with Chinese Patent Application No. 202180057997.2.

* cited by examiner

OPTICALLY ANISOTROPIC LAYER

CROSS-REFERENCE TO RELATED APPLICATIONS

The present application is a Continuation of U.S. application Ser. No. 18/162,379, filed Jan. 31, 2023, which is a Continuation of PCT International Application No. PCT/JP2021/027756 filed on Jul. 27, 2021, which was published under PCT Article 21 (2) in Japanese, and which claims priority under 35 U.S.C. § 119(a) to Japanese Patent Application No. 2020-132280 filed on Aug. 4, 2020. Each of the above applications is hereby expressly incorporated by reference, in their entirety, into the present application.

BACKGROUND OF THE INVENTION

1. Field of the Invention

The present invention relates to an optically anisotropic layer.

2. Description of the Related Art

A retardation layer having refractive index anisotropy (optically anisotropic layer) is applied to various applications such as an antireflection film of a display device and an optical compensation film of a liquid crystal display device.

A laminated type optically anisotropic layer consisting of a plurality of layers as described in JP5960743B is disclosed as the optically anisotropic layer.

SUMMARY OF THE INVENTION

As a result of studying the properties of a laminated type optically anisotropic layer of the related art, the present inventors have found that in-plane optical unevenness occurs in the optically anisotropic layer. An optically anisotropic layer having such in-plane optical unevenness causes various problems in a case of application thereof to various uses.

For example, in a case where an optically anisotropic layer having in-plane optical unevenness and functioning as a λ/4 plate is applied to an antireflection circularly polarizing plate of an organic electroluminescent (EL) display device, tint unevenness of the organic EL display device is visually recognized. In addition, in a case of an optically anisotropic layer formed by fixing a cholesteric liquid crystalline phase and having in-plane optical unevenness, in-plane unevenness of reflected tint is visually recognized.

The present invention has been made in view of the above circumstances, and an object of the present invention is to provide an optically anisotropic layer having two layers in which alignment states of a liquid crystal compound are different in a thickness direction and exhibiting suppression of in-plane optical unevenness.

As a result of extensive studies on the problems of the related art, the present inventors have found that the foregoing object can be achieved by the following configurations.

(1) An optically anisotropic layer formed of a liquid crystal compound, in which the optically anisotropic layer has a first layer and a second layer in direct contact with the first layer along a thickness direction, an alignment state of the liquid crystal compound in the first layer is different from an alignment state of the liquid crystal compound in the second layer, and the optically anisotropic layer satisfies a relationship of Expression (2A) in a case where a region within a square having a largest size that can be drawn on a surface of the optically anisotropic layer is subdivided into 64 square-shaped sub-regions having the same area, a thickness d1 of the first layer and a thickness d2 of the second layer at a center position of the sub-region are obtained, X represented by Expression (1) for each sub-region is calculated, and among the calculated 64 X's, a maximum value is defined as Xmax and a minimum value is defined as Xmin.

$$X=d1/(d1+d2) \quad \text{Expression (1)}$$

$$Xmax/Xmin<1.10 \quad \text{Expression (2A)}$$

(2) The optically anisotropic layer according to (1), in which the optically anisotropic layer satisfies a relationship of Expression (2B).

$$Xmax/Xmin<1.09 \quad \text{Expression (2B)}$$

(3) The optically anisotropic layer according to (1) or (2), in which the first layer is a layer formed by fixing an alignment state of a liquid crystal compound homogeneously aligned, and the second layer is a layer formed by fixing an alignment state of a liquid crystal compound twist-aligned along a helical axis extending along a thickness direction.

(4) The optically anisotropic layer according to (1) or (2), in which the first layer and the second layer are layers formed by fixing an alignment state of a liquid crystal compound twist-aligned along a helical axis extending along a thickness direction, and a twisted angle of the liquid crystal compound in the first layer is different from a twisted angle of the liquid crystal compound in the second layer.

(5) The optically anisotropic layer according to (1) or (2), in which the first layer and the second layer are optically anisotropic layers formed by fixing a cholesteric liquid crystalline phase, and a helical pitch of the cholesteric liquid crystalline phase in the first layer is different from a helical pitch of the cholesteric liquid crystalline phase in the second layer.

(6) The optically anisotropic layer according to (1) or (2), in which the first layer and the second layer are optically anisotropic layers formed by fixing an alignment state in which the liquid crystal compound is aligned, and a tilt angle of an alignment direction of the liquid crystal compound with respect to a layer surface in the first layer is different from a tilt angle of an alignment direction of the liquid crystal compound with respect to a layer surface in the second layer.

(7) The optically anisotropic layer according to (1) or (2), in which the first layer is a layer formed by fixing an alignment state of the liquid crystal compound homogeneously aligned, and the second layer is a layer formed by fixing an alignment state of the liquid crystal compound homeotropically aligned.

(8) The optically anisotropic layer according to (1) or (2), in which the first layer is a layer formed by fixing an alignment state in which the liquid crystal compound is aligned, and the second layer is a layer formed by fixing a state in which the liquid crystal compound exhibits an isotropic phase.

According to an aspect of the present invention, it is possible to provide an optically anisotropic layer having two layers in which alignment states of a liquid crystal compound are different in a thickness direction and exhibiting suppression of in-plane optical unevenness.

DESCRIPTION OF THE PREFERRED EMBODIMENTS

Figure 1:
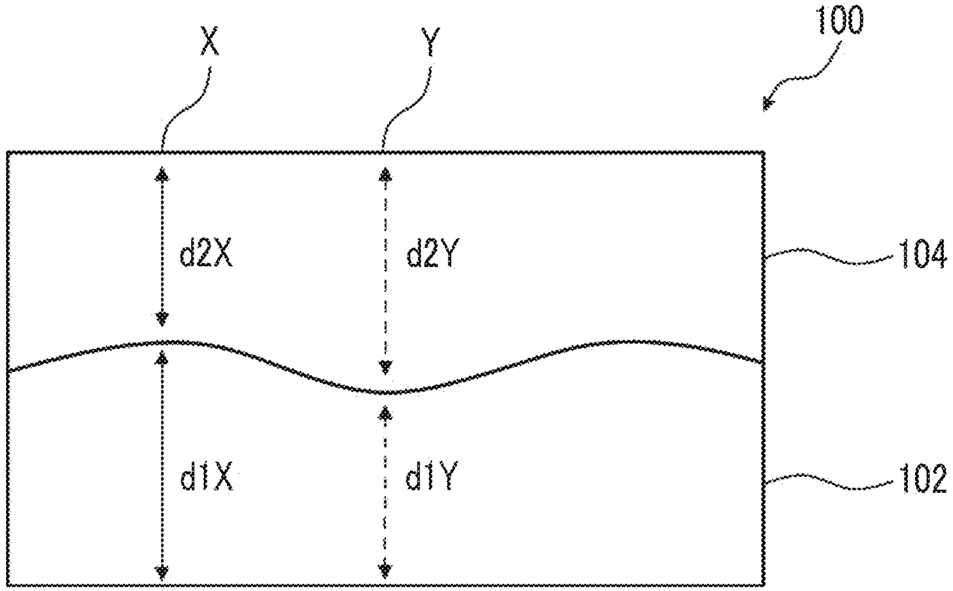
FIG. 1 is a cross-sectional view showing an example of a conventional laminated type optically anisotropic layer.

Hereinafter, the present invention will be described in more detail. Any numerical range expressed using "to" in the present specification refers to a range including the numerical values before and after the "to" as a lower limit value and an upper limit value, respectively. First, the terms used in the present specification will be described. A slow axis is defined at 550 nm unless otherwise specified.

In the present invention, Re(λ) and Rth(λ) represent an in-plane retardation at a wavelength λ and a thickness direction retardation at a wavelength λ, respectively. The wavelength λ is 550 nm unless otherwise specified.

In the present invention, Re(λ) and Rth(λ) are values measured at a wavelength of λ in AxoScan (manufactured by Axometrics, Inc.). By inputting an average refractive index ((nx+ny+nz)/3) and a film thickness (d(μm)) in AxoScan, slow axis direction (°)

$$Re(\lambda)=R0(\lambda)$$

$$Rth(\lambda)=((nx+ny)/2-nz)\times d$$

are calculated.

Although R0(λ) is displayed as a numerical value calculated by AxoScan, R0(λ) means Re(λ).

In the present specification, the refractive indexes nx, ny, and nz are measured using an Abbe refractometer (NAR-4T, manufactured by Atago Co., Ltd.) and using a sodium lamp (λ=589 nm) as a light source. In addition, in a case of measuring the wavelength dependence, it can be measured with a multi-wavelength Abbe refractometer DR-M2 (manufactured by Atago Co., Ltd.) in combination with a dichroic filter.

In addition, the values in Polymer Handbook (John Wiley & Sons, Inc.) and catalogs of various optical films can be used. The values of the average refractive index of main optical films are illustrated below: cellulose acylate (1.48), cycloolefin polymer (1.52), polycarbonate (1.59), polymethylmethacrylate (1.49), and polystyrene (1.59).

The term "light" in the present specification means an actinic ray or radiation, for example, an emission line spectrum of a mercury lamp, a far ultraviolet ray typified by an excimer laser, an extreme ultraviolet ray (EUV light), an X-ray, an ultraviolet ray, or an electron beam (EB). Above all, an ultraviolet ray is preferable.

The term "visible light" in the present specification refers to light in a wavelength range of 380 to 780 nm. In addition, the measurement wavelength in the present specification is 550 nm unless otherwise specified.

In the present specification, in a case where the liquid crystal compound is twist-aligned in the optically anisotropic layer, the twisted angle is preferably more than 0° and less than 360°. The cholesteric liquid crystalline phase, which will be described later, is a phase having a periodic structure in which a liquid crystal compound is helically aligned, and has a twisted angle of 360° or more.

A feature point of the optically anisotropic layer according to the embodiment of the present invention is that the relationship between the thickness of the first layer which will be described later and the thickness of the second layer which will be described later in the in-plane direction of the optically anisotropic layer is controlled.

As a result of studying the related art, the present inventors have found for the first time that a variation in thickness between layers forming an optically anisotropic layer has an effect as a cause of in-plane optical unevenness in a laminated type optically anisotropic layer. More specifically, FIG. 1 shows an example of a laminated type optically anisotropic layer of the related art. In an optically anisotropic layer 100 formed by laminating a first layer 102 and a second layer 104, which is shown in FIG. 1, for example, assuming that the thickness of the first layer 102 at the X position is defined as d1X, the thickness of the second layer 104 at the X position is defined as d2X, the thickness of the first layer 102 at the Y position is defined as d1Y, and the thickness of the second layer 104 at the Y position is defined as d2Y, there is a significant difference between d1X and d1Y and between d2X and d2Y, respectively, and as a result, the optical properties at the X position are different from the optical properties at the Y position, resulting in in-plane optical unevenness. With regard to the cause of the above-mentioned large thickness variation in the related art, for example, in a case where the first layer and the second layer are formed by sequential coating and then in a case where the composition used for forming the first layer does not contain a leveling agent, unevenness is likely to occur due to the influence of the surface tension of the first layer, which is likely to result in the configuration described above. In addition, in a case of light irradiation which is carried out in a case of fixing the alignment state of the liquid crystal compound, the above-described configuration is likely to occur even in a case where the distribution of the irradiation amount is large in the irradiation range of the irradiation light. In other words, the above-described configuration is likely to occur in a case where there are regions where the irradiation amount is high and the curing is likely to proceed and regions where the irradiation amount is low and the curing is difficult to proceed in a case of light irradiation.

The present inventors have found for the first time that the above-described in-plane optical unevenness is caused by a variation in the thickness of each layer, and then have found that a desired effect can be obtained by controlling the thickness of each layer within a predetermined range.

Hereinafter, the optically anisotropic layer (laminated film) according to the embodiment of the present invention will be described in detail.

The optically anisotropic layer according to the embodiment of the present invention is a layer formed of a liquid crystal compound and exhibiting optical anisotropy. As will be described later, the optically anisotropic layer according to the embodiment of the present invention may include a layer that does not exhibit optical anisotropy. That is, the optically anisotropic layer according to the embodiment of the present invention is an optically anisotropic layer having a first layer and a second layer as described later, in which at least one of the two layers may be a layer exhibiting optical anisotropy and one of the two layers may be a layer that does not exhibit optical anisotropy.

The optically anisotropic layer according to the embodiment of the present invention may be formed of a liquid crystal compound, and is preferably a layer formed by fixing a liquid crystal compound. Specific aspects of the optically anisotropic layer include a first embodiment to a fifth embodiment which will be described later, the details of which will be described later.

The optically anisotropic layer may contain materials other than the liquid crystal compound.

Examples of other materials include other components that may be contained in a composition for forming an optically anisotropic layer, which will be described later. Details of other components will be described later.

The optically anisotropic layer has a first layer and a second layer in direct contact with the first layer along a thickness direction. More specifically, as shown in FIG. 2, an optically anisotropic layer 10 has a first layer 12 and a second layer 14.

The alignment state of the liquid crystal compound in the first layer is different from the alignment state of the liquid crystal compound in the second layer. The "alignment states of the liquid crystal compound are different from each other" may be, for example, a case where one of the first layer and the second layer is in a state in which the liquid crystal compound is not aligned (isotropic phase state), and the other of the first layer and the second layer is in a state in which the liquid crystal compound is aligned so as to form a predetermined liquid crystal phase. In addition, even in a state where both the first layer and the second layer are aligned so as to form a predetermined liquid crystal phase, it is assumed that the alignment states of the liquid crystal compound are different from each other in a case where the properties of the liquid crystal phase such as the type, the alignment direction, and the twisted angle of the liquid crystal phase are different from each other. Specific examples of the aspect in which the alignment states of the liquid crystal compound are different from each other include the first embodiment to the fifth embodiment which will be described later.

The optically anisotropic layer according to the embodiment of the present invention satisfies a relationship of Expression (2A) which will be described later. Hereinafter, the relationship of Expression (2A) will be described in detail with reference to the accompanying drawings.

Figure 2:
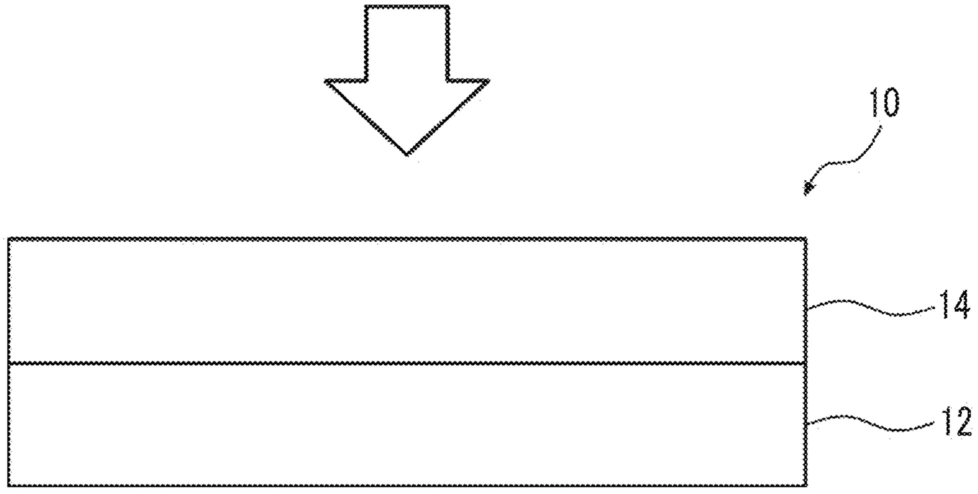
FIG. 2 is a cross-sectional view showing an example of an optically anisotropic layer of the present invention.
Figure 3:
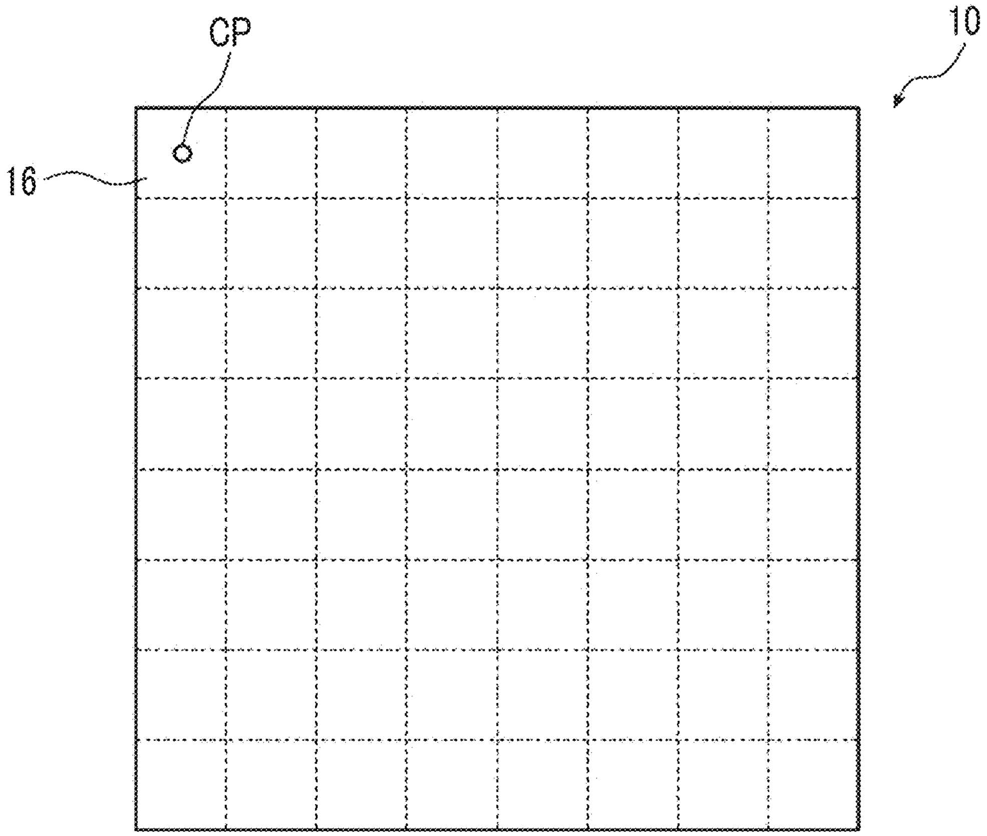
FIG. 3 is a top view of an optically anisotropic layer for explaining a relationship of Expression (2A).

FIG. 3 is a top view of the optically anisotropic layer 10, and is a drawing in which the optically anisotropic layer 10 is observed from the white arrow in FIG. 2. FIG. 3 corresponds to an aspect in which the shape of the surface of the optically anisotropic layer 10 is square. As will be described later, the shape of the surface of the optically anisotropic layer 10 is not limited to the shape shown in FIG. 3.

First, a square having a largest size that can be drawn is drawn on the surface of the optically anisotropic layer. As described above, the shape of the surface of the optically anisotropic layer 10 is square in FIG. 3, so it is possible to draw a square that occupies the entire surface of the optically anisotropic layer 10.

Next, as shown in FIG. 3, the drawn square is subdivided into 64 square-shaped sub-regions having the same area. That is, as shown in FIG. 3, a broken line is drawn so as to divide the vertical side of the drawn square (the side extending in a vertical direction in FIG. 3) into 8equal parts, and a broken line is drawn so as to divide the horizontal side of the drawn square (the side extending in a horizontal direction in FIG. 3) into 8 equal parts, so that the drawn square is subdivided into 64 square-shaped sub-regions 16 having the same area.

Next, the thickness d1 of the first layer and the thickness d2 of the second layer at the center position of each sub-region are obtained. Taking the uppermost left sub-region 16 in FIG. 3 as an example, first, a center position CP within the sub-region 16 is determined as shown in FIG. 3. The center position CP is located at the center of the square-shaped sub-region 16. More specifically, a position where two diagonal lines of the square-shaped sub-region 16 intersect is set as the center position.

Figure 4:
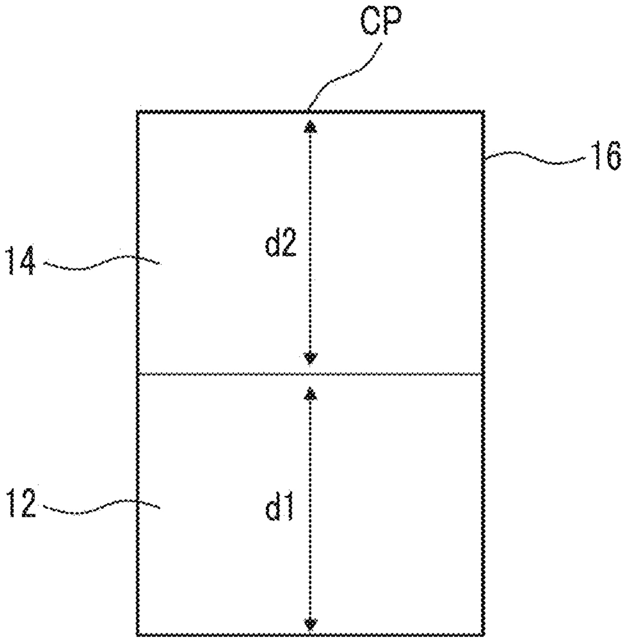
FIG. 4 is a cross-sectional view of an optically anisotropic layer in a sub-region.

Next, the thickness d1 of the first layer and the thickness d2 of the second layer at the center position CP of the sub-region 16 are obtained, as shown in FIG. 4. As a method for calculating the thickness, for example, the thickness can be calculated by cutting the optically anisotropic layer along a line passing through the center position CP and observing a cross section of the exposed optically anisotropic layer with a polarization microscope.

The above procedure is carried out for each sub-region to calculate X represented by Expression (1) for each sub-region.

$$X=d1/(d1+d2) \qquad \text{Expression (1)}$$

Next, among the calculated 64 X's (X for each of the 64 sub-regions), in a case where the maximum value is defined as Xmax and the minimum value is defined as Xmin, the optically anisotropic layer according to the embodiment of the present invention has Xmax/Xmin of less than 1.10 as shown in Expression (2A).

$$X\text{max}/X\text{min}<1.10 \qquad \text{Expression (2A)}$$

The optically anisotropic layer according to the embodiment of the present invention preferably satisfies a relationship of Expression (2B) from the viewpoint of further suppressing the in-plane optical unevenness (hereinafter, also simply referred to as "the viewpoint that the effect of the present invention is more excellent").

$$X\text{max}/X\text{min}<1.09 \qquad \text{Expression (2B)}$$

The lower limit value of Xmax/Xmin is not particularly limited, and is often more than 1.00.

In a case where Xmax and Xmin are the same value, Xmax/Xmin is 1.00.

The method for producing an optically anisotropic layer satisfying the relationship of Expression (2A) is not particularly limited, and may be, for example, a method of suppressing a variation in the irradiation amount in a range (in-plane) irradiated with light during light irradiation. Examples of the method of suppressing a variation in the irradiation amount include a method of adjusting an output of a light source to adjust the irradiation amount in the plane, and a method of adjusting the irradiation amount in the plane by disposing a filter between a light source and an object to be irradiated, in a range where the irradiation amount is large.

Above all, the difference between the maximum irradiation amount and the minimum irradiation amount in the irradiation range during light irradiation is preferably 1.0 $mJ/cm^2$ or less and more preferably 0.7 $mJ/cm^2$ or less, from the viewpoint that the effect of the present invention is more excellent. The lower limit of the difference between the maximum irradiation amount and the minimum irradiation amount is not particularly limited, and may be, for example, 0.

In addition, the ratio of the maximum irradiation amount to the minimum irradiation amount (maximum irradiation amount/minimum irradiation amount) is preferably 1.10 or less and more preferably 1.05 or less, from the viewpoint that the effect of the present invention is more excellent. The lower limit of the maximum irradiation amount/minimum irradiation amount is not particularly limited, and may be, for example, 1. That is, it is preferable that the irradiation amount is constant in the plane.

As described above, FIG. 3 shows the aspect in which the shape of the surface of the optically anisotropic layer 10 square, but the present invention is not limited to this aspect. For example, the shape of the surface of the optically anisotropic layer 10 may be rectangular, elliptical, trapezoidal, or the like, or may be amorphous.

The thickness of the optically anisotropic layer is not particularly limited and is preferably 0.05 to 10 μm, more preferably 0.1 to 8.0 μm, and still more preferably 0.2 to 6.0 μm.

The ratio of the thicknesses of the first layer to the thicknesses of the second layer (thickness of the first layer/thickness of the second layer) is not particularly limited, and is often 0.1 to 5.0 and more often 0.2 to 3.0.

As described above, the optically anisotropic layer has a first layer and a second layer in which the alignment states of the liquid crystal compound are different from each other. The aspects of the first layer and the second layer are not particularly limited, and are preferably the following first embodiment to fifth embodiment.

First embodiment: the first layer is a layer formed by fixing an alignment state of a liquid crystal compound homogeneously aligned, and the second layer is a layer formed by fixing an alignment state of a liquid crystal compound twist-aligned along a helical axis extending along a thickness direction.

Second embodiment: the first layer and the second layer are layers formed by fixing an alignment state of a liquid crystal compound twist-aligned along a helical axis extending along a thickness direction, and the twisted angle of the liquid crystal compound in the first layer is different from the twisted angle of the liquid crystal compound in the second layer.

Third embodiment: the first layer and the second layer are optically anisotropic layers formed by fixing a cholesteric liquid crystalline phase, and the helical pitch of the cholesteric liquid crystalline phase in the first layer is different from the helical pitch of the cholesteric liquid crystalline phase in the second layer.

Fourth embodiment: the first layer and the second layer are optically anisotropic layers formed by fixing an alignment state in which a liquid crystal compound is aligned, and the tilt angle of an alignment direction of the liquid crystal compound with respect to a layer surface in the first layer is different from the tilt angle of an alignment direction of the liquid crystal compound with respect to a layer surface in the second layer.

Fifth embodiment: the first layer is a layer formed by fixing an alignment state in which a liquid crystal compound is aligned, and the second layer is a layer formed by fixing a state in which the liquid crystal compound exhibits an isotropic phase.

Hereinafter, the first embodiment to the fifth embodiment will be described in detail.

In the present specification, the "fixed" state is the most typical and preferable aspect of a state in which the alignment of the liquid crystal compound is maintained. The "fixed" state is not limited thereto and is specifically more preferably a state in which, in a temperature range of usually 0° C. to 50° C. or in a temperature range of −30° C. to 70° C. under more severe conditions, the layer has no fluidity and a fixed alignment morphology can be maintained stably without causing a change in the alignment morphology due to an external field or an external force.

In the optically anisotropic layer, it is no longer necessary for the composition in the layer to finally exhibit liquid crystallinity.

First Embodiment

In the first embodiment of the optically anisotropic layer, the first layer is a layer formed by fixing an alignment state of a liquid crystal compound homogeneously aligned, and the second layer is a layer formed by fixing an alignment state of a liquid crystal compound twist-aligned along a helical axis extending along a thickness direction.

Figure 5:
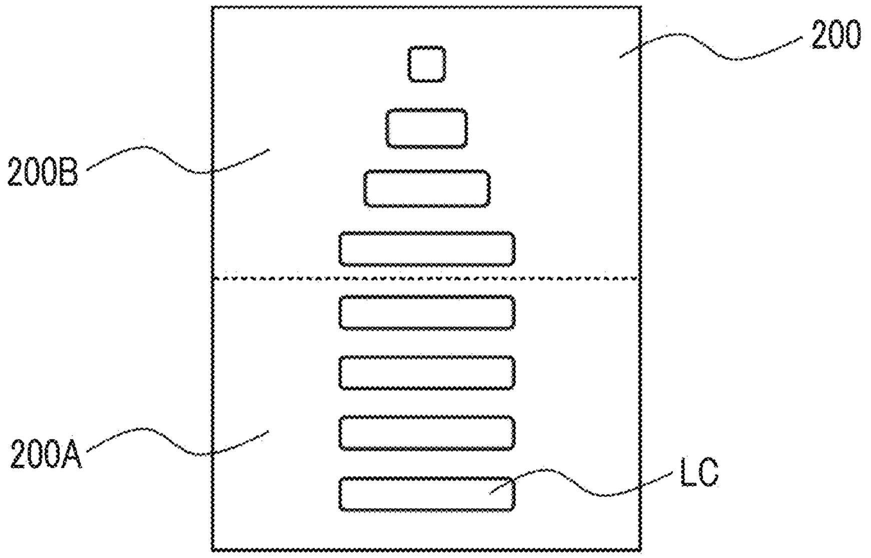
FIG. 5 is a cross-sectional view showing an example of a first embodiment of an optically anisotropic layer.

FIG. 5 shows an example of the first embodiment of the optically anisotropic layer.

An optically anisotropic layer 200 shown in FIG. 5 is an optically anisotropic layer formed of the liquid crystal compound LC and has a first layer 200A and a second layer 200B along a thickness direction. The first layer 200A is a layer formed by fixing an alignment state of a liquid crystal compound homogeneously aligned, and the second layer 200B is a layer formed by fixing an alignment state of a liquid crystal compound twist-aligned along a helical axis extending along a thickness direction.

The direction of the liquid crystal compound in the second layer 200B may be a left-handed twist (counterclockwise twist) or a right-handed twist (clockwise twist).

The homogeneous alignment in the present specification refers to a state in which a molecular axis of a liquid crystal compound (for example, a major axis in a case of a rod-like liquid crystal compound) is arranged horizontally and in the same direction with respect to the surface of the composition layer (optical uniaxiality).

Here, "horizontal" does not require that the molecular axis of the liquid crystal compound is strictly horizontal with respect to the surface of the composition layer, but is intended to mean an alignment in which the tilt angle of the average molecular axis of the liquid crystal compound in the composition layer with the surface of the composition layer is less than 20°.

In addition, the "same direction" does not require that the molecular axis of the liquid crystal compound is arranged strictly in the same direction with respect to the surface of the layer, but is intended to mean that, in a case where the direction of the slow axis is measured at any 20 positions in the plane, the maximum difference between the slow axis directions among the slow axis directions at 20 positions (the difference between the two slow axis directions having a maximum difference among the 20 slow axis directions) is less than 10°.

In a case where the thickness of the first layer of the first embodiment is defined as d1 and the refractive index anisotropy of the first layer measured at a wavelength of 550 nm is defined as Δn1, the first layer preferably satisfies Expression (1A-1) from the viewpoint that an optically anisotropic layer can be suitably applied to a circularly polarizing plate.

$$100\ \text{nm} \leq \Delta n1d1 \leq 240\ \text{nm} \qquad \text{Expression (1A-1)}$$

Above all, the first layer more preferably satisfies Expression (1A-2) and still more preferably satisfies Expression (1A-3).

$$120\ \text{nm} \leq \Delta n1d1 \leq 220\ \text{nm} \qquad \text{Expression (1A-2)}$$

$$140\ \text{nm} \leq \Delta n1d1 \leq 200\ \text{nm} \qquad \text{Expression (1A-3)}$$

In a case where the thickness of the second layer of the first embodiment is defined as d2 and the refractive index anisotropy of the second layer measured at a wavelength of 550 nm is defined as Δn2, the second layer preferably satisfies Expression (2A-1) from the viewpoint that an optically anisotropic layer can be suitably applied to a circularly polarizing plate.

$$100\ \text{nm} \leq \Delta n2d2 \leq 240\ \text{nm} \qquad \text{Expression (2A-1)}$$

Above all, the second layer more preferably satisfies Expression (2A-2) and still more preferably satisfies Expression (2A-3).

$$120\ \text{nm} \leq \Delta n2d2 \leq 220\ \text{nm} \qquad \text{Expression (2A-2)}$$

$$140\ \text{nm} \leq \Delta n2d2 \leq 200\ \text{nm} \qquad \text{Expression (2A-3)}$$

The absolute value of the twisted angle of the liquid crystal compound in the second layer is not particularly limited and is preferably 50° to 110° and more preferably 60° to 100° from the viewpoint that an optically anisotropic layer can be suitably applied to a circularly polarizing plate.

First, the twisted alignment of the liquid crystal compound is intended to mean that the liquid crystal compound from one surface (the surface on the first layer side in FIG. 5) to the other surface (the surface opposite to the first layer side in FIG. 5) of the second layer is twisted about the thickness direction of the second layer. Therefore, the twisted angle means an angle formed by the molecular axis of the liquid crystal compound on one surface of the second layer (major axis in a case of a rod-like liquid crystal compound) and the molecular axis of the liquid crystal compound on the other surface of the second layer.

The twisted angle is measured using Axoscan of Axometrics, Inc. and using device analysis software of Axometrics, Inc.

The first embodiment of the optically anisotropic layer preferably exhibits reverse wavelength dispersibility.

That is, it is preferable that Re(450), which is the in-plane retardation of the optically anisotropic layer measured at a wavelength of 450 nm, Re(550), which is the in-plane retardation of the optically anisotropic layer measured at a wavelength of 550 nm, and Re(650), which is the in-plane retardation of the optically anisotropic layer measured at a wavelength of 650 nm, have a relationship of Re(450)≤Re(550)≤Re(650).

The optical properties of the first embodiment of the optically anisotropic layer are not particularly limited, and it is preferable that the optically anisotropic layer functions as a λ/4 plate.

The λ/4 plate is a plate having a function of converting linearly polarized light having a certain specific wavelength into circularly polarized light (or converting circularly polarized light into linearly polarized light), and refers to a plate (optically anisotropic layer) in which an in-plane retardation Re(λ) at a specific wavelength λ nm satisfies Re(λ)=λ/4.

This expression may be achieved at any wavelength in a visible light range (for example, 550 nm), and the in-plane retardation Re(550) at a wavelength of 550 nm preferably satisfies a relationship of 110 nm≤Re(550)≤180 nm.

The method for producing the first embodiment of the optically anisotropic layer is not particularly limited, and is preferably a production method having the following steps 1A to 5A.

Step 1A: a step of forming a composition layer containing a chiral agent containing at least a photosensitive chiral agent whose helical twisting power changes upon irradiation with light and a liquid crystal compound having a polymerizable group Step 2A: a step of subjecting the composition layer to a heat treatment to align the liquid crystal compound in the composition layer Step 3A: a step of irradiating the composition layer with light for 50 seconds or less and at an irradiation amount of 300 mJ/cm$^2$ or less under the condition that the oxygen concentration is 1% by volume or more, after the step 2A Step 4A: a step of subjecting the composition layer to a heat treatment at a temperature higher than that upon irradiation with light, after the step 3A Step 5A: a step of subjecting the composition layer to a curing treatment to form an optically anisotropic layer, after the step 4A As will be described later, in the first embodiment, in order to produce the optically anisotropic layer having the above-described properties, the total content of the chiral agent (total content of all the chiral agents) in the composition layer is preferably 5.0% by mass or less with respect to the total mass of the liquid crystal compound.

Hereinafter, the procedure of each of the above-mentioned steps will be described in detail.

<Step 1A>

The step 1A is a step of forming a composition layer containing a chiral agent containing at least a photosensitive chiral agent whose helical twisting power changes upon irradiation with light and a liquid crystal compound having a polymerizable group. Carrying out this step leads to the formation of a composition layer to be subjected to a light irradiation treatment which will be described later.

In the following, first, the materials used in this step will be described in detail, and then the procedure of the step will be described in detail.

(Chiral Agent)

The composition layer of the step 1A contains a chiral agent containing at least a photosensitive chiral agent whose helical twisting power changes upon irradiation with light. First, the photosensitive chiral agent whose helical twisting power changes upon irradiation with light will be described in detail.

The helical twisting power (HTP) of the chiral agent is a factor indicating a helical alignment ability expressed by Expression (A).

$$HTP=1/(\text{length (unit: }\mu m\text{) of helical pitch}\times\text{concentration (\% by mass) of chiral agent with respect to liquid crystal compound) } [\mu m^{-1}] \quad \text{Expression (A)}$$

The length of the helical pitch refers to a length of pitch P (=the period of the helix) of a helical structure of the cholesteric liquid crystalline phase and can be measured by the method described in Liquid Crystal Handbook (published by Maruzen Co., Ltd.), p. 196.

The photosensitive chiral agent whose helical twisting power changes upon irradiation with light (hereinafter, also simply referred to as "chiral agent A") may be liquid crystalline or non-liquid crystalline. The chiral agent A generally contains an asymmetric carbon atom in many cases. The chiral agent A may be an axial asymmetric compound or planar asymmetric compound that does not contain an asymmetric carbon atom.

The chiral agent A may be a chiral agent whose helical twisting power increases upon irradiation with light, or may be a chiral agent whose helical twisting power decreases upon irradiation with light. Above all, a chiral agent whose helical twisting power decreases upon irradiation with light is preferable.

The "increase and decrease in helical twisting power" in the present specification represents an increase or a decrease in helical twisting power in a case where an initial helical direction (helical direction before irradiation with light) of the chiral agent A is defined as "positive". Accordingly, even in a case where the helical twisting power of a chiral agent continues to decrease and goes below zero upon irradiation with light and therefore the helical direction is "negative" (that is, even in a case where a chiral agent induces a helix in a helical direction opposite to an initial helical direction (helical direction before light irradiation)), such a chiral agent also corresponds to the "chiral agent whose helical twisting power decreases".

The chiral agent A may be, for example, a so-called photoreactive chiral agent. The photoreactive chiral agent is a compound which has a chiral site and a photoreactive site that undergoes a structural change upon irradiation with light and which greatly changes a twisting power of a liquid crystal compound according to an irradiation amount, for example.

Examples of the photoreactive site that undergoes a structural change upon irradiation with light include photochromic compounds (Kingo Uchida and Masahiro Irie, "Chemical Industry", Vol. 64, p. 640, 1999; and Kingo Uchida and Masahiro Irie, "Fine Chemicals", Vol. 28(9), p. 15, 1999). In addition, the structural change means decomposition, addition reaction, isomerization, racemization, [2+2] photocyclization, dimerization reaction, or the like occurred upon irradiation of a photoreactive site with light, and the structural change may be irreversible. In addition, the chiral site corresponds to the asymmetric carbon described in Chemistry of Liquid Crystals, No. 22, Hiroyuki Nohira, Chemical Reviews, p. 73, 1994.

Examples of the chiral agent A include photoreactive chiral agents described in paragraphs [044] to [0047] of JP2001-159709A, optically active compounds described in paragraphs [0019] to [0043] to of JP2002-179669A, optically active compounds described in paragraphs [0020] to [0044] to of JP2002-179633A, optically active compounds described in paragraphs [0016] to [0040] to of JP2002-179670A, optically active compounds described in paragraphs [0017] to [0050] of JP2002-179668A, optically active compounds described in paragraphs [0018] to [0044] to of JP2002-180051A, optically active isosorbide derivatives described in paragraphs [0016] to [0055] to of JP2002-338575A, photoreactive optically active compounds described in paragraphs [0023] to [0032] of JP2002-080478A, photoreactive chiral agents described in paragraphs [0019] to [0029] of JP2002-080851A, optically active compounds described in paragraphs [0022] to [0049] of JP2002-179681A, optically active compounds described in paragraphs [0015] to [0044] of JP2002-302487A, optically active polyesters described in paragraphs [0015] to [0050] of JP2002-338668A, binaphthol derivatives described in paragraphs [0019] to [0041] of JP2003-055315A, optically active fulgide compounds described in paragraphs [0008] to [0043] of JP2003-073381A, optically active isosorbide derivatives described in paragraphs [0015] to [0057] of JP2003-306490A, optically active isosorbide derivatives described in paragraphs [0015] to [0041] of JP2003-306491A, optically active isosorbide derivatives described in paragraphs [0015] to [0049] of JP2003-313187A, optically active isomannide derivatives described in paragraphs [0015] to [0057] of JP2003-313188A, optically active isosorbide derivatives described in paragraphs [0015] to [0049] of JP2003-313189A, optically active polyesters/amides described in paragraphs [0015] to [0052] of JP2003-313292A, optically active compounds described in paragraphs [0012] to [0053] of WO2018/194157A, and optically active compounds described in paragraphs [0020] to [0049] of JP2002-179682A.

Above all, the chiral agent A is preferably a compound having at least a photoisomerization site, and the photoisomerization site more preferably has a photoisomerizable double bond. The photoisomerization site having a photoisomerizable double bond is preferably a cinnamoyl site, a chalcone site, an azobenzene site, or a stilbene site from the viewpoint that photoisomerization is likely to occur and the difference in helical twisting power before and after light irradiation is large; and more preferably a cinnamoyl site, a chalcone site, or a stilbene site from the viewpoint that the absorption of visible light is small. In addition, the photoisomerization site corresponds to the above-mentioned photoreactive site that undergoes a structural change upon irradiation with light.

In addition, the chiral agent A preferably has a trans photoisomerizable double bond from the viewpoint that the initial helical twisting power (helical twisting power before light irradiation) is high and the amount of change in the helical twisting power upon irradiation with light is more excellent.

In addition, the chiral agent A preferably has a cis photoisomerizable double bond from the viewpoint that the initial helical twisting power (helical twisting power before light irradiation) is low and the amount of change in the helical twisting power upon irradiation with light is more excellent.

The chiral agent A preferably has any partial structure selected from a binaphthyl partial structure, an isosorbide partial structure (a partial structure derived from isosorbide), and an isomannide partial structure (a partial structure derived from isomannide). The binaphthyl partial structure, the isosorbide partial structure, and the isomannide partial structure are intended to have the following structures, respectively.

The portion of the binaphthyl partial structure in which the solid line and the broken line are parallel to each other represents a single bond or a double bond. In the structures shown below, * represents a bonding position.

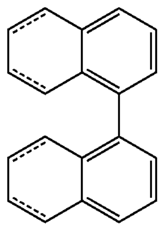

Binapthyl
partial structure

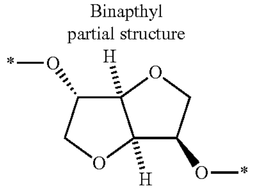

Isosorbide
partial structure

-continued

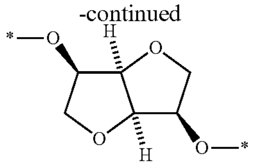

Isomannide
partial structure

The chiral agent A may have a polymerizable group. The type of the polymerizable group is not particularly limited, and is preferably a functional group capable of an addition polymerization reaction, more preferably a polymerizable ethylenic unsaturated group or a ring-polymerizable group, and still more preferably a (meth)acryloyl group, a vinyl group, a styryl group, or an allyl group.

The chiral agent A is preferably a compound represented by Formula (C).

R-L-R     Formula (C)

R's each independently represent a group having at least one site selected from the group consisting of a cinnamoyl site, a chalcone site, an azobenzene site, and a stilbene site.

L represents a divalent linking group formed by removing two hydrogen atoms from a structure represented by Formula (D) (a divalent linking group formed by removing two hydrogen atoms from the binaphthyl partial structure), a divalent linking group represented by Formula (E) (a divalent linking group consisting of the isosorbide partial structure), or a divalent linking group represented by Formula (F) (a divalent linking group consisting of the isomannide partial structure).

In Formula (E) and Formula (F), * represents a bonding position.

Formula (D)

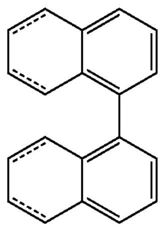

Formula (E)

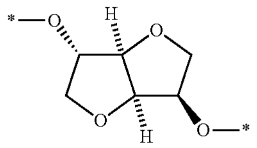

Formula (F)

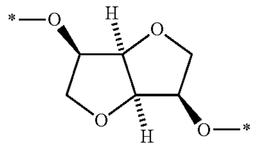

At least the above-mentioned chiral agent A is used in the step 1A. The step 1A may be an aspect in which two or more types of chiral agents A are used, or may be an aspect in which at least one chiral agent A and at least one chiral agent whose helical twisting power does not change upon irradiation with light (hereinafter, simply referred to as "chiral agent B") are used.

The chiral agent B may be liquid crystalline or non-liquid crystalline. The chiral agent B generally contains an asymmetric carbon atom in many cases. The chiral agent B may be an axial asymmetric compound or planar asymmetric compound that does not contain an asymmetric carbon atom.

The chiral agent B may have a polymerizable group. Examples of the type of the polymerizable group include polymerizable groups that the chiral agent A may have.

A known chiral agent can be used as the chiral agent B.

The chiral agent B is preferably a chiral agent that induces a helix in a direction opposite to the direction of the helix induced by the chiral agent A. That is, for example, in a case where the helix induced by the chiral agent A is right-handed, the helix induced by the chiral agent B is left-handed.

The molar absorption coefficient of each of the chiral agent A and the chiral agent B is not particularly limited. The molar absorption coefficient at a wavelength (for example, 365 nm) of light for irradiation in the step 3A which will be described later is preferably 100 to 100,000 L/(mol·cm) and more preferably 500 to 50,000 L/(mol·cm).

The content of each of the chiral agent A and the chiral agent B in the composition layer can be appropriately set according to the properties (for example, retardation and wavelength dispersion) of an optically anisotropic layer to be formed. Since the twisted angle of the liquid crystal compound in the optically anisotropic layer largely depends on the types and addition concentrations of the chiral agent A and the chiral agent B, it is possible to control the alignment state of the liquid crystal compound by adjusting these factors.

In the first embodiment, the total content of the chiral agent (total content of all the chiral agents) in the composition layer is not particularly limited. From the viewpoint of easily controlling the alignment state of the liquid crystal compound, the total content of the chiral agent is preferably 5.0% by mass or less, more preferably 4.0% by mass or less, still more preferably 2.0% by mass or less, and particularly preferably 1.0% by mass or less with respect to the total mass of the liquid crystal compound. The lower limit of the total content of the chiral agent is not particularly limited, and is preferably 0.01% by mass or more, more preferably 0.02% by mass or more, and still more preferably 0.05% by mass.

The content of the chiral agent A in the chiral agent is not particularly limited, and is preferably 5% to 95% by mass and more preferably 10% to 90% by mass with respect to the total mass of the chiral agent, from the viewpoint that it is easy to control the alignment state of the liquid crystal compound.

(Liquid Crystal Compound)

The composition layer of the step 1A contains a liquid crystal compound having a polymerizable group.

The type of the liquid crystal compound is not particularly limited. Generally, the liquid crystal compound can be classified into a rod-like type (rod-like liquid crystal compound) and a disk-like type (discotic liquid crystal compound) depending on the shape thereof. Further, the liquid crystal compound can be classified into a low molecular weight type and a high molecular weight type. The high molecular weight generally refers to having a polymerization degree of 100 or more (Polymer Physics-Phase Transition Dynamics, Masao Doi, p. 2, Iwanami Shoten Publishers, 1992). Any liquid crystal compound can be used in the present invention, and it is preferable to use a rod-like liquid crystal compound or a discotic liquid crystal compound and it is more preferable to use a rod-like liquid crystal compound. Two or more types of rod-like liquid crystal compounds, two or more types of discotic liquid crystal compounds, or a mixture of a rod-like liquid crystal compound and a discotic liquid crystal compound may be used.

For example, rod-like liquid crystal compounds described in claim 1 of JP1999-513019A (JP-H11-513019A) and paragraphs [0026] to [0098] to of JP2005-289980A can be preferably used as the rod-like liquid crystal compound.

For example, discotic liquid crystal compounds described in paragraphs [0020] to [0067] of JP2007-108732A and paragraphs [0013] to [0108] of JP2010-244038A can be preferably used as the discotic liquid crystal compound.

The type of the polymerizable group contained in the liquid crystal compound is not particularly limited, and is preferably a functional group capable of an addition polymerization reaction, more preferably a polymerizable ethylenic unsaturated group or a ring-polymerizable group, and still more preferably a (meth)acryloyl group, a vinyl group, a styryl group, or an allyl group.

The optically anisotropic layer produced in the present invention is a layer formed by fixing a liquid crystal compound having a polymerizable group (a rod-like liquid crystal compound or discotic liquid crystal compound having a polymerizable group) by means of polymerization or the like. After being formed into a layer, the optically anisotropic layer no longer needs to exhibit liquid crystallinity.

The content of the liquid crystal compound in the composition layer is not particularly limited, and is preferably 60% by mass or more and more preferably 70% by mass or more with respect to the total mass of the composition layer, from the viewpoint that the alignment state of the liquid crystal compound can be easily controlled. The upper limit of the content of the liquid crystal compound is not particularly limited, and is preferably 99% by mass or less and more preferably 97% by mass or less.

(Other Components)

The composition layer may contain components other than the chiral agent and the liquid crystal compound.

For example, the composition layer may contain a polymerization initiator. In a case where the composition layer contains a polymerization initiator, the polymerization of the liquid crystal compound having a polymerizable group proceeds more efficiently.

The polymerization initiator may be, for example, a known polymerization initiator, examples of which include a photopolymerization initiator and a thermal polymerization initiator, among which a photopolymerization initiator is preferable. In particular, a polymerization initiator that is photosensitized by the light for irradiation in the step 5A which will be described later is preferable.

The polymerization initiator is preferably such that the molar absorption coefficient that is the maximum among the wavelengths of light for irradiation in the step 3A is 0.1 times or less the molar absorption coefficient that is the maximum among the wavelengths of light for irradiation in the step 5A.

In addition, the molar absorption coefficient at the wavelength of light irradiation in the step 3A of the polymerization initiator is preferably 5,000 L/(mol·cm) or less, more preferably 4,000 L/(mol·cm) or less, and still more preferably 3,000 L/(mol·cm) or less from the viewpoint that a predetermined optically anisotropic layer is easily formed. The lower limit of the molar absorption coefficient of the photosensitizer is not particularly limited and is preferably 0 L/(mol·cm), but is often 30 L/(mol·cm) or more.

The content of the polymerization initiator in the composition layer is not particularly limited, and is preferably 0.01% to 20% by mass and more preferably 0.5% to 10% by mass with respect to the total mass of the composition layer.

The composition layer may contain a photosensitizer.

The type of the photosensitizer is not particularly limited, and examples thereof include a known photosensitizer.

In addition, the molar absorption coefficient at the wavelength of light irradiation in the step 3A of the photosensitizer is preferably 5,000 L/(mol·cm) or less, more preferably 4,800 L/(mol·cm) or less, and still more preferably 4,500 L/(mol·cm) or less from the viewpoint that a predetermined optically anisotropic layer is easily formed. The lower limit of the molar absorption coefficient of the photosensitizer is not particularly limited and is preferably 0 L/(mol·cm), but is often 30 L/(mol·cm) or more.

The content of the photosensitizer in the composition layer is not particularly limited, and is preferably 0.01% to 20% by mass and more preferably 0.5% to 10% by mass with respect to the total mass of the composition layer.

The composition layer may contain a polymerizable monomer different from the liquid crystal compound having a polymerizable group. Examples of the polymerizable monomer include a radically polymerizable compound and a cationically polymerizable compound, among which a polyfunctional radically polymerizable monomer is preferable. Examples of the polymerizable monomer include polymerizable monomers described in paragraphs [0018] to [0020] of JP2002-296423A.

The content of the polymerizable monomer in the composition layer is not particularly limited, and is preferably 1% to 50% by mass and more preferably 5% to 30% by mass with respect to the total mass of the liquid crystal compound.

The composition layer may contain a leveling agent.

The leveling agent is not particularly limited, and is preferably a fluorine-based leveling agent or a silicon-based leveling agent and more preferably a fluorine-based leveling agent from the viewpoint that the distribution of the leveling agent which will be described later is easily formed.

The fluorine-based leveling agent is a leveling agent having a fluorine atom, which preferably has a fluoroaliphatic group.

The fluorine-based leveling agent preferably has a repeating unit represented by Formula (1).

(1)

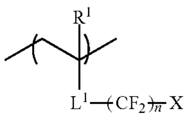

In Formula (1), $R^1$ represents a hydrogen atom, a halogen atom, or a methyl group.

$L^1$ represents a single bond or a divalent linking group. The divalent linking group is not particularly limited, and examples thereof include a divalent hydrocarbon group (for example, a divalent aliphatic hydrocarbon group such as an alkylene group having 1 to 10 carbon atoms, an alkenylene group having 1 to 10 carbon atoms, or an alkynylene group having 1 to 10carbon atoms; or a divalent aromatic hydrocarbon group such as an arylene group), a divalent heterocyclic group, —O—, —S—, —NH—, —CO—, and a group formed by a combination thereof (for example, —CO—O—, —O-divalent hydrocarbon group-, —(O-divalent hydrocarbon group)$_m$-O— (where m represents an integer of 1 or more), or a —O—CO-divalent hydrocarbon group).

n represents an integer of 1 to 18, preferably an integer of 4 to 12, and more preferably an integer of 6 to 8.

X is a hydrogen atom or a fluorine atom.

The repeating unit represented by Formula (1) is preferably a repeating unit represented by Formula (2) from the viewpoint that the distribution of the leveling agent which will be described later is easily formed.

(2)

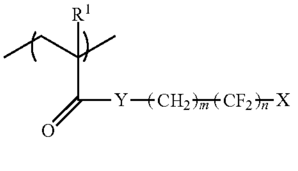

In Formula (2), the definitions of $R^1$, n, and X are the same as the definitions of each group in Formula (1) above.

Y represents an oxygen atom, a sulfur atom, or —N($R^2$)—. $R^2$ represents a hydrogen atom or an alkyl group having 1 to 8 carbon atoms which may have a substituent.

m represents an integer of 1 to 6 and preferably an integer of 1 to 3.

The fluorine-based leveling agent may have only one type of repeating unit represented by Formula (1), or may have two or more types of repeating units represented by Formula (1).

The content of the repeating unit represented by Formula (1) in the fluorine-based leveling agent is not particularly limited, and is preferably 20% to 100% by mass and more preferably 30% to 95% by mass with respect to all the repeating units of the fluorine-based leveling agent, from the viewpoint that the distribution of the leveling agent which will be described later is easily formed.

In a case where the fluorine-based leveling agent has two or more types of repeating units represented by Formula (1), the total content thereof is preferably within the above range.

The fluorine-based leveling agent may have a repeating unit other than the repeating unit represented by Formula (1).

The other repeating unit may have, for example, a repeating unit having a hydrophilic group (for example, a poly (oxyalkylene) group or a hydroxy group).

The fluorine-based leveling agent may have a repeating unit represented by Formula (3).

(3)

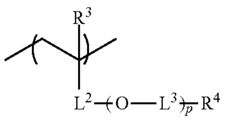

$R^3$ represents a hydrogen atom, a halogen atom, or a methyl group.

$L^2$ represents a single bond or a divalent linking group. The definition of the divalent linking group is as described above.

$L^3$ represents an alkylene group. The alkylene group preferably has 2 to 3 carbon atoms.

p represents an integer of 4 to 20 and preferably an integer of 5 to 15.

$R^4$ represents a hydrogen atom or a substituent. Examples of the substituent include an alkyl group, an alkoxy group, a halogen atom, an aryl group, a cyano group, a hydroxy group, an amino group, and a group formed by a combination thereof (for example, -alkylene group —OH).

The fluorine-based leveling agent may have only one type of repeating unit represented by Formula (3), or may have two or more types of repeating units represented by Formula (3).

The content of the repeating unit represented by Formula (3) in the fluorine-based leveling agent is not particularly limited, and is preferably 2% to 70% by mass and more preferably 5% to 60% by mass with respect to all the repeating units of the fluorine-based leveling agent, from the viewpoint that the distribution of the leveling agent which will be described later is easily formed.

In a case where the fluorine-based leveling agent has two or more types of repeating units represented by Formula (3), the total content thereof is preferably within the above range.

The weight-average molecular weight of the fluorine-based leveling agent is not particularly limited, and is preferably 3,000 to 30,000 and more preferably 5,000 to 25,000, from the viewpoint that the distribution of the leveling agent which will be described later is easily formed.

The silicon-based leveling agent is preferably a leveling agent containing a plurality of dialkylsilyloxy units as repeating units.

The content of the leveling agent in the optically anisotropic layer is not particularly limited, and is preferably 0.010% to 5.000% by mass and more preferably 0.020% to 2.000% by mass with respect to the total mass of the optically anisotropic layer.

The composition layer may contain a polymer. Examples of the polymer include cellulose esters. Examples of the cellulose ester include cellulose esters described in paragraph of JP2000-155216A.

The content of the polymer in the composition layer is not particularly limited, and is preferably 0.1% to 10% by mass and more preferably 0.1% to 8% by mass with respect to the total mass of the liquid crystal compound.

The composition layer may contain an additive (alignment control agent) that promotes horizontal alignment or vertical alignment in order to bring a liquid crystal compound into a horizontal alignment state or a vertical alignment state, in addition to the foregoing components.

(Substrate)

As will be described later, in a case of forming the composition layer, it is preferable to form the composition layer on a substrate.

The substrate is a plate that supports the composition layer.

The substrate is preferably a transparent substrate. The transparent substrate is intended to refer to a substrate having a visible light transmittance of 60% or more, which preferably has a visible light transmittance of 80% or more and more preferably 90% or more.

The thickness direction retardation value (Rth(550)) of the substrate at a wavelength of 550 nm is not particularly limited, and is preferably −110 to 110 nm and more preferably −80 to 80 nm.

The in-plane retardation value (Re(550)) of the substrate at a wavelength of 550 nm is not particularly limited, and is preferably 0 to 50 nm, more preferably 0 to 30 nm, and still more preferably 0 to 10 nm.

A polymer having excellent optical performance transparency, mechanical strength, heat stability, moisture shielding property, isotropy, and the like is preferable as the material for forming the substrate.

Examples of the polymer film that can be used as the substrate include a cellulose acylate film (for example, a cellulose triacetate film (refractive index: 1.48), a cellulose diacetate film, a cellulose acetate butyrate film, or a cellulose acetate propionate film), a polyolefin film such as polyethylene or polypropylene, a polyester film such as polyethylene terephthalate or polyethylene naphthalate, a polyether sulfone film, a polyacrylic film such as polymethylmethacrylate, a polyurethane film, a polycarbonate film, a polysulfone film, a polyether film, a polymethylpentene film, a polyether ketone film, a (meth) acrylic nitrile film, and a film of a polymer having an alicyclic structure (a norbornene-based resin (ARTON: trade name, manufactured by JSR Corporation), or an amorphous polyolefin (ZEONEX: trade name, manufactured by Zeon Corporation)).

Above all, the material for the polymer film is preferably triacetyl cellulose, polyethylene terephthalate, or a polymer having an alicyclic structure, and more preferably triacetyl cellulose.

The substrate may contain various additives (for example, an optical anisotropy adjuster, a wavelength dispersion adjuster, a fine particle, a plasticizer, an ultraviolet inhibitor, a deterioration inhibitor, and a release agent).

The thickness of the substrate is not particularly limited, and is preferably 10 to 200 μm, more preferably 10 to 100 μm, and still more preferably 20 to 90 μm. In addition, the substrate may consist of a plurality of layers laminated. In order to improve the adhesion of the substrate to the layer provided thereon, the surface of the substrate may be subjected to a surface treatment (for example, a glow discharge treatment, a corona discharge treatment, an ultraviolet (UV) treatment, or a flame treatment).

In addition, an adhesive layer (undercoat layer) may be provided on the substrate.

In addition, in order to impart slipperiness in a transport step and prevent a back surface and a front surface from sticking to each other after winding, a polymer layer in which inorganic particles having an average particle diameter of about 10 to 100 nm are mixed in a solid content mass ratio of 5% to 40% by mass may be disposed on one side of the substrate.

The substrate may be a so-called temporary support. That is, the substrate may be peeled off from the optically anisotropic layer after carrying out the production method of the present invention.

In addition, the surface of the substrate may be directly subjected to a rubbing treatment. That is, a substrate that has been subjected to a rubbing treatment may be used. The direction of the rubbing treatment is not particularly limited, and an optimum direction is appropriately selected according to the direction in which the liquid crystal compound is desired to be aligned.

A treatment method widely adopted as a liquid crystal alignment treatment step of a liquid crystal display (LCD) can be applied for the rubbing treatment. That is, a method of obtaining alignment by rubbing the surface of the substrate in a certain direction with paper, gauze, felt, rubber, nylon fiber, polyester fiber, or the like can be used.

An alignment film may be disposed on the substrate.

The alignment film can be formed by means such as rubbing treatment of an organic compound (preferably a polymer), oblique vapor deposition of an inorganic compound, formation of a layer having microgrooves, or accumulation of an organic compound (for example, ω-tricosanoic acid, dioctadecylmethylammonium chloride, or methyl stearate) by the Langmuir-Blodgett method (LB film).

Further, there is also known an alignment film capable of expressing an alignment function by application of an electric field, application of a magnetic field, or irradiation with light (preferably polarized light).

The alignment film is preferably formed by a rubbing treatment of a polymer.

Examples of the polymer contained in the alignment film include a methacrylate-based copolymer, a styrene-based copolymer, a polyolefin, a polyvinyl alcohol and a modified polyvinyl alcohol, a poly (N-methylolacrylamide), a polyester, a polyimide, a vinyl acetate copolymer, a carboxymethyl cellulose, and a polycarbonate described in paragraph of JP1996-338913A (JP-H08-338913A). In addition, a silane coupling agent can also be used as the polymer.

Above all, a water-soluble polymer (for example, a poly (N-methylolacrylamide), a carboxymethyl cellulose, a gelatin, a polyvinyl alcohol, or a modified polyvinyl alcohol) is preferable; a gelatin, a polyvinyl alcohol, or a modified polyvinyl alcohol is more preferable; and a polyvinyl alcohol or a modified polyvinyl alcohol is still more preferable.

As described above, the alignment film can be formed by applying a solution containing the above-mentioned polymer which is an alignment film forming material and an optional additive (for example, a crosslinking agent) onto a substrate, followed by heat-drying (crosslinking) and a rubbing treatment.

(Procedure of Step 1A)

In the step 1A, a composition layer containing the above-mentioned components is formed, but the procedure is not particularly limited. For example, a method of applying a composition containing the above-mentioned chiral agent and liquid crystal compound having a polymerizable group onto a substrate, followed by a drying treatment if necessary (hereinafter, also simply referred to as "coating method"), and a method of separately forming a composition layer and transferring the formed layer onto a substrate can be mentioned. Above all, the coating method is preferable from the viewpoint of productivity.

Hereinafter, the coating method will be described in detail.

The composition used in the coating method contains the above-mentioned chiral agent, liquid crystal compound having a polymerizable group, and other components used as necessary (for example, a polymerization initiator, a polymerizable monomer, a surfactant, and a polymer).

The content of each component in the composition is preferably adjusted to be the content of each component in the composition layer described above.

The coating method is not particularly limited, and examples thereof include a wire bar coating method, an extrusion coating method, a direct gravure coating method, a reverse gravure coating method, and a die-coating method.

If necessary, a treatment for drying the coating film applied onto the substrate may be carried out after application of the composition. The solvent can be removed from the coating film by carrying out the drying treatment.

The film thickness of the coating film is not particularly limited and is preferably 0.1 to 20 μm, more preferably 0.2 to 15 μm, and still more preferably 0.5 to 10 μm.

<Step 2A>

The step 2A is a step of subjecting the composition layer to a heat treatment to align the liquid crystal compound in the composition layer. Carrying out this step brings the liquid crystal compound in the composition layer into a predetermined alignment state.

With regard to heat treatment conditions, the optimum conditions are selected according to the liquid crystal compound used.

Above all, the heating temperature is often 25° C. to 250° C., more often 40° C. to 150° C., and still more often 50° C. to 130° C.

The heating time is often 0.1 to 60 minutes and more often 0.2 to 5 minutes.

The alignment state of the liquid crystal compound obtained in the step 2A changes according to the helical twisting power of the chiral agent described above.

In order to form an optically anisotropic layer having, along a thickness direction, a layer formed by fixing an alignment state of a liquid crystal compound twist-aligned along a helical axis extending in a thickness direction, and a layer formed by fixing an alignment state of a liquid crystal compound homogeneously aligned, the absolute value of the weighted average helical twisting power of the chiral agent in the composition layer formed in the step 1A is preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, more particularly preferably 0.0 to 0.02 $\mu m^{-1}$, and most preferably 0.

The weighted average helical twisting power of the chiral agent is a total value obtained by dividing the product of the helical twisting power of each chiral agent contained in the composition layer and the concentration (% by mass) of each chiral agent in the composition layer by the total concentration (% by mass) of the chiral agents in the composition layer, in a case where two or more types of chiral agents are contained in the composition. The weighted average helical twisting power is represented by Expression (B), for example, in a case where two chiral agents (chiral agent X and chiral agent Y) are used in combination.

Weighted average helical twisting power ($\mu m^{-1}$)=(helical twisting power ($\mu m^{-1}$) of chiral agent $X$×concentration (% by mass) of chiral agent $X$ in composition layer+helical twisting power ($\mu m^{-1}$) of chiral agent $Y$×concentration (% by mass) of chiral agent $Y$ in composition layer)/(concentration (% by mass) of chiral agent $X$ in composition layer+concentration (% by mass) of chiral agent $Y$ in composition layer) Expression (B)

However, in Expression (B), in a case where the helical direction of the chiral agent is right-handed, the helical twisting power has a positive value. In addition, in a case where the helical direction of the chiral agent is left-handed, the helical twisting power has a negative value. That is, for example, in a case of a chiral agent having a helical twisting power of 10 $\mu m^{-1}$, the helical twisting power is expressed as 10 $\mu m^{-1}$ in a case where the helical direction of the helix induced by the chiral agent is right-handed. On the other hand, in a case where the helical direction of the helix induced by the chiral agent is left-handed, the helical twisting power is expressed as −10 $\mu m^{-1}$.

Figure 6:
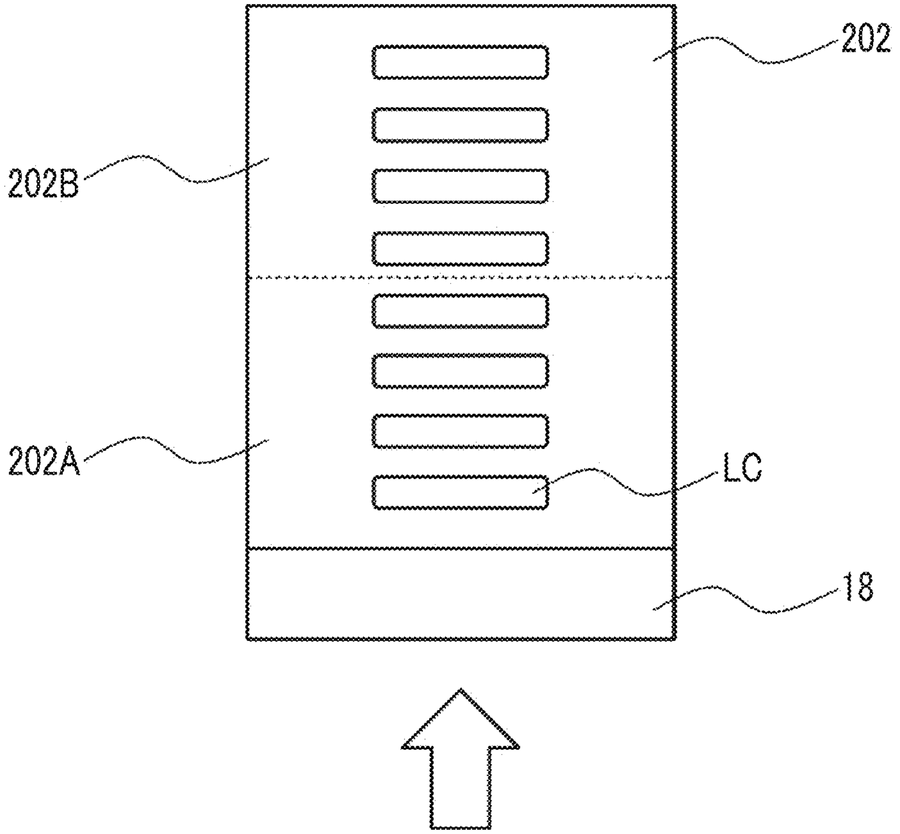
FIG. 6 is a cross-sectional view of a composition layer for explaining an example of a step 3A of a method for producing the first embodiment of the optically anisotropic layer.

In a case where the absolute value of the weighted average helical twisting power of the chiral agent in the composition layer formed in the step 1A is 0, a composition layer 202 in which a liquid crystal compound LC is homogeneously aligned is formed on a substrate 18, as shown in FIG. 6. It should be noted that FIG. 6 is a cross-sectional view of the substrate 18 and the composition layer 202. It is assumed that the chiral agent A and the chiral agent B are present in the composition layer 202 shown in FIG. 6 at the same concentration, the helical direction induced by the chiral agent A is left-handed, and the helical direction induced by the chiral agent B is right-handed. In addition, the absolute value of the helical twisting power of the chiral agent A and the absolute value of the helical twisting power of the chiral agent B are assumed to be the same.

<Step 3A>

The step 3A is a step of irradiating the composition layer with light for 50 seconds or less and at an irradiation amount of 300 mJ/cm$^2$ or less under the condition that the oxygen concentration is 1% by volume or more, after the step 2A. In the following, the mechanism of this step will be described with reference to the accompanying drawings. In the following, an example in which the step 3A is carried out on the composition layer 202 shown in FIG. 6 will be described as a representative example.

As shown in FIG. 6, in the step 3A, light irradiation is carried out from the direction opposite to the composition layer 202 side of the substrate 18 (the direction of the white arrow in FIG. 6) under the condition that the oxygen concentration is 1% by volume or more. Although the light irradiation is carried out from the substrate 18 side in FIG. 6, the light irradiation may be carried out from the composition layer 202 side.

At that time, in a case where a lower region 202A of the composition layer 202 on the substrate 18 side and an upper region 202B of the composition layer 202 opposite to the substrate 18 side are compared, the surface of the upper region 202B is on the air side, so that the oxygen concentration in the upper region 202B is high and the oxygen concentration in the lower region 202A is low. Therefore, in a case where the composition layer 202 is irradiated with light, the polymerization of the liquid crystal compound easily proceeds in the lower region 202A, and the alignment state of the liquid crystal compound is fixed. The chiral agent A is also present in the lower region 202A, and the chiral agent A is also photosensitized, resulting in a change in the helical twisting power. However, since the alignment state of the liquid crystal compound is fixed in the lower region 202A, there is no change in the alignment state of the liquid crystal compound even in a case where the step 4A of subjecting the light-irradiated composition layer to a heat treatment, which will be described later, is carried out.

In addition, since the oxygen concentration is high in the upper region 202B, the polymerization of the liquid crystal compound is inhibited by oxygen and therefore the polymerization does not proceed easily even in a case where light irradiation is carried out. Since the chiral agent A is also present in the upper region 202B, the chiral agent A is photosensitized, resulting in a change in the helical twisting power. Therefore, in a case where the step 4A which will be described later is carried out, the alignment state of the liquid crystal compound changes along with the changed helical twisting power.

That is, the immobilization of the alignment state of the liquid crystal compound is likely to proceed in the substrate-side region (lower region) of the composition layer by carrying out the step 3A. In addition, the immobilization of the alignment state of the liquid crystal compound is difficult to proceed in the region of the composition layer (upper region) opposite to the substrate side, and the helical twisting power changes according to the photosensitized chiral agent A.

The step 3A is carried out under the condition that the oxygen concentration is 1% by volume or more. Above all, the oxygen concentration is preferably 2% by volume or more and more preferably 5% by volume or more from the viewpoint that layers having different alignment states of the liquid crystal compound are likely to be formed in the optically anisotropic layer. The upper limit of the oxygen concentration is not particularly limited and may be, for example, 100% by volume.

The light irradiation time in the step 3A is 50 seconds or shorter. From the viewpoint of easily forming a predetermined optically anisotropic layer and from the viewpoint of productivity, the light irradiation time is preferably 30 seconds or shorter and more preferably 10 seconds or shorter. The lower limit of the light irradiation time is not particularly limited, and is preferably 0.1 seconds or longer and more preferably 0.2 seconds or longer from the viewpoint of curing the liquid crystal compound.

The irradiation amount of light irradiation in the step 3A is 300 mJ/cm$^2$ or less. From the viewpoint of easily forming a predetermined optically anisotropic layer and from the viewpoint of productivity, the irradiation amount of light irradiation is preferably 250 mJ/cm$^2$ or less and more preferably 200 mJ/cm$^2$ or less. The lower limit of the irradiation amount of light irradiation is not particularly limited, and is preferably 1 mJ/cm$^2$ or more and more preferably 5 mJ/cm$^2$ or more from the viewpoint of curing the liquid crystal compound.

The light irradiation in the step 3A in the first embodiment is preferably carried out at 15° C. to 70° C. (preferably 25° C. to 50° C.).

The light used for the light irradiation may be any light by which the chiral agent A is photosensitized. That is, the light used for the light irradiation is not particularly limited as long as it is an actinic ray or radiation that changes the helical twisting power of the chiral agent A, and examples thereof include an emission line spectrum of a mercury lamp, a far ultraviolet ray represented by an excimer laser, an extreme ultraviolet ray, an X-ray, an ultraviolet ray, and an electron beam. Above all, an ultraviolet ray is preferable.

<Step 4A>

The step 4A is a step of subjecting the composition layer to a heat treatment at a temperature higher than that upon irradiation with light, after the step 3A. Carrying out this step leads to a change in the alignment state of the liquid crystal compound in the region where the helical twisting power of the chiral agent A in the composition layer subjected to light irradiation changes. More specifically, this step is a step of subjecting the composition layer after the step 3A to a heat treatment at a temperature higher than that at the time of irradiation to align the liquid crystal compound in the composition layer not fixed in the step 3A.

In the following, the mechanism of this step will be described with reference to the accompanying drawings.

As described above, in a case where the step 3A is carried out on the composition layer 202 shown in FIG. 6, the alignment state of the liquid crystal compound is fixed in the lower region 202A, whereas the polymerization of the liquid crystal compound is difficult to proceed and the alignment state of the liquid crystal compound is not fixed in the upper region 202B. In addition, the helical twisting power of the chiral agent A changes in the upper region 202B. In a case where such a change in the helical twisting power of the chiral agent A occurs, the force of twisting the liquid crystal compound changes in the upper region 202B, as compared with the state before light irradiation. This point will be described in more detail.

As described above, the chiral agent A and the chiral agent B are present in the composition layer 202 shown in FIG. 6 at the same concentration, the helical direction induced by the chiral agent A is left-handed, and the helical direction induced by the chiral agent B is right-handed. In addition, the absolute value of the helical twisting power of the chiral agent A and the absolute value of the helical twisting power of the chiral agent B are the same. Therefore, the weighted average helical twisting power of the chiral agent in the composition layer before light irradiation is 0.

Figure 8:
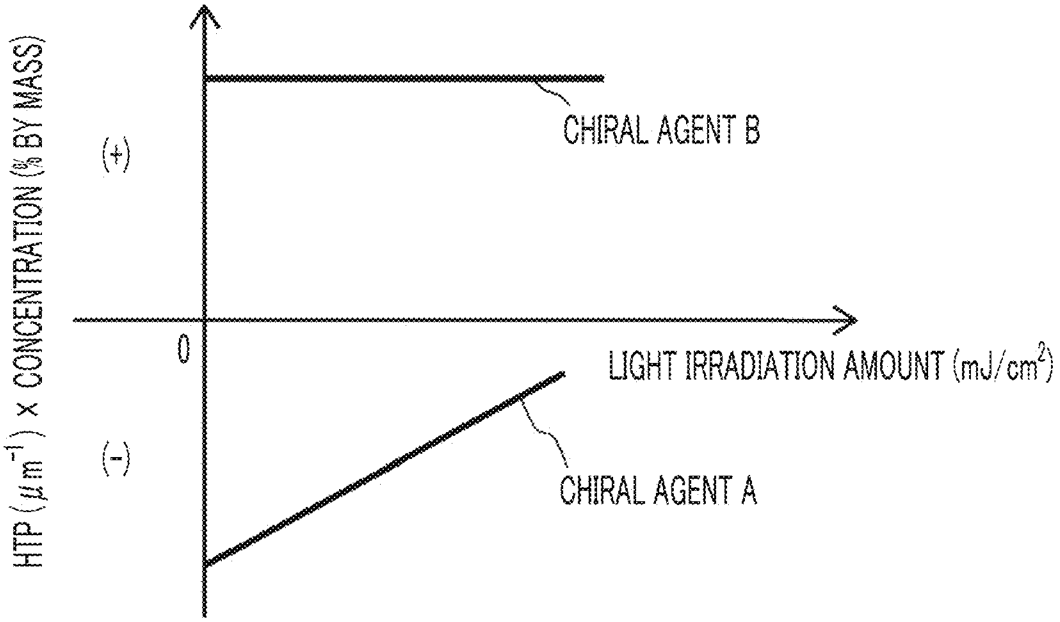
FIG. 8 is a schematic diagram of a graph plotting a relationship between a helical twisting power (HTP) ($\mu m^{-1}$)×a concentration (% by mass) and a light irradiation amount ($mJ/cm^2$) for each of a chiral agent A and a chiral agent B.

The above aspect is shown in FIG. 8. In addition, in FIG. 8, the vertical axis represents the "helical twisting power ($\mu m^{-1}$) of chiral agent×concentration (% by mass) of chiral agent", and the helical twisting power increases as the value thereof deviates from 0. First, the relationship between the chiral agent A and the chiral agent B in the composition layer before light irradiation corresponds to the time in a case where the light irradiation amount is 0, and therefore corresponds to a state in which the absolute value of "helical twisting power ($\mu m^{-1}$) of chiral agent A×concentration (% by mass) of chiral agent A" and the absolute value of "helical twisting power ($\mu m^{-1}$) of chiral agent B×concentration (% by mass) of chiral agent B" are equal. That is, the helical twisting powers of both the chiral agent A that induces left-handed turning and the chiral agent B that induces right-handed turning are offset.

Figure 9:
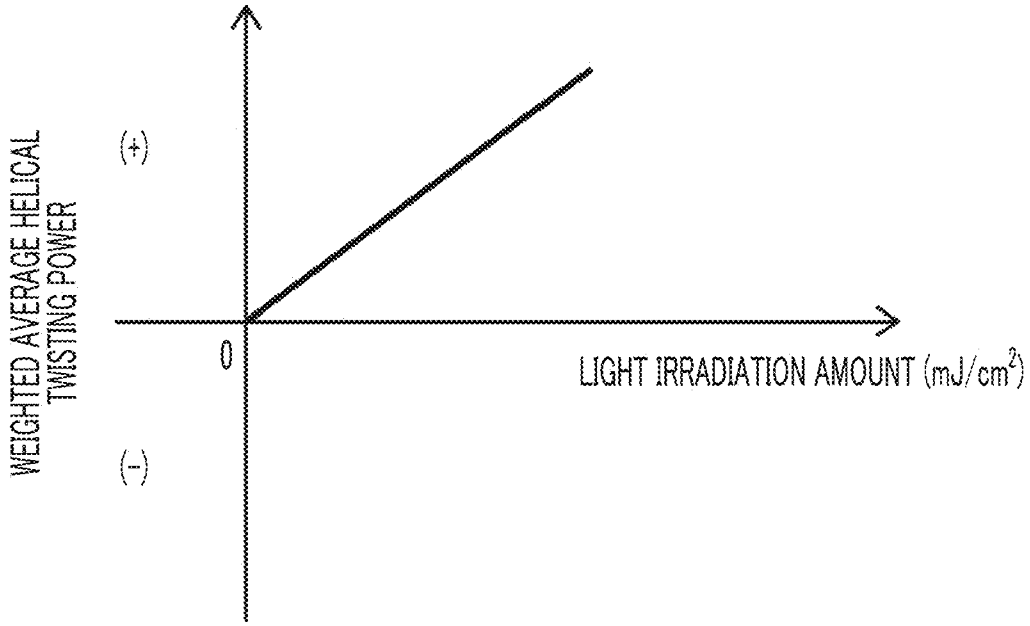
FIG. 9 is a schematic diagram of a graph plotting a relationship between a weighted average helical twisting power ($\mu m^{-1}$) and a light irradiation amount ($mJ/cm^2$) in a system in which the chiral agent A and the chiral agent B are used in combination.

In a case where light irradiation is carried out in the upper region 202B in such a state and the helical twisting power of the chiral agent A decreases depending on the light irradiation amount as shown in FIG. 8, the weighted average helical twisting power of the chiral agent in the upper region 202B is large and therefore the right-handed helical twisting power is strong, as shown in FIG. 9. That is, as for the helical twisting power that induces the helix of the liquid crystal compound, an increase in the irradiation amount leads to an increase in the helical twisting power in the direction (+) of the helix induced by the chiral agent B.

Figure 7:
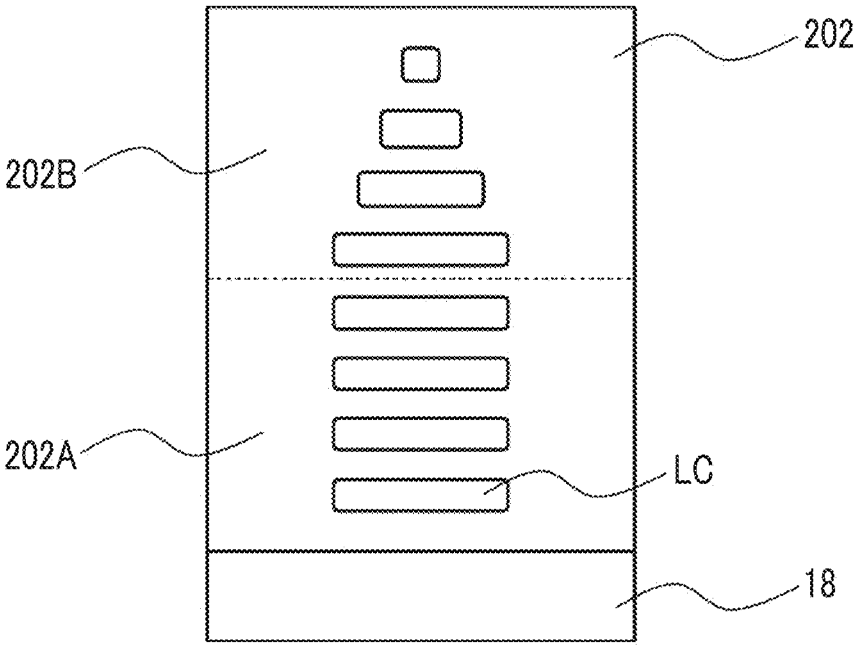
FIG. 7 is a cross-sectional view of a composition layer for explaining an example of a step 4A of the method for producing the first embodiment of the optically anisotropic layer.

Therefore, in a case where the composition layer 202 after the step 3A in which such a change in the weighted average helical twisting power occurred is subjected to a heat treatment to promote the realignment of the liquid crystal compound, the liquid crystal compound LC is twist-aligned along a helical axis extending along the thickness direction of the composition layer 202 in the upper region 202B, as shown in FIG. 7.

On the other hand, as described above, the polymerization of the liquid crystal compound proceeds to fix the alignment state of the liquid crystal compound during the step 3A in the lower region 202A of the composition layer 202, so that the realignment of the liquid crystal compound does not proceed.

As described above, carrying out the step 4A leads to the formation of two regions having different alignment states of the liquid crystal compound along the thickness direction of the composition layer.

The aspect in which a chiral agent whose helical twisting power decreases upon irradiation with light is used as the chiral agent A has been described in FIG. 6 and FIG. 7, but the present invention is not limited to this aspect. For example, a chiral agent whose helical twisting power increases upon irradiation with light may be used as the chiral agent A. In that case, the helical twisting power induced by the chiral agent A increases upon irradiation with light and therefore the liquid crystal compound is twist-aligned in the turning direction induced by the chiral agent A.

In addition, the aspect in which the chiral agent A and the chiral agent B are used in combination has been described in FIG. 6 and FIG. 7, but the present invention is not limited to this aspect. For example, it may be an aspect in which two types of chiral agents A are used. Specifically, it may be an aspect in which a chiral agent A1 that induces left-handed turning and a chiral agent A2 that induces right-handed turning are used in combination. The chiral agents A1 and A2 may be each independently a chiral agent whose helical twisting power increases or a chiral agent whose helical twisting power decreases. For example, a chiral agent that induces left-handed turning and whose helical twisting power increases upon irradiation with light and a chiral agent that induces right-handed turning and whose helical twisting power decreases upon irradiation with light may be used in combination.

The heat treatment is carried out at a temperature higher than that at the time of light irradiation.

The difference between the temperature of the heat treatment and the temperature at the time of light irradiation is preferably 5° C. or more, more preferably 10° C. to 110° C., and still more preferably 20° C. to 110° C.

The temperature of the heat treatment is preferably a temperature which is higher than the temperature at the time of light irradiation and at which the non-fixed liquid crystal compound in the composition layer is aligned. More specifically, the temperature of the heat treatment is often 35° C. to 250° C., more often 50° C. to 150° C., still more often higher than 50° C. and lower than or equal to 150° C., and particularly often 60° C. to 130° C.

The heating time is often 0.01 to 60 minutes and more often 0.03 to 5 minutes.

In addition, the absolute value of the weighted average helical twisting power of the chiral agent in the composition layer after light irradiation is not particularly limited, and the absolute value of the difference between the weighted average helical twisting power of the chiral agent in the composition layer after light irradiation and the weighted average helical twisting power of the chiral agent in the composition layer before light irradiation is preferably 0.05 $\mu m^{-1}$ or more, more preferably 0.05 to 10.0 $\mu m^{-1}$, and still more preferably 0.1 to 10.0 $\mu m^{-1}$.

<Step 5A>

The step 5A is a step of subjecting the composition layer to a curing treatment to form an optically anisotropic layer, after the step 4A. By carrying out this step, the alignment state of the liquid crystal compound in the composition layer is fixed, and as a result, a predetermined optically anisotropic layer is formed.

The method of the curing treatment is not particularly limited, and examples thereof include a photocuring treatment and a thermal curing treatment. Above all, a light irradiation treatment is preferable, and an ultraviolet irradiation treatment is more preferable.

For ultraviolet irradiation, a light source such as an ultraviolet lamp is used.

The irradiation amount of light (for example, ultraviolet rays) is not particularly limited, and is generally preferably about 100 to 800 mJ/$cm^2$.

The atmosphere at the time of light irradiation is not particularly limited. The light irradiation may be carried out under air or the light irradiation may be carried out under an inert atmosphere. In particular, the light irradiation is preferably carried out at an oxygen concentration of less than 1% by volume.

In a case where a photocuring treatment is carried out as the curing treatment, the temperature conditions at the time of photocuring are not particularly limited and the temperature may be any temperature at which the alignment state of the liquid crystal compound in the step 4A is maintained. The difference between the temperature of the heat treatment in the step 4A and the temperature at the time of the photocuring treatment is preferably 100° C. or less and more preferably 80° C. or less.

It is preferable that the temperature of the heat treatment in the step 4A and the temperature at the time of the photocuring treatment are the same, or the temperature at the time of the photocuring treatment is lower than the temperature of the heat treatment.

The alignment state of the liquid crystal compound is fixed in the optically anisotropic layer obtained by carrying out the curing treatment.

Second Embodiment

In the second embodiment of the optically anisotropic layer, the first layer and the second layer are layers formed by fixing an alignment state of a liquid crystal compound twist-aligned along a helical axis extending along a thickness direction, and the twisted angle of the liquid crystal compound in the first layer is different from the twisted angle of the liquid crystal compound in the second layer.

Figure 10:
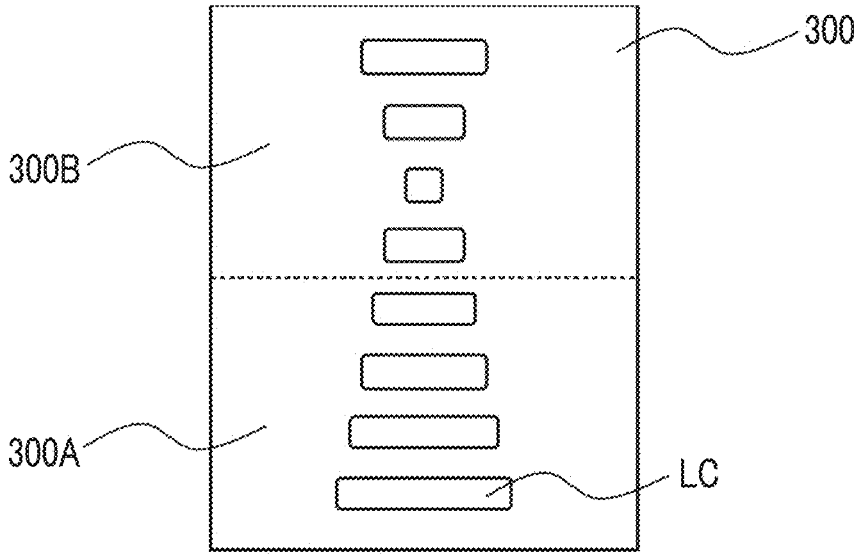
FIG. 10 is a cross-sectional view showing an example of a second embodiment of the optically anisotropic layer.

FIG. 10 shows an example of the second embodiment of the optically anisotropic layer.

An optically anisotropic layer 300 shown in FIG. 10 is an optically anisotropic layer formed of the liquid crystal compound LC and has a first layer 300A and a second layer 300B along a thickness direction. Both the first layer 300A and the second layer 300B are layers formed by fixing an alignment state of a liquid crystal compound twist-aligned along a helical axis extending along a thickness direction. The twisted angle of the liquid crystal compound in the first layer 300A is different from the twisted angle of the liquid crystal compound in the second layer 300B.

The direction of the liquid crystal compound in the first layer 300A and the second layer 300B may be a left-handed twist (counterclockwise twist) or a right-handed twist (clockwise twist).

The optical properties of the first layer and the second layer in the second embodiment of the optically anisotropic layer are not particularly limited. In a case where the thickness of the first layer is defined as d1 and the refractive index anisotropy of the first layer measured at a wavelength of 550 nm is defined as Δn1, the first layer preferably satisfies Expression (1B-1) from the viewpoint that an optically anisotropic layer can be suitably applied to a circularly polarizing plate.

$$205\ \text{nm} \leq \Delta n1d1 \leq 345\ \text{nm} \qquad \text{Expression (1B-1)}$$

Above all, the first layer more preferably satisfies Expression (1B-2) and still more preferably satisfies Expression (1B-3).

$$225\ \text{nm} \leq \Delta n1d1 \leq 325\ \text{nm} \qquad \text{Expression (1B-2)}$$

$$245\ \text{nm} \leq \Delta n1d1 \leq 305\ \text{nm} \qquad \text{Expression (1B-3)}$$

In a case where the thickness of the second layer of the second embodiment is defined as d2 and the refractive index anisotropy of the second layer measured at a wavelength of 550 nm is defined as Δn2, the second layer preferably satisfies Expression (2B-1) from the viewpoint that an optically anisotropic layer can be suitably applied to a circularly polarizing plate.

$$70\ \text{nm} \leq \Delta n2d2 \leq 210\ \text{nm} \qquad \text{Expression (2B-1)}$$

Above all, the second layer more preferably satisfies Expression (2B-2) and still more preferably satisfies Expression (2B-3).

$$90\ \text{nm} \leq \Delta n2d2 \leq 190\ \text{nm} \qquad \text{Expression (2B-2)}$$

$$110\ \text{nm} \leq \Delta n2d2 \leq 170\ \text{nm} \qquad \text{(Expression 2B-3)}$$

The absolute value of the twisted angle of the liquid crystal compound in the first layer is not particularly limited and is preferably more than 0° and 60° or less and more preferably 10 to 50° from the viewpoint that an optically anisotropic layer can be suitably applied to a circularly polarizing plate.

The absolute value of the twisted angle of the liquid crystal compound in the second layer is not particularly limited and is preferably 50° to 110° and more preferably 60° to 100° from the viewpoint that an optically anisotropic layer can be suitably applied to a circularly polarizing plate.

The optical properties of the first layer and the second layer in the second embodiment of the optically anisotropic layer are not particularly limited, and it is preferable that the first layer and the second layer satisfy the optical properties (the relationship among the twisted angle, Δn1d1, Δn2d2, and the slow axis of the liquid crystal compound) of the first optically anisotropic layer and the second optically anisotropic layer according to Claim 1 or Claim 5 of JP5753922B.

The second embodiment of the optically anisotropic layer preferably exhibits reverse wavelength dispersibility.

That is, it is preferable that Re(450), which is the in-plane retardation of the optically anisotropic layer measured at a wavelength of 450 nm, Re(550), which is the in-plane retardation of the optically anisotropic layer measured at a wavelength of 550 nm, and Re(650), which is the in-plane retardation of the optically anisotropic layer measured at a wavelength of 650 nm, have a relationship of Re(450)≤Re(550)≤Re(650).

Figure 11:
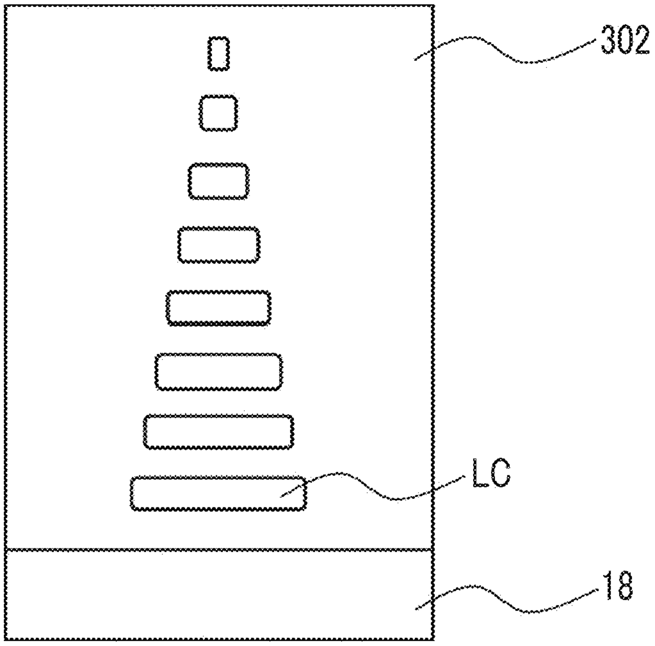
FIG. 11 is a cross-sectional view of a composition layer for explaining a method for producing the second embodiment of the optically anisotropic layer.
Figure 12:
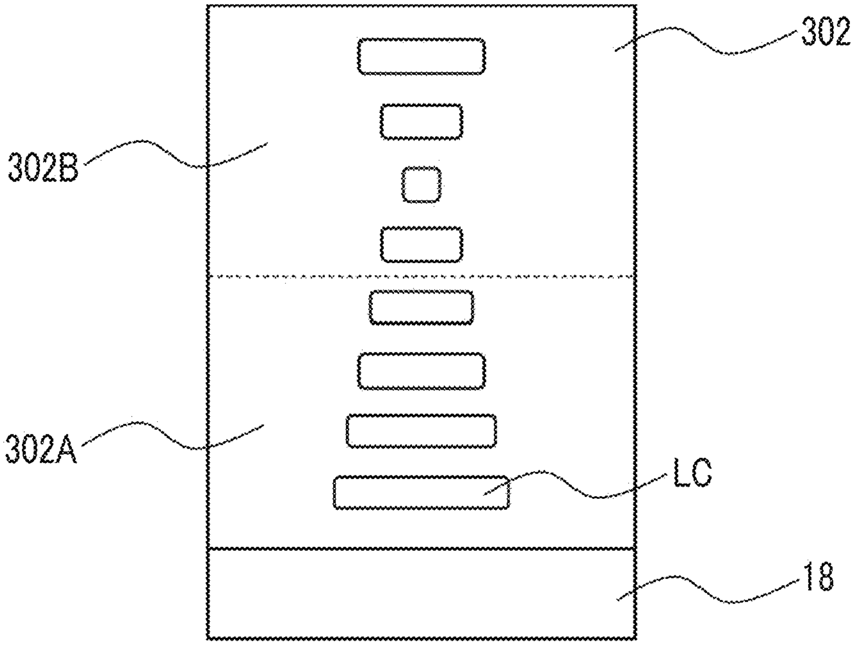
FIG. 12 is a cross-sectional view of a composition layer for explaining the method for producing the second embodiment of the optically anisotropic layer.

The method for producing the second embodiment of the optically anisotropic layer is not particularly limited, and may be, for example, a method of increasing the absolute value of the weighted average helical twisting power (for example, more than 0 $\mu m^{-1}$) of the chiral agent in the composition layer formed in the step 1A. In a case where the absolute value of the weighted average helical twisting power of the chiral agent in the composition layer formed in the step 1A is large, first, the liquid crystal compound is twist-aligned along a helical axis extending along a thickness direction in a composition layer 302 on the substrate 18 in which the step 2A is carried out, as shown in FIG. 11. In a case where the above-mentioned steps 3A and 4A are carried out on such a composition layer, the twisted alignment of the liquid crystal compound is fixed as it is in a region having a low oxygen concentration (a lower region 302A in FIG. 12) in the composition layer; whereas the helical twisting power changes in a region having a high oxygen concentration (an upper region 302B in FIG. 12) in the composition layer, and as a result, a layer having a different twisted angle of the liquid crystal compound can be formed after the step 5A is carried out.

Third Embodiment

In the third embodiment of the optically anisotropic layer, the first layer and the second layer are optically anisotropic layers formed by fixing a cholesteric liquid crystalline phase, and the helical pitch of the cholesteric liquid crystalline phase in the first layer is different from the helical pitch of the cholesteric liquid crystalline phase in the second layer.

Figure 13:
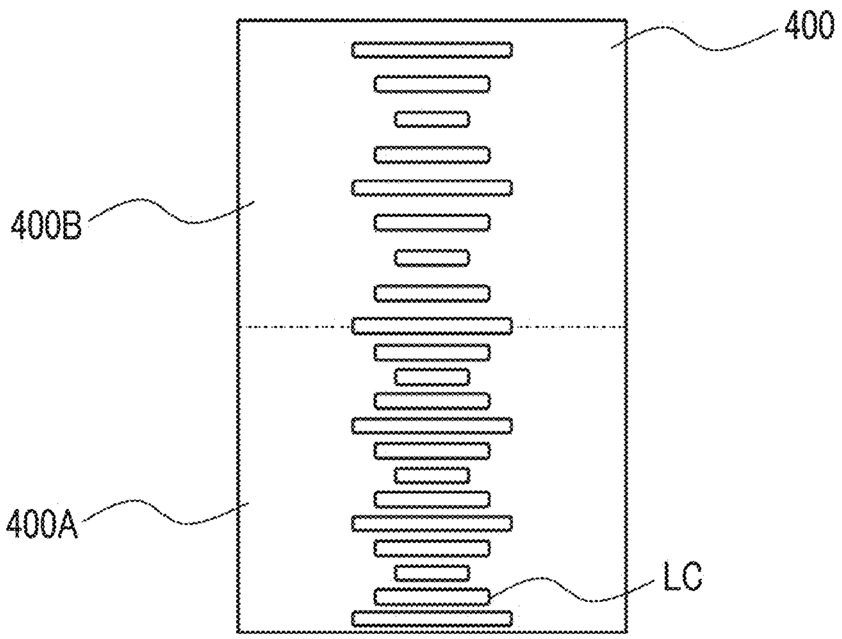
FIG. 13 is a cross-sectional view showing an example of a third embodiment of the optically anisotropic layer.

FIG. 13 shows an example of the third embodiment of the optically anisotropic layer.

An optically anisotropic layer 400 shown in FIG. 13 is an optically anisotropic layer formed by fixing a cholesteric liquid crystalline phase, which is formed of a liquid crystal compound LC, and has a first layer 400A and a second layer 400B along a thickness direction. The helical pitches of the cholesteric liquid crystalline phase are different between the first layer 400A and the second layer 400B, and the helical pitch of the second layer 400B is larger than that of the first layer 400A. Therefore, the selective reflection center wavelength derived from the cholesteric liquid crystalline phase in the first layer 400A and the selective reflection center wavelength derived from the cholesteric liquid crystalline phase in the second layer 400B are different from each other. For example, the optically anisotropic layer may be an optically anisotropic layer having a layer in which a cholesteric liquid crystalline phase that reflects blue light is fixed and a layer in which a cholesteric liquid crystalline phase that reflects green light is fixed, along a thickness direction, or may be an optically anisotropic layer having a layer in which a cholesteric liquid crystalline phase that reflects green light is fixed and a layer in which a cholesteric liquid crystalline phase that reflects red light is fixed, along a thickness direction.

The optically anisotropic layer preferably has at least two selected from the group consisting of the layer in which a cholesteric liquid crystalline phase that reflects blue light is fixed, the layer in which a cholesteric liquid crystalline phase that reflects green light is fixed, and the layer in which a cholesteric liquid crystalline phase that reflects red light is fixed.

In the present specification, the selective reflection center wavelength refers to an average value of two wavelengths showing a half-value transmittance: $T_{1/2}$(%) expressed by the following expression, in a case where a minimum value of the transmittance in a target object (member) is defined as $T_{min}$ (%).

Expression for calculating half-value transmittance: $T_{1/2}=100-(100-T_{min})/2$ In addition, among the visible light, light in a wavelength range of 420 nm or longer and shorter than 500 nm is blue light (B light), light in a wavelength range of 500 nm or longer and shorter than 600 nm is green light (G light), and light in a wavelength range of 600 nm or longer and shorter than 700 nm is red light (R light).

The first layer 400A and the second layer 400B included in the optically anisotropic layer 400 exhibit selective reflection of circularly polarized light that selectively reflects either one sense circularly polarized light of dextrorotatory circularly polarized light or levorotatory circularly polarized light, and transmits the other sense circularly polarized light.

The selective reflection center wavelength λ (selective reflection center wavelength) of the cholesteric liquid crystalline phase depends on a pitch P (=helical period) of the helical structure in the cholesteric liquid crystalline phase, and follows a relationship of $\lambda=n\times P$ between an average refractive index n of the cholesteric liquid crystalline phase and λ. As can be seen from this expression, the selective reflection center wavelength can be adjusted to a predetermined range by adjusting the n value and the P value.

In the present specification, the term "sense" may be used for the twisted direction of the helix of the cholesteric liquid crystalline phase. It allows to reflect dextrorotatory circularly polarized light and transmit levorotatory circularly polarized light in a case where the twisted direction (sense) of the helix of the cholesteric liquid crystalline phase is right-handed, whereas it allows to reflect levorotatory circularly polarized light and transmit dextrorotatory circularly polarized light in a case where the sense is left-handed.

In the optically anisotropic layer, it is preferable that the senses in the layers where the helical pitches of the cholesteric liquid crystalline phase are different are the same.

Since the helical pitch of the cholesteric liquid crystalline phase depends on the type of the chiral agent to be used together with the liquid crystal compound or the addition concentration thereof, a desired helical pitch can be obtained by adjusting these factors. As for the method for measuring helical sense and pitch, the methods described in "Easy Steps in Liquid Crystal Chemistry Experiment" p. 46, edited by The Japanese Liquid Crystal Society, published by Sigma Publishing Company, 2007, and "Liquid Crystal Handbook" p. 196, Editorial Committee of Liquid Crystal Handbook, published by Maruzen Co., Ltd. can be used.

The method for producing the third embodiment of the optically anisotropic layer is not particularly limited, and is preferably a production method having the following steps 1B to 5B.

Step 1B: a step of forming a composition layer containing a chiral agent containing at least a photosensitive chiral agent whose helical twisting power changes upon irradiation with light and a liquid crystal compound having a polymerizable group Step 2B: a step of subjecting the composition layer to a heat treatment to align the liquid crystal compound in the composition layer to form a cholesteric liquid crystalline phase Step 3B: a step of irradiating the composition layer with light for 50 seconds or less and at an irradiation amount of 300 mJ/cm$^2$ or less under the condition that the oxygen concentration is 1% by volume or more, after the step 2B Step 4B: a step of subjecting the composition layer to a heat treatment at a temperature higher than that upon irradiation with light, after the step 3B Step 5B: a step of subjecting the composition layer to a curing treatment to form an optically anisotropic layer, after the step 4B As will be described later, in the third embodiment, in order to produce the optically anisotropic layer having the above-described properties, the total content of the chiral agent (total content of all the chiral agents) in the composition layer is preferably more than 5.0% by mass with respect to the total mass of the liquid crystal compound.

The main difference between the first embodiment and the third embodiment is the content of the chiral agent.

Hereinafter, the procedure of each of the above-mentioned steps will be described in detail.

<Step 1B>

The step 1B is a step of forming a composition layer containing a chiral agent containing at least a photosensitive chiral agent whose helical twisting power changes upon irradiation with light and a liquid crystal compound having a polymerizable group. Carrying out this step leads to the formation of a composition layer to be subjected to a light irradiation treatment which will be described later.

The chiral agent (chiral agent A and chiral agent B) and the liquid crystal compound contained in the composition layer are as described in the step 1A.

In addition, the composition layer may contain components other than the chiral agent and the liquid crystal compound, as described in the step 1A.

In the step 1B, the chiral agent is contained in the composition layer so that a cholesteric liquid crystalline phase is formed in the step 2B which will be described later.

In the second embodiment, the total content of the chiral agent (total content of all the chiral agents) in the composition layer is not particularly limited and is preferably more than 5.0% by mass, more preferably 5.5% by mass or more, and still more preferably 6.0% by mass or more with respect to the total mass of the liquid crystal compound, from the viewpoint that it is easy to control the alignment state of the liquid crystal compound. The upper limit of the total content of the chiral agent is not particularly limited, and is preferably 25% by mass or less, more preferably 20% by mass or less, and still more preferably 15% by mass or less.

The content of the chiral agent A in the chiral agent is not particularly limited, and is preferably 5% to 95% by mass and more preferably 10% to 90% by mass with respect to the total mass of the chiral agent, from the viewpoint that it is easy to control the alignment state of the liquid crystal compound.

The absolute value of the helical twisting power of the chiral agent in the composition layer formed in the step 1B is preferably 10 $\mu m^{-1}$ or more, more preferably 15 $\mu m^{-1}$ or more, and still more preferably 20 $\mu m^{-1}$ or more. The upper limit of the absolute value of the helical twisting power of the chiral agent is not particularly limited, and is often 250 $\mu m^{-1}$ or less and more often 200 $\mu m^{-1}$ or less.

In addition, in a case where two or more types of chiral agents are contained in the composition, the absolute value of the weighted average helical twisting power of the chiral agents in the composition layer formed in the step 1B is preferably within the above-described range.

The definition of the weighted average helical twisting power is as described above.

Examples of the method for forming the composition layer in the step 1B include the same forming method as the method for forming the composition layer in the above-described step 1A.

<Step 2B>

The step 2B is a step of subjecting the composition layer to a heat treatment to align the liquid crystal compound in the composition layer to form a cholesteric liquid crystalline phase. Carrying out this step brings the liquid crystal compound in the composition layer into a predetermined alignment state.

With regard to heat treatment conditions, the optimum conditions are selected according to the liquid crystal compound used.

Above all, the heating temperature is often 25° C. to 250° C., more often 40° C. to 150° C., and still more often 50° C. to 130° C.

The heating time is often 0.1 to 60 minutes and more often 0.2 to 5 minutes.

<Step 3B>

The step 3B is a step of irradiating the composition layer with light for 50 seconds or less and at an irradiation amount of 300 $mJ/cm^2$ or less under the condition that the oxygen concentration is 1% by volume or more, after the step 2B. In the following, the mechanism of this step will be described with reference to the accompanying drawings.

Figure 14:
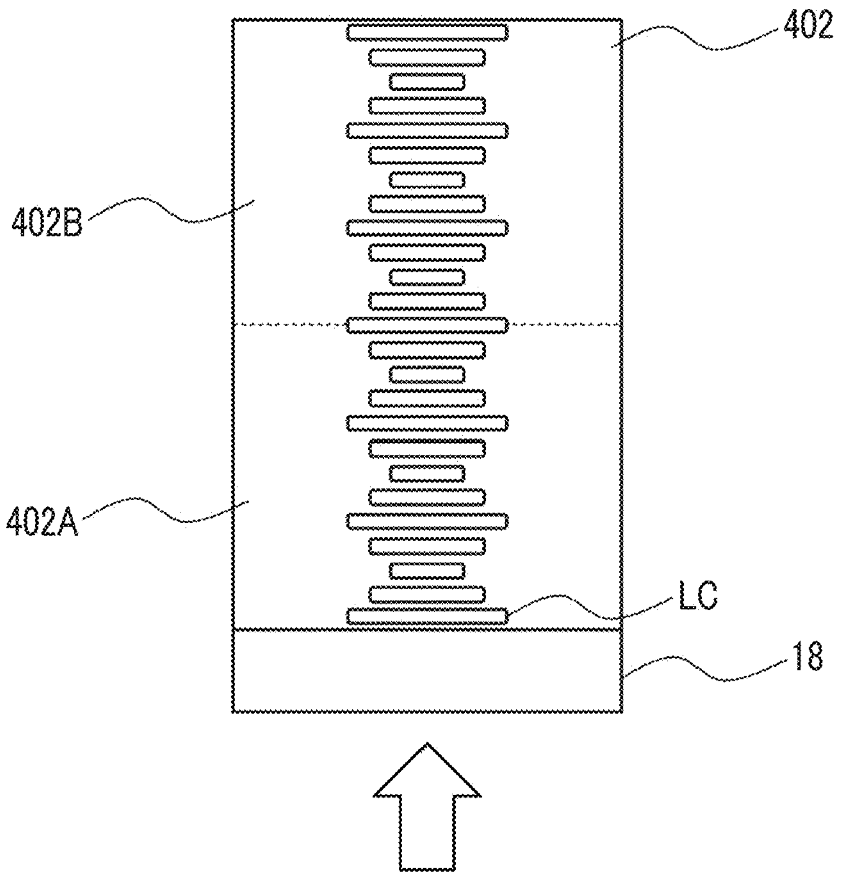
FIG. 14 is a cross-sectional view of a composition layer for explaining an example of a step 3B of a method for producing the third embodiment of the optically anisotropic layer.

As shown in FIG. 14, in the step 3B, light irradiation is carried out from the direction opposite to a composition layer 402 side of the substrate 18 (the direction of the white arrow in FIG. 14) under the condition that the oxygen concentration is 1% by volume or more. Although the light irradiation is carried out from the substrate 18 side in FIG. 14, the light irradiation may be carried out from the composition layer 402 side.

At that time, in a case where a lower region 402A of the composition layer 402 on the substrate 18 side and an upper region 402B of the composition layer 402 opposite to the substrate 18 side are compared, the surface of the upper region 402B is on the air side, so that the oxygen concentration in the upper region 402B is high and the oxygen concentration in the lower region 402A is low. Therefore, in a case where the composition layer 402 is irradiated with light, the polymerization of the liquid crystal compound easily proceeds in the lower region 402A, and the alignment state of the liquid crystal compound is fixed. The chiral agent A is also present in the lower region 402A, and the chiral agent A is also photosensitized, resulting in a change in the helical twisting power. However, since the alignment state of the liquid crystal compound is fixed in the lower region 402A, there is no change in the alignment state of the liquid crystal compound even in a case where the step 4B of subjecting the light-irradiated composition layer to a heat treatment, which will be described later, is carried out.

In addition, since the oxygen concentration is high in the upper region 402B, the polymerization of the liquid crystal compound is inhibited by oxygen and therefore the polymerization does not proceed easily even in a case where light irradiation is carried out. Since the chiral agent A is also present in the upper region 402B, the chiral agent A is photosensitized, resulting in a change in the helical twisting power. Therefore, in a case where the step 4B which will be described later is carried out, the alignment state of the liquid crystal compound changes along with the changed helical twisting power.

That is, the immobilization of the alignment state of the liquid crystal compound is likely to proceed in the substrate-side region (lower region) of the composition layer by carrying out the step 3B. In addition, the immobilization of the alignment state of the liquid crystal compound is difficult to proceed in the region of the composition layer (upper region) opposite to the substrate side, and the helical twisting power changes according to the photosensitized chiral agent A.

Various conditions (oxygen concentration, irradiation time, irradiation amount, and the like) of light irradiation in the step 3B are the same as various conditions of light irradiation in the above-described step 3A.

<Step 4B>

The step 4B is a step of subjecting the composition layer to a heat treatment at a temperature higher than that upon irradiation with light, after the step 3B. Carrying out this step leads to a change in the alignment state of the liquid crystal compound in the region where the helical twisting power of the chiral agent A in the composition layer subjected to light irradiation changes. More specifically, this step is a step of subjecting the composition layer after the step 3B to a heat treatment at a temperature higher than that at the time of irradiation to align the liquid crystal compound in the composition layer not fixed in the step 3B.

In the following, the mechanism of this step will be described with reference to the accompanying drawings.

As described above, in a case where the step 3B is carried out on the composition layer 402 shown in FIG. 14, the alignment state of the liquid crystal compound is fixed in the lower region 402A, whereas the polymerization of the liquid crystal compound is difficult to proceed and the alignment state of the liquid crystal compound is not fixed in the upper region 402B. In addition, the helical twisting power of the chiral agent A changes in the upper region 402B. In a case where such a change in the helical twisting power of the chiral agent A occurs, the force of twisting the liquid crystal compound changes in the upper region 402B, as compared with the state before light irradiation. This point will be described in more detail.

In the following description, a case where the composition layer 402 contains the chiral agent A whose induced helical direction is left-handed and whose helical twisting power is reduced upon irradiation with light will be described in detail.

Figure 16:
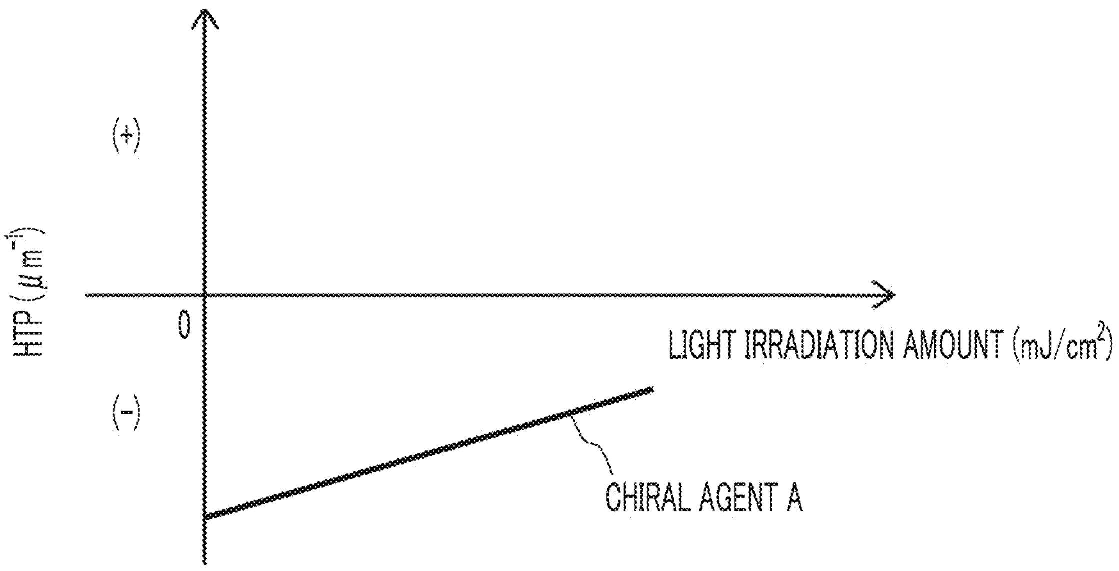
FIG. 16 is a schematic diagram of a graph plotting a relationship between the helical twisting power (HTP) ($\mu m^{-1}$) and the light irradiation amount ($mJ/cm^2$) for the chiral agent A.

In a case where light irradiation is carried out in the upper region 402B in such a state and then the helical twisting power of the chiral agent A decreases depending on the amount of light irradiation as shown in FIG. 16, the helical twisting power of the chiral agent in the upper region 402B decreases.

Figure 15:
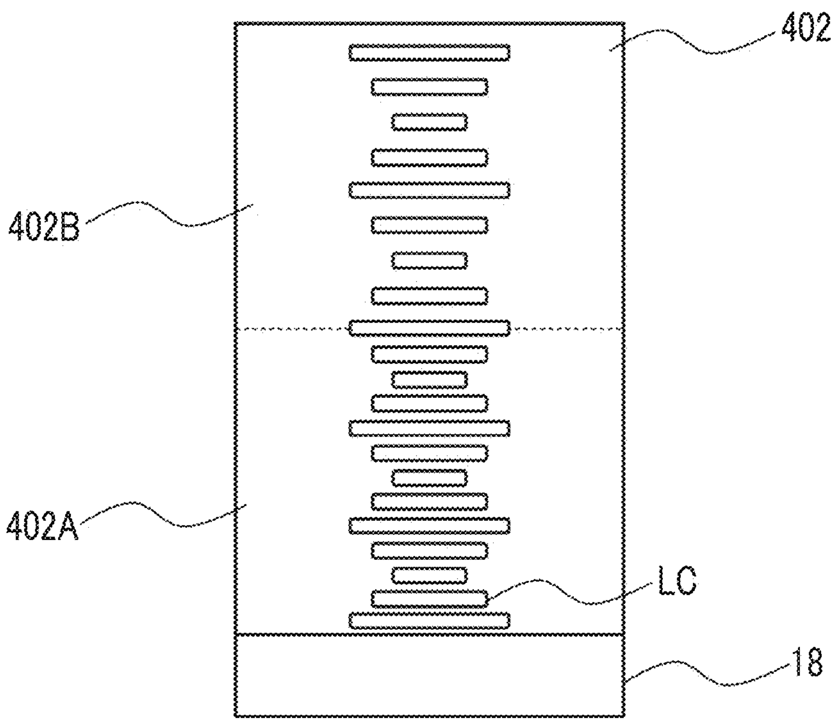
FIG. 15 is a cross-sectional view of a composition layer for explaining an example of a step 4B of the method for producing the third embodiment of the optically anisotropic layer.

Therefore, in a case where the composition layer 402 after the step 3B in which such a change in the helical twisting power occurred is subjected to a heat treatment to promote the realignment of the liquid crystal compound, the helical pitch of the cholesteric liquid crystalline phase increases in the upper region 402B, as shown in FIG. 15.

On the other hand, as described above, the polymerization of the liquid crystal compound proceeds to fix the alignment state of the liquid crystal compound during the step 3B in the lower region 402A of the composition layer 402, so that the realignment of the liquid crystal compound does not proceed.

As described above, carrying out the step 4B leads to the formation of a plurality of cholesteric liquid crystalline phases having different helical pitches along the thickness direction of the composition layer.

The aspect in which a chiral agent whose helical twisting power decreases upon irradiation with light is used as the chiral agent A has been described in FIG. 14 and FIG. 15, but the present invention is not limited to this aspect. For example, a chiral agent whose helical twisting power increases upon irradiation with light may be used as the chiral agent A.

In addition, the aspect in which a chiral agent whose induced helical direction is left-handed is used as the chiral agent A has been described in FIG. 14 and FIG. 15, but the present invention is not limited to this aspect. For example, a chiral agent whose induced helical direction is right-handed may be used as the chiral agent A.

In addition, the aspect in which only one type of chiral agent A is used has been described in FIG. 14 and FIG. 15, but the present invention is not limited to this aspect. For example, it may be an aspect in which two types of chiral agents A are used, or an aspect in which the chiral agent A and the chiral agent B are used in combination.

The heat treatment is carried out at a temperature higher than that at the time of light irradiation.

The difference between the temperature of the heat treatment and the temperature at the time of light irradiation is preferably 5° C. or more, more preferably 10° C. to 110° C., and still more preferably 20° C. to 110° C.

The temperature of the heat treatment is preferably a temperature which is higher than the temperature at the time of light irradiation and at which the non-fixed liquid crystal compound in the composition layer is aligned. More specifically, the temperature of the heat treatment is often 40° C. to 250° C., more often 50° C. to 150° C., still more often higher than 50° C. and lower than or equal to 150° C., and particularly often 60° C. to 130° C.

The heating time is often 0.01 to 60 minutes and more often 0.03 to 5 minutes.

In addition, the absolute value of the helical twisting power of the chiral agent in the composition layer after light irradiation is not particularly limited, and the absolute value of the difference between the helical twisting power of the chiral agent in the composition layer after light irradiation and the helical twisting power of the chiral agent in the composition layer before light irradiation is preferably 0.05 $\mu m^{-1}$ or more, more preferably 0.05 to 10.0 $\mu m^{-1}$, and still more preferably 0.1 to 10.0 $\mu m^{-1}$.

In a case where two or more types of chiral agents are contained in the composition, the absolute value of the difference between the weighted average helical twisting power of the chiral agent in the composition layer after light irradiation and the weighted average helical twisting power of the chiral agent in the composition layer before light irradiation is preferably 0.05 $\mu m^{-1}$ or more, more preferably 0.05 to 10.0 $\mu m^{-1}$, and still more preferably 0.1 to 10.0 $\mu m^{-1}$.

<Step 5B>

The step 5B is a step of subjecting the composition layer to a curing treatment to form an optically anisotropic layer, after the step 4B. By carrying out this step, the alignment state of the liquid crystal compound in the composition layer is fixed, and as a result, a predetermined optically anisotropic layer is formed. Carrying out this step leads to the formation of an optically anisotropic layer which is formed by fixing a cholesteric liquid crystalline phase, and has a plurality of layers in which helical pitches of the cholesteric liquid crystalline phase are different along a thickness direction. The length of the helical pitch in each layer formed is often constant. That is, carrying out this step makes it possible to form an optically anisotropic layer which is formed by fixing a cholesteric liquid crystalline phase and has two layers in which helical pitches of the cholesteric liquid crystalline phase are different along a thickness direction, each layer having a constant helical pitch.

Examples of the method of the curing treatment in the step 5B include the method of the curing treatment in the step 5A.

Fourth Embodiment

In the fourth embodiment of the optically anisotropic layer, the first layer and the second layer are optically anisotropic layers formed by fixing an alignment state in which a liquid crystal compound is aligned, and the tilt angle of an alignment direction of the liquid crystal compound with respect to a layer surface in the first layer is different from the tilt angle of an alignment direction of the liquid crystal compound with respect to a layer surface in the second layer.

Figure 17:
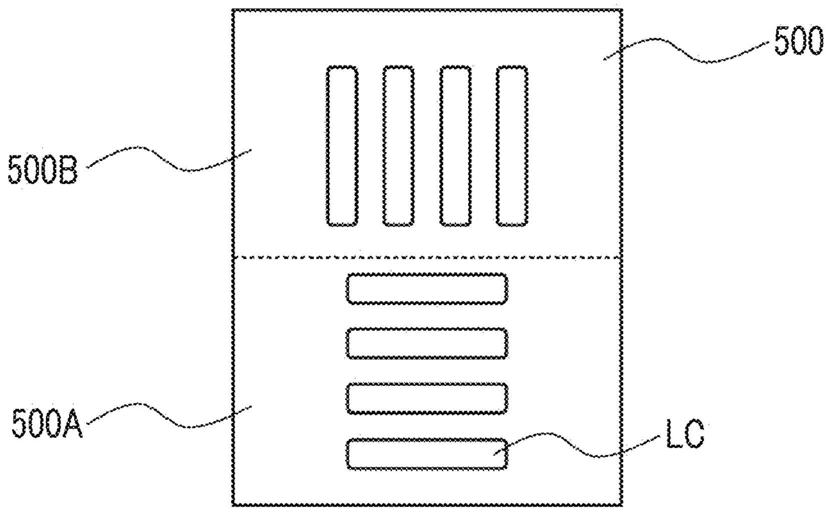
FIG. 17 is a cross-sectional view showing an example of a fourth embodiment of the optically anisotropic layer.

FIG. 17 shows an example of the fourth embodiment of the optically anisotropic layer.

An optically anisotropic layer 500 shown in FIG. 17 is an optically anisotropic layer formed by fixing the alignment state of the liquid crystal compound LC, and has a first layer 500A and a second layer 500B along a thickness direction. The first layer 500A is a layer formed by fixing an alignment state of a liquid crystal compound homogeneously aligned (horizontally aligned), and the second layer 500B is a layer formed by fixing an alignment state of a liquid crystal compound homeotropically aligned (vertically aligned).

The "homeotropic alignment" in the present specification refers to a state in which a molecular axis of a liquid crystal compound (for example, a major axis in a case of a rod-like liquid crystal compound) is arranged vertically and in the same direction with respect to the surface of the layer (optical uniaxiality).

Here, the "vertical" does not require that the molecular axis of the liquid crystal compound is strictly vertical with respect to the surface of the layer, but is intended to mean an alignment in which the tilt angle formed by the average molecular axis of the liquid crystal compound in the layer and the normal line of the surface of the layer is less than 20°.

In addition, the "same direction" does not require that the molecular axis of the liquid crystal compound is arranged strictly in the same direction with respect to the surface of the layer, but is intended to mean that, in a case where the direction of the molecular axis of the liquid crystal compound is measured at any 20 positions, the maximum difference among the directions of the molecular axis of the liquid crystal compound at 20 positions (the difference between the two directions of the molecular axis of the liquid crystal compound having a maximum difference among the 20 directions of the molecular axis of the liquid crystal compound) is less than 10°.

In a case where the thickness of the first layer 500A is defined as d1 and the in-plane refractive index anisotropy of the first layer 500A measured at a wavelength of 550 nm is defined as Δn1, the first layer 500A preferably satisfies Expression (1C-1) from the viewpoint that an optically anisotropic layer can be suitably applied to a circularly polarizing plate.

$$100\ \text{nm} \le \Delta n1d1 \le 180\ \text{nm} \qquad \text{Expression (1C-1)}$$

Above all, the first layer 500A more preferably satisfies Expression (1C-2).

$$110\ \text{nm} \le \Delta n1d1 \le 170\ \text{nm} \qquad \text{Expression (1C-2)}$$

In addition, in a case where the thickness of the second layer 500B is defined as d2 and the in-plane refractive index anisotropy of the second layer 500B measured at a wavelength of 550 nm is defined as Δn2, the second layer 500B preferably satisfies Expression (2C-1) from the viewpoint that an optically anisotropic layer can be suitably applied to a circularly polarizing plate.

$$0\ \text{nm} \le \Delta n2d2 \le 30\ \text{nm} \qquad \text{Expression (2C-1)}$$

Above all, the second layer 500B more preferably satisfies Expression (2C-2).

$$0\ \text{nm} \le \Delta n2d2 \le 20\ \text{nm} \qquad \text{Expression (2C-2)}$$

The thickness direction retardation of the second layer 500B at a wavelength of 550 nm is preferably −150 to −20 nm and more preferably −120 to −20 nm.

The fourth embodiment of the optically anisotropic layer preferably exhibits reverse wavelength dispersibility.

That is, it is preferable that Re(450), which is the in-plane retardation of the optically anisotropic layer measured at a wavelength of 450 nm, Re(550), which is the in-plane retardation of the optically anisotropic layer measured at a wavelength of 550 nm, and Re(650), which is the in-plane retardation of the optically anisotropic layer measured at a wavelength of 650 nm, have a relationship of Re (450)≤Re (550)≤Re(650).

The optical properties of the fourth embodiment of the optically anisotropic layer are not particularly limited, and it is preferable that the optically anisotropic layer functions as a λ/4 plate.

The 24 plate is a plate having a function of converting linearly polarized light having a certain specific wavelength into circularly polarized light (or converting circularly polarized light into linearly polarized light), and refers to a plate (optically anisotropic layer) in which an in-plane retardation Re(λ) at a specific wavelength 2 nm satisfies Re(λ)=λ/4.

This expression may be achieved at any wavelength in a visible light range (for example, 550 nm), and the in-plane retardation Re(550) at a wavelength of 550 nm preferably satisfies a relationship of 110 nm≤Re(550)≤180 nm.

In the above aspect, the optically anisotropic layer having, along a thickness direction, a layer formed by fixing an alignment state of a liquid crystal compound homeotropically aligned and a layer formed by fixing an alignment state of a liquid crystal compound homogeneously aligned has been described in detail, but the present invention is not limited to this aspect as long as the optically anisotropic layer includes two layers in which tilt angles of the alignment direction of the liquid crystal compound with respect to the surface of the layer are different.

For example, the optically anisotropic layer may be an optically anisotropic layer having a layer formed by fixing an alignment state of a liquid crystal compound tilt-aligned and a layer formed by fixing an alignment state of a liquid crystal compound homogeneously aligned.

The method for producing the fourth embodiment of the optically anisotropic layer is not particularly limited, and is preferably a production method having the following steps 1C to 5C.

Step 1C: a step of forming a composition layer containing a photosensitive compound whose polarity changes upon irradiation with light and a liquid crystal compound having a polymerizable group Step 2C: a step of subjecting the composition layer to a heat treatment to align the liquid crystal compound in the composition layer Step 3C: a step of irradiating the composition layer with light for 50 seconds or less and at an irradiation amount of 300 mJ/cm$^2$ or less under the condition that the oxygen concentration is 1% by volume or more, after the step 2C Step 4C: a step of subjecting the composition layer to a heat treatment at a temperature higher than that upon irradiation with light, after the step 3C Step 5C: a step of subjecting the composition layer to a curing treatment to form an optically anisotropic layer, after the step 4C As will be described later, a photosensitive compound whose polarity changes upon irradiation with light is used in the fourth embodiment.

Hereinafter, the procedure of each of the above-mentioned steps will be described in detail.

<Step 1C>

The step 1C is a step of forming a composition layer containing a photosensitive compound whose polarity changes upon irradiation with light and a liquid crystal compound having a polymerizable group. Carrying out this step leads to the formation of a composition layer to be subjected to a light irradiation treatment which will be described later.

The liquid crystal compound contained in the composition layer is as described in the step 1A.

In addition, as described in the step 1A, the composition layer may contain other components.

(Photosensitive Compound Whose Polarity Changes Upon Irradiation with Light)

The composition layer of the step 1C contains a photosensitive compound whose polarity changes upon irradiation with light (hereinafter, also referred to as "specific photosensitive compound").

The photosensitive compound whose polarity changes upon irradiation with light is a compound whose polarity changes before and after irradiation with light. As will be described later, in a case where the composition layer containing such a specific photosensitive compound is irradiated with light in the step 1C, the polarity of the specific photosensitive compound changes in the air-side region in the composition layer, and then in a case where the step 4C is carried out, the alignment direction of the liquid crystal compound is tilted or perpendicular to the surface of the layer as the polarity of the specific photosensitive compound changes.

The change in the polarity of the specific photosensitive compound may be a change that makes the specific photosensitive compound hydrophilized or a change that makes the specific photosensitive compound hydrophobized. Above all, the change that makes the specific photosensitive compound hydrophilized is preferable from the viewpoint that an alignment state of the liquid crystal compound in which the alignment direction of the liquid crystal compound is tilt-aligned or vertically aligned with respect to the surface of the layer can be easily formed.

A compound having a group that produces a hydrophilic group upon irradiation with light is preferable as the specific photosensitive compound that is hydrophilized upon irradiation with light. The type of the hydrophilic group is not particularly limited and may be any of a cationic group, an anionic group, and a nonionic group, more specific examples of which include a carboxylic acid group, a sulfonic acid group, a phosphonic acid group, an amino group, an ammonium group, an amide group, a thiol group, and a hydroxy group.

The specific photosensitive compound preferably has a fluorine atom or a silicon atom. In a case where the specific photosensitive compound has the above-described atom, the specific photosensitive compound is likely to be present at a higher density in the vicinity of the surface of the composition layer and therefore a desired optically anisotropic layer is likely to be formed.

A compound represented by Formula (X) is preferable as the specific photosensitive compound.

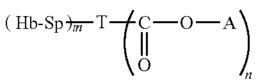

(X)

In Formula (X),

T represents an n+m-valent aromatic hydrocarbon group,

Sp represents a single bond or a divalent linking group,

Hb represents a fluorine-substituted alkyl group having 4 to 30 carbon atoms, m represents an integer of 1 to 4, n represents an integer of 1 to 4, and A represents a group represented by Formula (Y),

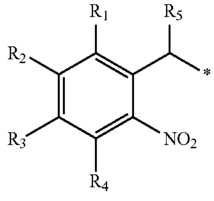

(Y)

In Formula (Y), $R_1$ to $R_5$ each independently represent a hydrogen atom or a monovalent substituent, and

* represents a bonding site.

In Formula (X), in a case where there are a plurality of each of Sp, Hb, or A, the plurality of Sp's, the plurality of Hb's, or the plurality of A's each may be the same as or different from each other.

In Formula (X), T represents an n+m-valent aromatic hydrocarbon group.

The aromatic hydrocarbon group is not particularly limited as long as it is a group obtained by removing n+m hydrogen atoms from the aromatic hydrocarbon ring. The aromatic hydrocarbon group preferably has 6 to 22 carbon atoms, more preferably 6 to 14 carbon atoms, and still more preferably 6 to 10 carbon atoms. It is particularly preferable that the aromatic hydrocarbon group is a benzene ring.

The aromatic hydrocarbon group may further have a substituent in addition to the group represented by -Sp-Hb and the group represented by —C(═O)O—A. Examples of the substituent include an alkyl group (for example, an alkyl group having 1 to 8 carbon atoms), an alkoxy group (for example, an alkoxy group having 1 to 8 carbon atoms), a halogen atom (for example, a fluorine atom, a chlorine atom, a bromine atom, or an iodine atom), a cyano group, and an acyloxy group (for example, an acetoxy group).

In Formula (X), Sp represents a single bond or a divalent linking group, and is preferably a divalent linking group.

The divalent linking group is not particularly limited, and is preferably a linking group selected from the group consisting of a linear or branched alkylene group (preferably having 1 to 20 carbon atoms, more preferably 1 to 10 carbon atoms, and still more preferably 1 to 6 carbon atoms), a linear or branched alkenylene group (preferably having 2 to 20 carbon atoms, more preferably 2 to 10 carbon atoms, and still more preferably 2 to 6 carbon atoms), a linear or branched alkynylene group (preferably having 2 to 20 carbon atoms, more preferably 2 to 10 carbon atoms, and still more preferably 2 to 6 carbon atoms), and a group in which one or two or more $—CH_2—$ in the foregoing alkylene group, alkenylene group, or alkynylene group are substituted with a "divalent organic group" shown below.

Above all, from the viewpoint of further improving the solubility, the divalent linking group is preferably an alkylene group having 1 to 10 carbon atoms in which one or two or more $—CH_2—$ are substituted with a "divalent organic group" shown below.

(Divalent Organic Group)

Examples of the divalent organic group include —O—, —S—, —C(═O)—, —C(═O)O—, —OC(═O)—, —C(═O)S—, —SC(═O)—, $—NR_6C(═O)—$, and $—C(═O)NR_6—$. Among the above divalent organic groups, —O—, —S—, —C(═O)—, —C(═O)O—, —OC(═O)—, —C(═O)S—, or SC(═O)—, is more preferable, —O—, —C(═O)—, —C(═O)O—, or OC(═O)— is still more preferable, and —O—, —C(═O)O—, or OC(═O)— is particularly preferable, from the viewpoint of further progress of hydrophilization.

In addition, $R_6$ represents a hydrogen atom or an alkyl group having 1 to 6 carbon atoms.

In a case where the divalent organic group is contained in the divalent linking group, it is preferable that the divalent organic groups are not adjacent to each other.

In Formula (X), Hb represents a fluorine-substituted alkyl group having 4 to 30 carbon atoms.

Hb preferably has 4 to 20 carbon atoms and more preferably 4 to 10 carbon atoms. Here, the fluorine-substituted alkyl group may be a perfluoroalkyl group in which all hydrogen atoms are substituted with fluorine atoms, or a fluoroalkyl group in which hydrogen atoms are partially substituted with fluorine atoms. In addition, the fluorine-substituted alkyl group may be chain-like, branched, or cyclic, and is preferably chain-like or branched and more preferably chain-like.

Above all, a structure that is a perfluoroalkyl group is preferable as the fluorine-substituted alkyl group.

In Formula (X), a suitable aspect of the group represented by -Sp-Hb is exemplified below.

In the following examples, * represents a connection position to T.

$(C_pF_{2p+1})—(CH_2)_q—O—(CH_2)_r—O—*$ $(C_pF_{2p+1})—(CH_2)_q—C(=O)O—(CH_2)_r—C(=O)O—*$ $(C_pF_{2p+1})—(CH_2)_q—OC(=O)—(CH_2)_r—C(=O)O—*$ $(C_pF_{2p+1})—(CH_2)_q—OC(=O)—(CH_2)_r—OC(=O)—*$

In the group represented by -Sp-Hb, p is preferably 4 to 30, more preferably 4 to 20, and still more preferably 4 to 10. q is preferably 0 to 6, more preferably 0 to 4, and still more preferably 0 to 3. r is preferably 1 to 6, more preferably 1 to 4, and still more preferably 1 to 3.

In addition, the total number of carbon atoms in the portion other than the perfluoro group is preferably 10 or less.

In Formula (X), n and m each independently represent an integer of 1 to 4.

From the viewpoint that hydrophilization further progresses, n is preferably 2 or more. m is preferably 1 to 3 and more preferably 2.

In Formula (X), A represents a group represented by Formula (Y).

Hereinafter, Formula (Y) will be described.

In Formula (Y), $R_1$ to $R_5$ each independently represent a hydrogen atom or a monovalent substituent. The monovalent substituent represented by $R_1$ to $R_5$ is not particularly limited.

Examples of the monovalent substituent represented by $R_1$ to $R_4$ include a halogen atom (for example, a fluorine atom, a chlorine atom, a bromine atom, or an iodine atom), a hydroxyl group, a cyano group, a substituted or unsubstituted amino group (which is represented by $—N(R_A)_2$ where two $R_A$'s each independently represent a hydrogen atom or a monovalent organic group (for example, an alkyl group having 1 to 5 carbon atoms as the monovalent organic group), an alkoxy group having 1 to 8 carbon atoms (for example, a methoxy group or an ethoxy group), an amide group having 2 to 8 carbon atoms (for example, $—N(R_B)C(=O)R_C$ where $R_B$ represents a hydrogen atom or a monovalent organic group (for example, an alkyl group having 1 to 5 carbon atoms as the monovalent organic group), and $R_C$ represents a monovalent organic group (for example, an alkyl group having 1 to 5 carbon atoms as the monovalent organic group) or $—C(=O)N(R_D)_2$ where two $R_D$'s each independently represent a hydrogen atom or a monovalent organic group (for example, an alkyl group having 1 to 5 carbon atoms)), an alkoxycarbonyl group having 2 to 8 carbon atoms (for example, $—C(=O)OCH_3$), an acyloxy group having 2 to 8 carbon atoms (for example, $—OC(=O)CH_3$), and $-Sp_A-Hb_A$.

$Sp_A$ and $Hb_A$ each have the same definition as Sp and Hb of Formula (X), and preferred aspects thereof are also the same. In Formula (Y), in a case where a plurality of $R_1$ to $R_4$ represent $-Sp_A-Hb_A$ a plurality of $Sp_A$'s and a plurality of $Hb_A$'s each may be the same as or different from each other.

Above all, $R_1$ to $R_4$ are preferably each independently a hydrogen atom, a halogen atom, a hydroxyl group, a cyano group, an alkoxy group $—NH_2$, $—NH(CH_3)$, $—N(CH_3)_2$, $—C(=O)OCH_3$, $—OC(=O)CH_3$, $—NHC(=O)CH_3$, $—N(CH_3)C(=O)CH_3$, or $-Sp_A-Hb_A$.

In particular, from the viewpoint that the decomposition rate of the compound represented by Formula (X) upon exposure to light is further increased to further promote hydrophilization and/or the aligning properties are further enhanced, $R_1$ to $R_4$ are more preferably each independently $—OCH_3$ or $-Sp_A-Hb_A$. In a case of $—OCH_3$, since an ether oxygen is contained in the structure thereof (in particular, the position bonded to the benzene ring in Formula (Y) is an ether oxygen), the decomposition rate of the compound represented by Formula (X) upon exposure to light tends to further increase to further promote hydrophilization. On the other hand, in a case of $-Sp_A-Hb_A$, the aligning properties tend to be further increased due to the presence of $Hb_A$. In a case where $Sp_A$ contains an ether oxygen in the structure thereof (in particular, in a case where an ether oxygen is contained at the terminal of $Sp_A$ opposite to the side bonded to $Hb_A$ (in other words, the terminal on the side connected to the benzene ring of Formula (Y)), the effect of accelerating the decomposition rate is obtained, as in the case of $—OCH_3$.

Further, from the viewpoint that the decomposition rate of the compound represented by Formula (X) upon exposure to light is further increased to further promote hydrophilization, it is preferable that at least two of $R_1$ to $R_4$ are each independently $—OCH_3$ or $-Sp_B-Hb_B$ and it is more preferable that $R_2$ and $R_3$ are each independently $—OCH_3$ or $-Sp_B-Hb_B$.

Here, $Sp_B$represents an alkylene group having 1 to 10 carbon atoms in which $—CH_2—$ is substituted with —O—. Above all, as described above, in a case where an ether oxygen is contained at the terminal of $Sp_B$ opposite to the side bonded to $Hb_B$ (in other words, the terminal on the side connected to the benzene ring of Formula (Y)), the effect of accelerating the decomposition rate is obtained more remarkably, and therefore the hydrophilization proceeds further. In a case where $—CH_2—$ in the alkylene group is substituted with a plurality of —O—'s, it is preferable that —O—'s are not adjacent to each other. The alkylene group more preferably has 1 to 7 carbon atoms, still more preferably 1 to 6 carbon atoms, and particularly preferably 1 to 4 carbon atoms. In addition, the alkylene group may be linear or branched, and is preferably linear $Hb_B$ represents a fluorine-substituted alkyl group having 4 to 30 carbon atoms. The suitable aspect of $Hb_B$ is the same as that of Hb of Formula (X) described above.

In Formula (Y), in a case where a plurality of $R_1$ to $R_4$ represent $-Sp_B-Hb_B$, a plurality of $Sp_B$'s and a plurality of $Hb_B$'s each may be the same as or different from each other.

Above all, from the viewpoint of accelerating the decomposition rate of the compound represented by Formula (X) upon exposure to light to further promote hydrophilization and further enhancing the aligning properties, it is preferable that at least two of $R_1$ to $R_4$ are $-Sp_B-Hp_B$ and it is more preferable that both $R_2$ and $R_3$ are $-Sp_B-Hb_B$. In particular, a structure represented by Formula (Z) is preferable as $-Sp_B-Hb_B$.

$$(C_pF_{2p+1})—(CH_2)_q—O—(CH_2)_r—O—* \quad \text{Expression (Z)}$$

In Formula (Z), p is preferably 4 to 30, more preferably 4 to 20, and still more preferably 4 to 10. q is preferably 0 to 5, more preferably 0 to 4, and still more preferably 0 to 3. r is preferably 1 to 5, more preferably 1 to 4, and still more preferably 1 to 3.

In Formula (Y), $R_5$ is preferably a hydrogen atom, a methyl group, an ethyl group, or an aromatic group.

The aromatic group is not particularly limited, and is preferably an aromatic group having 6 to 14 carbon atoms, more preferably an aromatic group having 6 to 10 carbon atoms, and still more preferably a phenyl group.

Above all, from the viewpoint of accelerating the decomposition rate of the compound represented by Formula (X) upon exposure to light to further promote hydrophilization, $R_5$ is preferably a methyl group, an ethyl group, or an aromatic group, more preferably an ethyl group or an aromatic group, and still more preferably an aromatic group.

In addition, in Formula (Y), * represents a bonding site with C(=O) O— in Formula (X).

The compound represented by Formula (X) may have a molecular structure having symmetry or may have a molecular structure having asymmetry. Here, the "symmetry" means that it corresponds to any of point symmetry, line symmetry, and rotational symmetry, and the "asymmetry means that it does not correspond to any of point symmetry, line symmetry, and rotational symmetry.

In addition, in the compound represented by Formula (X), in a case where there are a plurality of each of Sp, Hb, or A, the plurality of Sp's, the plurality of Hb's, or the plurality of A's each may be the same as or different from each other.

The content of the specific photosensitive compound in the composition layer can be appropriately set according to the properties (for example, retardation and wavelength dispersion) of an optically anisotropic layer to be formed.

Above all, from the viewpoint that it is easier to form an optically anisotropic layer having a predetermined structure, the content of the specific photosensitive compound is preferably 0.01% to 10% by mass and more preferably 0.05% to 5% by mass with respect to the total mass of the liquid crystal compound.

In the step 1A, a composition layer containing the above-mentioned components is formed, but the procedure is not particularly limited. For example, a method of applying a composition containing the above-mentioned specific photosensitive compound and liquid crystal compound having a polymerizable group onto a substrate, followed by a drying treatment if necessary (hereinafter, also simply referred to as "coating method"), and a method of separately forming a composition layer and transferring the formed layer onto a substrate can be mentioned. Above all, the coating method is preferable from the viewpoint of productivity.

Hereinafter, the coating method will be described in detail.

The composition used in the coating method contains the above-mentioned specific photosensitive compound, liquid crystal compound having a polymerizable group, and other components used as necessary (for example, a polymerization initiator, a polymerizable monomer, a surfactant, and a polymer).

The content of each component in the composition is preferably adjusted to be the content of each component in the composition layer described above.

The coating method is not particularly limited, and examples thereof include a wire bar coating method, an extrusion coating method, a direct gravure coating method, a reverse gravure coating method, and a die-coating method.

If necessary, a treatment for drying the coating film applied onto the substrate may be carried out after application of the composition. The solvent can be removed from the coating film by carrying out the drying treatment.

The film thickness of the coating film is not particularly limited and is preferably 0.1 to 20 μm, more preferably 0.2 to 15 μm, and still more preferably 0.5 to 10 μm.

<Step 2C>

Figure 18:
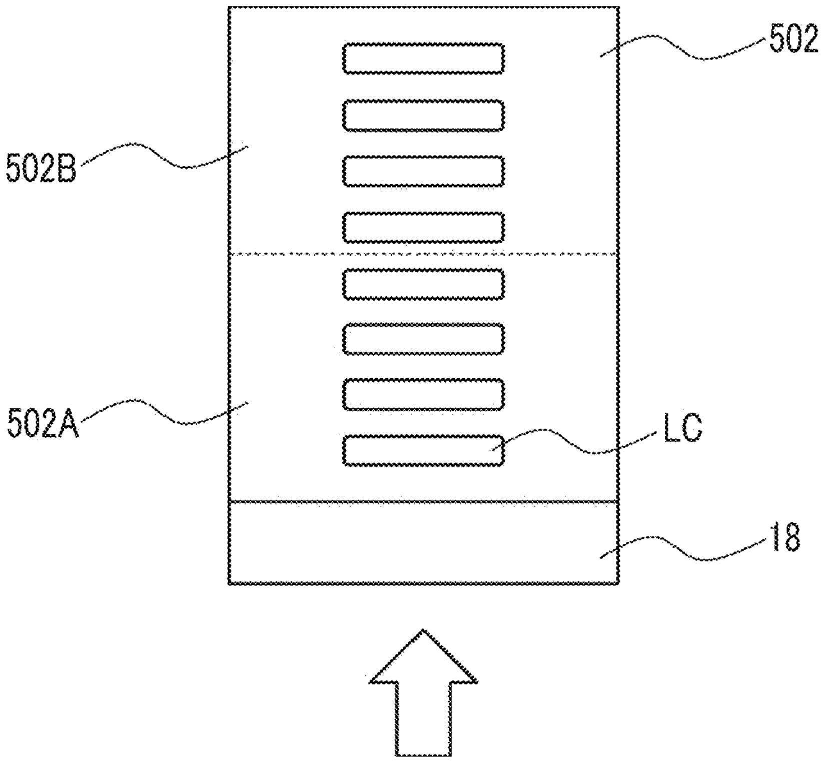
FIG. 18 is a cross-sectional view of a composition layer for explaining an example of a step 3C of a method for producing the fourth embodiment of the optically anisotropic layer.

The step 2C is a step of subjecting the composition layer to a heat treatment to align the liquid crystal compound in the composition layer. Carrying out this step brings the liquid crystal compound in the composition layer into a predetermined alignment state. As shown in FIG. 18 which will be described later, for example, the liquid crystal compound is homogeneously aligned in the composition by carrying out the step 2C.

With regard to heat treatment conditions, the optimum conditions are selected according to the liquid crystal compound used.

Above all, the heating temperature is often 25° C. to 250° C., more often 40° C. to 150° C., and still more often 50° C. to 130° C.

The heating time is often 0.1 to 60 minutes and more often 0.2 to 5 minutes.

<Step 3C>

The step 3C is a step of irradiating the composition layer with light for 50 seconds or less and at an irradiation amount of 300 mJ/cm$^2$ or less under the condition that the oxygen concentration is 1% by volume or more, after the step 2C. In the following, the mechanism of this step will be described with reference to the accompanying drawings. In the following, a case where the composition layer contains a compound that is hydrophilized upon irradiation with light will be described as an example. In FIG. 18, the liquid crystal compound LC is homogeneously aligned in the composition layer.

As shown in FIG. 18, in the step 3C, light irradiation is carried out from the direction opposite to a composition layer 502 side of the substrate 18 (the direction of the white arrow in FIG. 18) under the condition that the oxygen concentration is 1% by volume or more. Although the light irradiation is carried out from the substrate 18 side in FIG. 18, the light irradiation may be carried out from the composition layer 502 side.

At that time, in a case where a lower region 502A of the composition layer 502 on the substrate 18 side and an upper region 502B of the composition layer 502 opposite to the substrate 18 side are compared, the surface of the upper region 502B is on the air side, so that the oxygen concentration in the upper region 502B is high and the oxygen concentration in the lower region 502A is low. Therefore, in a case where the composition layer 502 is irradiated with light, the polymerization of the liquid crystal compound easily proceeds in the lower region 502A, and the alignment state of the liquid crystal compound is fixed. It should be noted that the specific photosensitive compound is also present in the lower region 502A, so that the specific photosensitive compound is also photosensitized and therefore hydrophilization proceeds. However, since the alignment state of the liquid crystal compound is fixed in the lower region 502A, there is no change in the alignment state of the liquid crystal compound even in a case where the step 4C of subjecting the light-irradiated composition layer to a heat treatment, which will be described later, is carried out.

In addition, since the oxygen concentration is high in the upper region 502B, the polymerization of the liquid crystal compound is inhibited by oxygen and therefore the polymerization does not proceed easily even in a case where light irradiation is carried out. Further, the specific photosensitive compound is also present in the upper region 502B, so that the specific photosensitive compound is photosensitized and therefore hydrophilization proceeds. Therefore, in a case where the step 4C which will be described later is carried out, the alignment state of the liquid crystal compound changes under the influence of the changed polarity.

That is, the immobilization of the alignment state of the liquid crystal compound is likely to proceed in the substrate-side region (lower region) of the composition layer by carrying out the step 3C. In addition, in the region of the composition layer (upper region) opposite to the substrate side, the immobilization of the alignment state of the liquid crystal compound is difficult to proceed, and the polarity changes according to the photosensitized specific photosensitive compound.

Various conditions (oxygen concentration, irradiation time, irradiation amount, and the like) of light irradiation in the step 3C are the same as various conditions of light irradiation in the above-described step 3A.

<Step 4C>

The step 4C is a step of subjecting the composition layer to a heat treatment at a temperature higher than that upon irradiation with light, after the step 3C. Carrying out this step leads to a change in the alignment state of the liquid crystal compound in a region whose polarity has been changed due to the specific photosensitive compound in the composition layer that has been subjected to light irradiation. More specifically, this step is a step of subjecting the composition layer after the step 3C to a heat treatment at a temperature higher than that at the time of irradiation to align the liquid crystal compound in the composition layer not fixed in the step 3C.

In the following, the mechanism of this step will be described with reference to the accompanying drawings.

As described above, in a case where the step 3C is carried out on the composition layer 502 shown in FIG. 18, the alignment state of the liquid crystal compound is fixed in the lower region 502A, whereas the polymerization of the liquid crystal compound is difficult to proceed and the alignment state of the liquid crystal compound is not fixed in the upper region 502B. In addition, in the upper region 502B, the specific photosensitive compound is photosensitized and is hydrophilized. In a case where such a change in polarity occurs, the alignment direction of the liquid crystal compound is affected in the upper region 502B, as compared with the state before light irradiation. This point will be described in more detail. In the following, the case where the composition layer contains a specific photosensitive compound that is hydrophilized upon irradiation with light, as described above, will be described as an example.

Figure 19:
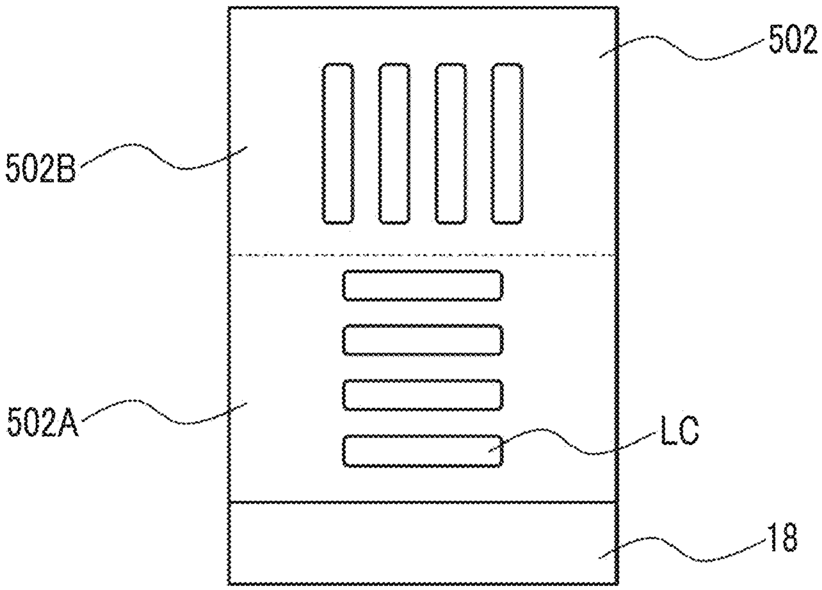
FIG. 19 is a cross-sectional view of a composition layer for explaining an example of a step 4C of the method for producing the fourth embodiment of the optically anisotropic layer.

In a case where the composition layer contains a specific photosensitive compound that is hydrophilized upon irradiation with light, the liquid crystal compound is homeotropically aligned in the upper region 502B, as shown in FIG. 19, in a case where the step 4C is carried out. In particular, in a case where the specific photosensitive compound is present in the vicinity of the surface of the composition layer, the liquid crystal compound is likely to be homeotropically aligned.

On the other hand, as described above, the polymerization of the liquid crystal compound proceeds to fix the alignment state of the liquid crystal compound during the step 3C in the lower region 502A of the composition layer 502, so that the realignment of the liquid crystal compound does not proceed.

As described above, carrying out the step 4C leads to the formation of a region containing a liquid crystal compound whose alignment direction is tilt-aligned or vertically aligned with respect to the surface of the layer.

The aspect in which the liquid crystal compound is homeotropically aligned has been described in FIG. 19, but the present invention is not limited to this aspect. For example, it may be an aspect in which the liquid crystal compound is tilt-aligned.

The heat treatment is carried out at a temperature higher than that at the time of light irradiation.

The difference between the temperature of the heat treatment and the temperature at the time of light irradiation is preferably 5° C. or more, more preferably 10° C. to 110° C., and still more preferably 20° C. to 110° C.

The temperature of the heat treatment is preferably a temperature which is higher than the temperature at the time of light irradiation and at which the non-fixed liquid crystal compound in the composition layer is aligned. More specifically, the temperature of the heat treatment is often 40° C. to 250° C., more often 50° C. to 150° C., still more often higher than 50° C. and lower than or equal to 150° C., and particularly often 60° C. to 130° C.

The heating time is often 0.01 to 60 minutes and more often 0.03 to 5 minutes.

<Step 5C>

The step 5C is a step of subjecting the composition layer to a curing treatment to form an optically anisotropic layer, after the step 4C. By carrying out this step, the alignment state of the liquid crystal compound in the composition layer is fixed, and as a result, a predetermined optically anisotropic layer is formed. Carrying out this step leads to the formation of an optically anisotropic layer having two layers having different tilt angles of the alignment direction of the liquid crystal compound with respect to the surface of the layer, along a thickness direction. In particular, carrying out this step can lead to the formation of an optically anisotropic layer having, along a thickness direction, a layer formed by fixing the alignment state of a liquid crystal compound homeotropically aligned or tilt-aligned and a layer formed by fixing the alignment state of a liquid crystal compound homogeneously aligned.

Examples of the method of the curing treatment in the step 5C include the method of the curing treatment in the step 5A.

Fifth Embodiment

In the fifth embodiment of the optically anisotropic layer, the first layer is a layer formed by fixing an alignment state in which a liquid crystal compound is aligned, and the second layer is a layer formed by fixing a state in which the liquid crystal compound exhibits an isotropic phase.

Figure 20:
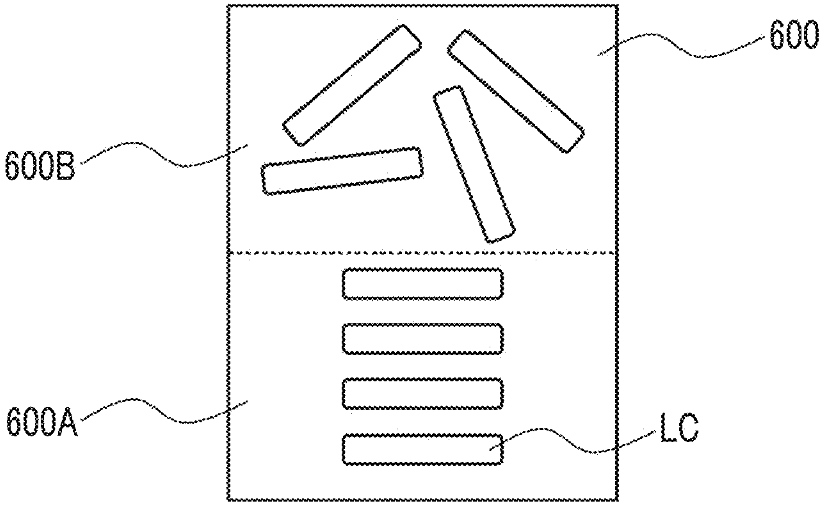
FIG. 20 is a cross-sectional view showing an example of a fifth embodiment of the optically anisotropic layer.

FIG. 20 shows an example of the fifth embodiment of the optically anisotropic layer.

An optically anisotropic layer 600 shown in FIG. 20 is an optically anisotropic layer formed of a liquid crystal compound and has a first layer 600A and a second layer 600B along a thickness direction. The first layer 600A is a layer formed by fixing an alignment state of a liquid crystal compound homogeneously aligned, and the second layer 600B is a layer formed by fixing a state in which the liquid crystal compound exhibits an isotropic phase.

In FIG. 20, the aspect of the optically anisotropic layer having, along a thickness direction, a layer formed by fixing an alignment state of a liquid crystal compound homogeneously aligned and a layer formed by fixing a state in which the liquid crystal compound exhibits an isotropic phase has been described, but the present invention is not limited to this aspect as long as it includes the layer formed by fixing a state in which the liquid crystal compound exhibits an isotropic phase. For example, the optically anisotropic layer may be an optically anisotropic layer having, along a thickness direction, a layer formed by fixing an alignment state of a liquid crystal compound homeotropically aligned and a layer formed by fixing a state in which the liquid crystal compound exhibits an isotropic phase. In addition, the optically anisotropic layer may be an optically anisotropic layer having, along a thickness direction, a layer formed by fixing a cholesteric liquid crystalline phase formed of a liquid crystal compound and a layer formed by fixing a state in which the liquid crystal compound exhibits an isotropic phase. In addition, the optically anisotropic layer may be an optically anisotropic layer having, along a thickness direction, a layer formed by fixing an alignment state of a liquid crystal compound twist-aligned along a helical axis extending along a thickness direction and a layer formed by fixing a state in which the liquid crystal compound exhibits an isotropic phase.

The optical properties of the fifth embodiment of the optically anisotropic layer are not particularly limited, and it is preferable that the optically anisotropic layer functions as a λ/4 plate.

The λ/4 plate is a plate having a function of converting linearly polarized light having a certain specific wavelength into circularly polarized light (or converting circularly polarized light into linearly polarized light), and refers to a plate (optically anisotropic layer) in which an in-plane retardation Re(λ) at a specific wavelength λ nm satisfies Re(λ)=λ/4.

This expression may be achieved at any wavelength in a visible light range (for example, 550 nm), and the in-plane retardation Re(550) at a wavelength of 550 nm preferably satisfies a relationship of 110 nm≤Re(550)≤180 nm.

The method for producing the fifth embodiment of the optically anisotropic layer is not particularly limited, and is preferably a production method having the following steps 1D to 5D.

Step 1D: a step of forming a composition layer containing a liquid crystal compound having a polymerizable group Step 2D: a step of subjecting the composition layer to a heat treatment to align the liquid crystal compound in the composition layer Step 3D: a step of irradiating the composition layer with light for 50 seconds or less and at an irradiation amount of 300 mJ/cm$^2$ or less under the condition that the oxygen concentration is 1% by volume or more, after the step 2D Step 4D: a step of subjecting the composition layer to a heat treatment at a temperature higher than that at the time of light irradiation and equal to or higher than the temperature at which the liquid crystal compound is brought into an isotropic phase, after the step 3D Step 5D: a step of subjecting the composition layer to a curing treatment to form an optically anisotropic layer, after the step 4D Hereinafter, the procedure of each of the above-mentioned steps will be described in detail.

<Step 1D>

The step 1D is a step of forming a composition layer containing a liquid crystal compound having a polymerizable group. Carrying out this step leads to the formation of a composition layer to be subjected to a light irradiation treatment which will be described later.

The liquid crystal compound contained in the composition layer is as described in the step 1A.

In addition, the composition layer may contain components other than the liquid crystal compound, as described in the step 1A.

In the step 1A, a composition layer containing the above-mentioned components is formed, but the procedure is not particularly limited. For example, a method of applying a composition containing the above-mentioned liquid crystal compound having a polymerizable group onto a substrate, followed by a drying treatment if necessary (hereinafter, also simply referred to as "coating method"), and a method of separately forming a composition layer and transferring the formed layer onto a substrate can be mentioned. Above all, the coating method is preferable from the viewpoint of productivity.

Hereinafter, the coating method will be described in detail.

The composition used in the coating method contains the above-mentioned liquid crystal compound having a polymerizable group and other components used as necessary (for example, a polymerization initiator, a polymerizable monomer, a surfactant, and a polymer).

The content of each component in the composition is preferably adjusted to be the content of each component in the composition layer described above.

The coating method is not particularly limited, and examples thereof include a wire bar coating method, an extrusion coating method, a direct gravure coating method, a reverse gravure coating method, and a die-coating method.

If necessary, a treatment for drying the coating film applied onto the substrate may be carried out after application of the composition. The solvent can be removed from the coating film by carrying out the drying treatment.

The film thickness of the coating film is not particularly limited and is preferably 0.1 to 20 μm, more preferably 0.2 to 15 μm, and still more preferably 0.5 to 10 μm.

<Step 2D>

Figure 21:
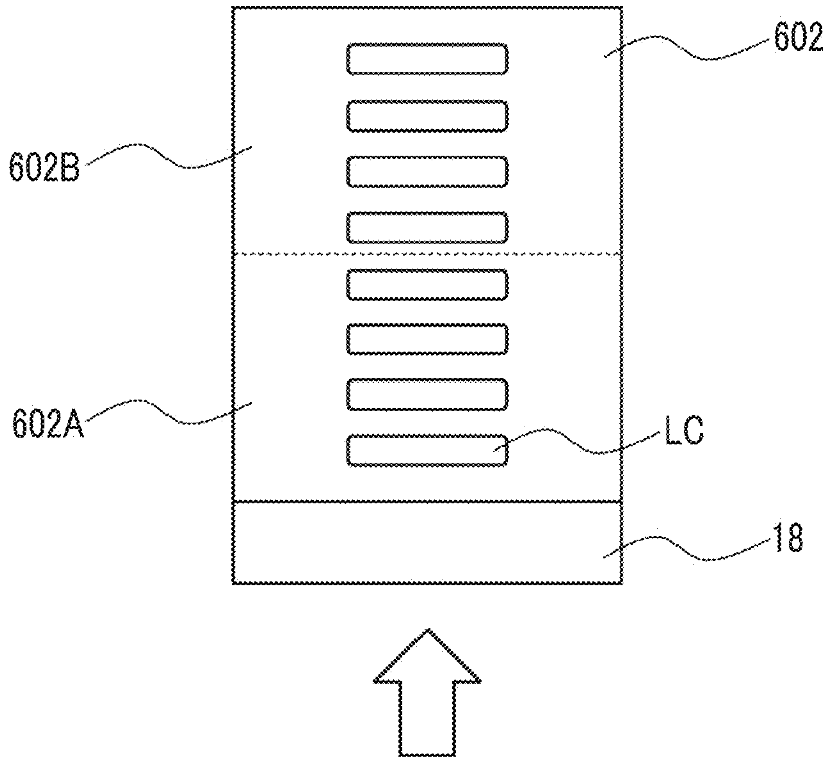
FIG. 21 is a cross-sectional view of a composition layer for explaining an example of a step 3D of a method for producing the fifth embodiment of the optically anisotropic layer.

The step 2D is a step of subjecting the composition layer to a heat treatment to align the liquid crystal compound in the composition layer. Carrying out this step brings the liquid crystal compound in the composition layer into a predetermined alignment state. As shown in FIG. 21 which will be described later, for example, the liquid crystal compound is homogeneously aligned in the composition by carrying out the step 2D.

With regard to heat treatment conditions, the optimum conditions are selected according to the liquid crystal compound used.

Above all, the heating temperature is often 25° C. to 250° C., more often 40° C. to 150° C., and still more often 50° C. to 130° C.

The heating time is often 0.1 to 60 minutes and more often 0.2 to 5 minutes.

<Step 3D>

The step 3D is a step of irradiating the composition layer with light for 50 seconds or less and at an irradiation amount of 300 mJ/cm$^2$ or less under the condition that the oxygen concentration is 1% by volume or more, after the step 2D. In the following, the mechanism of this step will be described with reference to the accompanying drawings. In FIG. 21, the liquid crystal compound LC is homogeneously aligned in the composition layer.

As shown in FIG. 21, in the step 3D, light irradiation is carried out from the direction opposite to the composition layer 602 side of the substrate 18 (the direction of the white arrow in FIG. 21) under the condition that the oxygen concentration is 1% by volume or more. Although the light irradiation is carried out from the substrate 18 side in FIG. 21, the light irradiation may be carried out from the composition layer 602 side.

At that time, in a case where a lower region 602A of the composition layer 602 on the substrate 18 side and an upper region 602B of the composition layer 602 opposite to the substrate 18 side are compared, the surface of the upper region 602B is on the air side, so that the oxygen concentration in the upper region 602B is high and the oxygen concentration in the lower region 602A is low. Therefore, in a case where the composition layer 602 is irradiated with light, the polymerization of the liquid crystal compound easily proceeds in the lower region 602A, and the alignment state of the liquid crystal compound is fixed. Therefore, there is no change in the alignment state of the liquid crystal compound even in a case where the step 4D of subjecting the light-irradiated composition layer to a heat treatment, which will be described later, is carried out.

In addition, since the oxygen concentration is high in the upper region 602B, the polymerization of the liquid crystal compound is inhibited by oxygen and therefore the polymerization does not proceed easily even in a case where light irradiation is carried out. Therefore, the alignment state of the liquid crystal compound changes in a case where the step 4D which will be described later is carried out.

That is, the immobilization of the alignment state of the liquid crystal compound is likely to proceed in the substrate-side region (lower region) of the composition layer by carrying out the step 3D. In addition, the immobilization of the alignment state of the liquid crystal compound is difficult to proceed in the region of the composition layer (upper region) opposite to the substrate side, and the alignment state of the liquid crystal compound is changed by the step 4D which will be described later.

Various conditions (oxygen concentration, irradiation time, irradiation amount, and the like) of light irradiation in the step 3D are the same as various conditions of light irradiation in the above-described step 3A.

<Step 4D>

The step 4D is a step of subjecting the composition layer to a heat treatment at a temperature higher than that at the time of light irradiation and equal to or higher than the temperature at which the liquid crystal compound is brought into an isotropic phase, after the step 3D. By carrying out this step, the liquid crystal compound exhibits an isotropic phase in the upper region in which the alignment state of the liquid crystal compound in the composition layer is not fixed.

In the following, the mechanism of this step will be described with reference to the accompanying drawings.

As described above, in a case where the step 3D is carried out on the composition layer 602 shown in FIG. 21, the alignment state of the liquid crystal compound is fixed in the lower region 602A, whereas the polymerization of the liquid crystal compound is difficult to proceed and the alignment state of the liquid crystal compound is not fixed in the upper region 602B.

Figure 22:
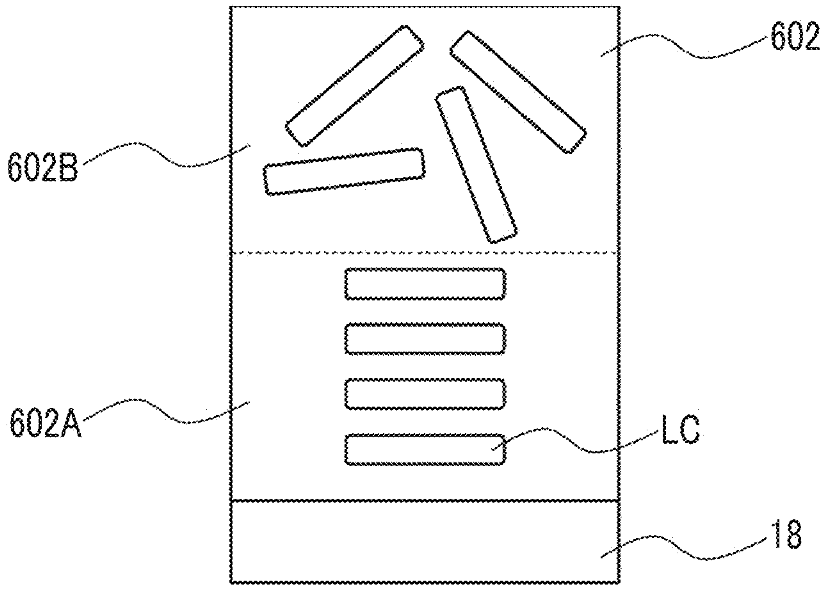
FIG. 22 is a cross-sectional view of a composition layer for explaining an example of a step 4D of the method for producing the fifth embodiment of the optically anisotropic layer.

Therefore, in a case where the step 4D is carried out, the polymerization of the liquid crystal compound does not proceed in the upper region 602B, so that the alignment state of the liquid crystal compound collapses and then the liquid crystal compound is brought into an isotropic phase, as shown in FIG. 22.

On the other hand, as described above, the polymerization of the liquid crystal compound proceeds to fix the alignment state of the liquid crystal compound during the step 3D in the lower region 602A of the composition layer 602, so that the realignment of the liquid crystal compound does not proceed.

As described above, carrying out the step 4D leads to the formation of an optically anisotropic layer having a layer formed by fixing an alignment state (for example, a homogeneous alignment state) of a liquid crystal compound and a layer formed by fixing a state in which the liquid crystal compound is not aligned (an isotropic phase of the liquid crystal compound), along a thickness direction.

The heat treatment is carried out at a temperature higher than that at the time of light irradiation and equal to or higher than the temperature at which the liquid crystal compound is brought into an isotropic phase.

The difference between the temperature of the heat treatment and the temperature at the time of light irradiation is preferably 5° C. or more, more preferably 10° C. to 110° C., and still more preferably 20° C. to 110° C.

The temperature of the heat treatment is preferably a temperature which is higher than the temperature at the time of light irradiation and which brings the non-fixed liquid crystal compound in the composition layer into an isotropic phase. More specifically, the temperature of the heat treatment is often 40° C. to 250° C., more often 50° C. to 150° C., still more often higher than 50° C. and lower than or equal to 150° C., and particularly often 60° C. to 130° C.

The heating time is often 0.01 to 60 minutes and more often 0.03 to 5 minutes.

<Step 5D>

The step 5D is a step of subjecting the composition layer to a curing treatment to form an optically anisotropic layer, after the step 4D. By carrying out this step, the alignment state of the liquid crystal compound in the composition layer is fixed, and as a result, a predetermined optically anisotropic layer is formed.

Examples of the method of the curing treatment in the step 5D include the method of the curing treatment in the step 5A.

<<Applications>>

The optically anisotropic layer can be combined with a variety of members.

Figure 23:
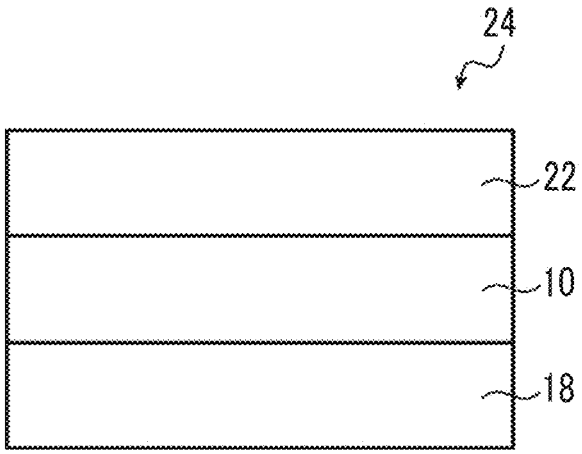
FIG. 23 is a cross-sectional view showing an embodiment of a laminate of the present invention.

For example, the optically anisotropic layer may be combined with another optically anisotropic layer. That is, a laminate 24 including a substrate 18, the above-mentioned optically anisotropic layer 10, and another optically anisotropic layer 22 may be prepared as shown in FIG. 23. Although the laminate 24 shown in FIG. 23 includes the substrate 18, the laminate may not include the substrate.

The other optically anisotropic layer is not particularly limited, and examples thereof include A-plates (a positive A-plate and a negative A-plate) and C-plates (a positive C-plate and a negative C-plate). Above all, the C-plate is preferable from the viewpoint that it can be easily applied to various applications (for example, a circularly polarizing plate) which will be described later.

The range of the absolute value of the thickness direction retardation of the C-plate at a wavelength of 550 nm is not particularly limited and is preferably 5 to 300 nm and more preferably 10 to 200 nm.

In the present specification, the A-plate and the C-plate are defined as follows.

There are two types of A-plates, a positive A-plate (A-plate which is positive) and a negative A-plate (A-plate which is negative). The positive A-plate satisfies the relationship of Expression (A1) and the negative A-plate satisfies the relationship of Expression (A2) in a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz. It should be noted that the positive A-plate has an Rth showing a positive value and the negative A-plate has an Rth showing a negative value.

$$nx>ny\approx nz \qquad \text{Expression (A1)}$$

$$ny<nx\approx nz \qquad \text{Expression (A2)}$$

It should be noted that the symbol "≈" encompasses not only a case where the both sides are completely the same as each other but also a case where the both sides are substantially the same as each other. The expression "substantially the same" means that, for example, a case where (ny−nz)×d (in which d is a thickness of a film) is −10 to 10 nm and preferably −5 to 5 nm is also included in "ny≈nz"; and a case where (nx−nz)×d is −10 to 10 nm and preferably −5 to 5 nm is also included in "nx≈nz".

There are two types of C-plates, a positive C-plate (C-plate which is positive) and a negative C-plate (C-plate which is negative). The positive C-plate satisfies the relationship of Expression (C1) and the negative C-plate satisfies the relationship of Expression (C2). It should be noted that the positive C-plate has an Rth showing a negative value and the negative C-plate has an Rth showing a positive value.

$$nz>nx\approx ny \qquad \text{Expression (C1)}$$

$$nz<nx\approx ny \qquad \text{Expression (C2)}$$

It should be noted that the symbol "≈" encompasses not only a case where the both sides are completely the same as each other but also a case where the both sides are substantially the same as each other. The expression "substantially the same" means that, for example, a case where (nx−ny)×d (in which d is a thickness of a film) is 0 to 10 nm and preferably 0 to 5 nm is also included in "nx≈ny".

The method for producing the laminate is not particularly limited, and examples thereof include known methods. For example, there is a method of laminating an optically anisotropic layer obtained by the production method of the present invention and another optically anisotropic layer (for example, a C-plate) to obtain a laminate. As the method of laminating, another separately prepared optically anisotropic layer may be bonded onto the optically anisotropic layer obtained by the production method of the present invention, or a composition for forming another optically anisotropic layer may be applied onto the optically anisotropic layer obtained by the production method of the present invention to form another optically anisotropic layer.

Figure 24:
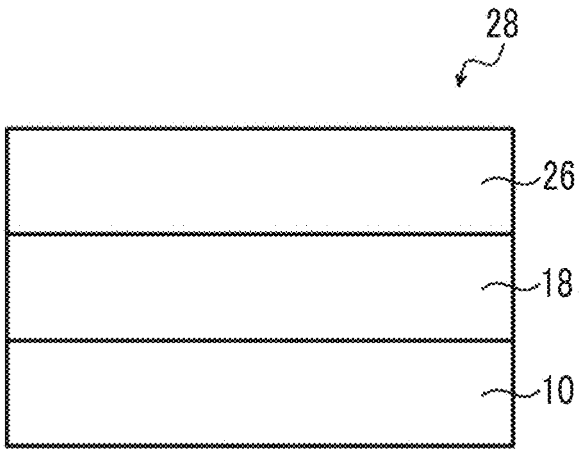
FIG. 24 is a cross-sectional view showing an embodiment of an optically anisotropic layer with a polarizer according to the present invention.

In addition, the optically anisotropic layer obtained by the production method of the present invention may be combined with a polarizer. That is, an optically anisotropic layer with a polarizer 28, which includes a substrate 18, the above-mentioned optically anisotropic layer 10, and a polarizer 26, may be prepared as shown in FIG. 24. In FIG. 24, the polarizer 26 is disposed on the substrate 18, but the present invention is not limited to this aspect and the polarizer 26 may be disposed on the optically anisotropic layer 10.

In addition, although the optically anisotropic layer with a polarizer 28 shown in FIG. 24 includes the substrate 18, the substrate may not be included in the optically anisotropic layer with a polarizer.

The polarizer may be a member having a function of converting natural light into specific linearly polarized light, and examples thereof include an absorption type polarizer.

The type of the polarizer is not particularly limited, and a commonly used polarizer can be used. Examples of the polarizer include an iodine-based polarizer, a dye-based polarizer using a dichroic dye, and a polyene-based polarizer. The iodine-based polarizer and the dye-based polarizer are generally prepared by adsorbing iodine or a dichroic dye on a polyvinyl alcohol, followed by stretching.

A protective film may be disposed on one side or both sides of the polarizer.

The method for producing the optically anisotropic layer with a polarizer is not particularly limited, and a known method can be mentioned. For example, there is a method of laminating an optically anisotropic layer obtained by the production method of the present invention and a polarizer to obtain an optically anisotropic layer with a polarizer.

Although the aspect in which an optically anisotropic layer and a polarizer are laminated has been described above, the above-mentioned laminate and a polarizer may be laminated to produce a laminate with a polarizer in the present invention.

The optically anisotropic layer can be applied to various applications. For example, the optically anisotropic layer can be suitably applied to a circularly polarizing plate, and the above-mentioned optically anisotropic layer with a polarizer can also be used as a circularly polarizing plate.

The circularly polarizing plate having the above-described configuration can be suitably used for antireflection applications of an image display apparatus such as a liquid crystal display device (LCD), a plasma display panel (PDP), an electroluminescent display (ELD), or a cathode tube display device (CRT) to improve a contrast ratio of display light.

For example, mention may be made of an aspect in which the circularly polarizing plate of the present invention is used on a light extraction surface side of an organic EL display device. In this case, the external light is linearly polarized by a polarizing film and then passes through the optically anisotropic layer to convert into circularly polarized light. In a case where this circularly polarized light is reflected by a metal electrode, the circularly polarized state is reversed, and in a case where the circularly polarized light in the reversed state passes through the optically anisotropic layer again, the passed light converts into linearly polarized light tilted by 90° from the time of incidence, reaches the polarizing film, and is absorbed. As a result, the influence of external light can be suppressed.

Above all, the above-mentioned optically anisotropic layer with a polarizer or the above-mentioned laminate with a polarizer is preferably applied to an organic EL display device. That is, it is preferable that the optically anisotropic layer with a polarizer or the laminate with a polarizer is disposed on an organic EL panel of the organic EL display device and applied for antireflection applications.

The organic EL panel is a member in which a light emitting layer or a plurality of organic compound thin films including a light emitting layer are formed between a pair of electrodes of an anode and a cathode, and may have a hole injection layer, a hole transport layer, an electron injection layer, an electron transport layer, a protective layer, and the like in which each of these layers may have other functions, in addition to the light emitting layer. Various materials can be used to form each layer.

EXAMPLES

Hereinafter, features of the present invention will be described in more detail with reference to Examples and Comparative Examples. The materials, amounts used, proportions, treatment details, treatment procedure, and the like shown in the following Examples can be appropriately changed without departing from the spirit and scope of the present invention. Accordingly, the scope of the present invention should not be construed as being limited by the specific examples given below.

Example 1

(Preparation of Cellulose Acylate Film (Substrate))

The following composition was put into a mixing tank, stirred, and further heated at 90° C. for 10 minutes. Then, the obtained composition was filtered through a filter paper having an average pore diameter of 34 μm and a sintered metal filter having an average pore diameter of 10 μm to prepare a dope. The concentration of solid contents of the dope is 23.5% by mass, the amount of the plasticizer added is a proportion relative to cellulose acylate, and the solvent of the dope is methylene chloride/methanol/butanol=81/18/1 (in terms of a mass ratio).

| Cellulose acylate dope | |
|---|---|
| Cellulose acylate (acetyl substitution degree: 2.86, viscosity average polymerization degree: 310) | 100 parts by mass |
| Sugar ester compound 1 (represented by Chemical Formula (S4)) | 6.0 parts by mass |
| Sugar ester compound 2 (represented by Chemical Formula (S5)) | 2.0 parts by mass |
| Silica particle dispersion (AEROSIL R972, manufactured by Nippon Aerosil Co., Ltd.) | 0.1 parts by mass |

Solvent (methylene chloride/methanol/butanol)

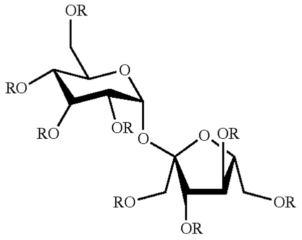

(R = benzoyl or H Average substitution degree: 5.7)

(S4)

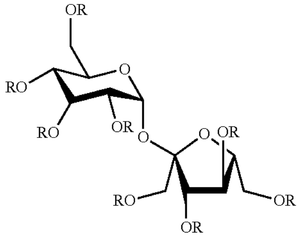

(R = acetyl/isobutyryl = 2/6)

(S5)

The dope prepared above was cast using a drum film forming machine. The above-mentioned dope for forming a core layer so as to be in contact with a metal support cooled to 0° C. and the above-mentioned dope for forming a surface layer on the core layer were co-cast from a die, and then the obtained film was peeled off. The drum was made of Steel Use Stainless (SUS).

Using a tenter device that clips both ends of a film with clips to transport the film, the film peeled off from the drum was dried at 30° C. to 40° C. for 20 minutes during transport. Next, the obtained film was post-dried by zone heating while being rolled and transported. Then, the obtained film was knurled and then wound up.

The obtained elongated cellulose acylate film had a film thickness of 40 μm, an in-plane retardation Re(550) of 1 nm at a wavelength of 550 nm, and a thickness direction retardation Rth(550) of 26 nm.

(Formation of Optically Anisotropic Layer)

The cellulose acylate film prepared above was continuously subjected to a rubbing treatment. At this time, the longitudinal direction and the transport direction of the elongated film were parallel, and the angle formed by the film longitudinal direction (transport direction) and the rubbing roller rotation axis was 80°. The rotation axis of the rubbing roller was 10° in a case where the longitudinal direction (transport direction) of the film was defined as 90°, and the counterclockwise direction was represented by a positive value with reference to the width direction of the cellulose acylate film (0°), upon observation of the film from the cellulose acylate film side. In other words, the position of the rotation axis of the rubbing roller was a position rotated by 80° clockwise with reference to the longitudinal direction of the cellulose acylate film.

The following composition (A) for forming an optically anisotropic layer containing a rod-like liquid crystal compound was applied onto the rubbing-treated film using a geeser coating machine to form a composition layer (corresponding to the step 1A). The absolute value of the weighted average helical twisting power of the chiral agent in the composition layer in the step 1A was 0.0 $\mu m^{-1}$.

Next, the obtained composition layer was heated at 100° C. for 80 seconds (corresponding to the step 2A). This heating resulted in alignment of the rod-like liquid crystal compound of the composition layer in a predetermined direction.

Then, the composition layer was irradiated with ultraviolet rays for 1 second using a 365 nm LED lamp (manufactured by AcroEdge Co., Ltd.) at 40° C. under oxygen-containing air (oxygen concentration: about 20% by volume) (corresponding to the step 3A). At this time, the maximum value of the in-plane irradiation amount was 13.2 $mJ/cm^2$, and the minimum value of the in-plane irradiation amount was 12.9 $mJ/cm^2$.

Subsequently, the obtained composition layer was heated at 90° C. for 10 seconds (corresponding to the step 4A).

Then, the composition layer was irradiated with ultraviolet rays (irradiation amount: 500 $mJ/cm^2$) using a metal halide lamp (manufactured by Eye Graphics Co., Ltd.) at 55° C. in a nitrogen atmosphere to form an optically anisotropic layer in which an alignment state of a liquid crystal compound was fixed (corresponding to the step 5A), whereby an optical film (A) was prepared.

| Composition (A) for forming optically anisotropic layer | |
|---|---|
| Rod-like liquid crystal compound (A) given below | 80 parts by mass |
| Rod-like liquid crystal compound (B) given below | 10 parts by mass |
| Rod-like liquid crystal compound (C) given below | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Chiral agent (A) given below | 0.42 parts by mass |
| Chiral agent (B) given below | 0.38 parts by mass |
| Polymerizable polymer (X) given below | 0.5 parts by mass |
| Polymer (A) given below | 0.08 parts by mass |
| Methyl isobutyl ketone | 117 parts by mass |
| Ethyl propionate | 39 parts by mass |

Rod-Like Liquid Crystal Compound (A) (Hereinafter, a Mixture of Compounds)
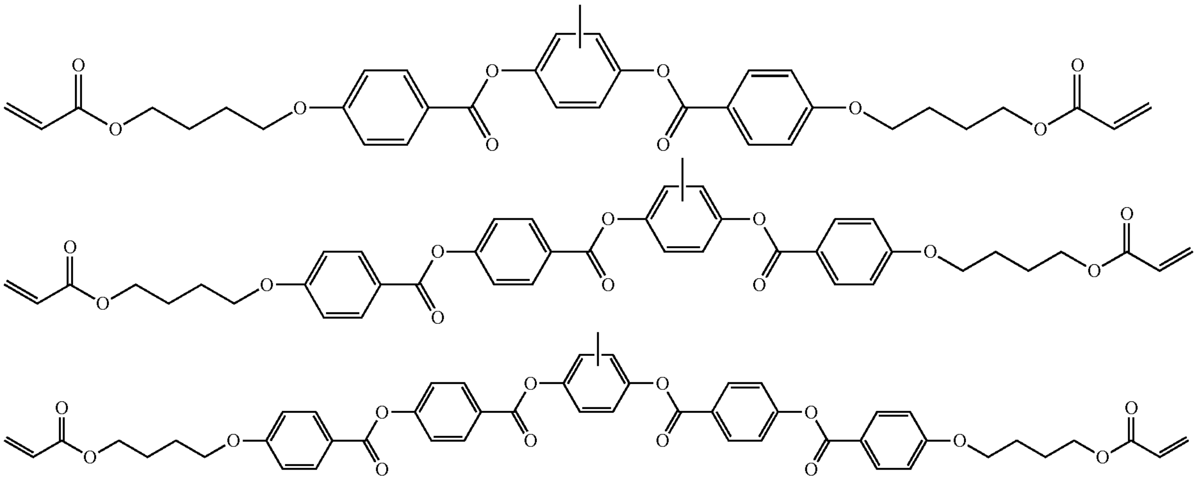
Rod-Like Liquid Crystal Compound (B)
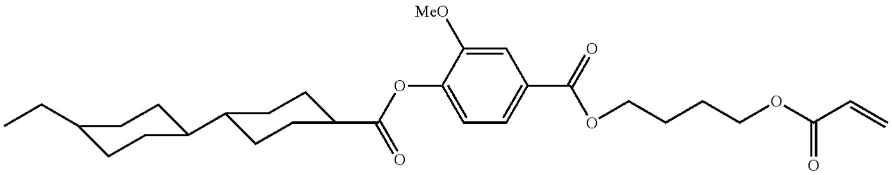 [SMILES: C=CC(=O)OCCCCOC(=O)c1ccc(OC(=O)C2CCC(C3CCC(CC)CC3)CC2)c(OC)c1]
Rod-Like Liquid Crystal Compound (C)
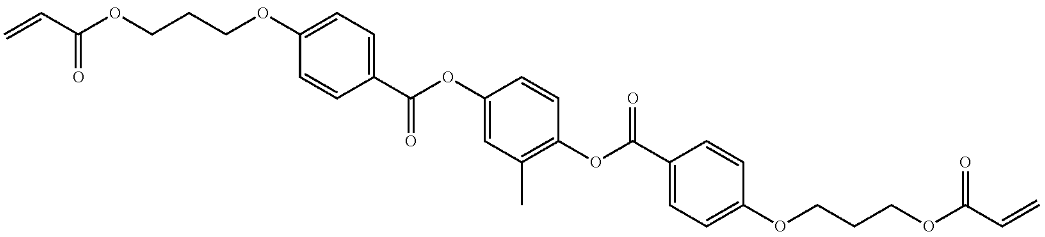 [SMILES: C=CC(=O)OCCCOc1ccc(C(=O)Oc2ccc(OC(=O)c3ccc(OCCCOC(=O)C=C)cc3)c(C)c2)cc1]
Chiral Agent (A)
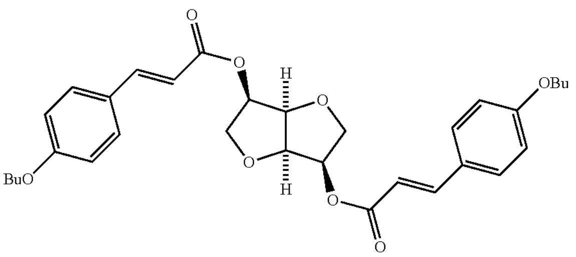

(Chiral Agent B)

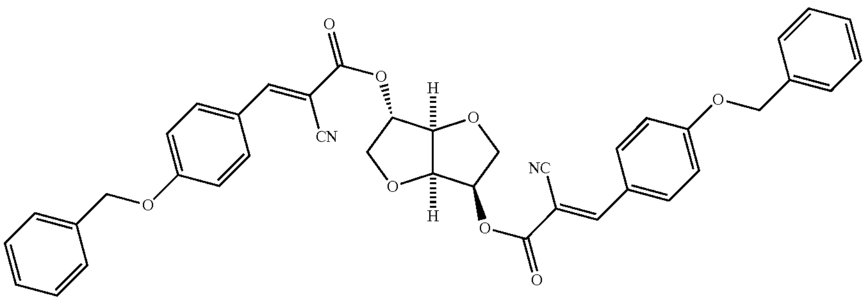 [SMILES: N#C/C(=C\c1ccc(OCc2ccccc2)cc1)C(=O)O[C@H]1CO[C@H]2[C@@H]1OC[C@H]2OC(=O)/C(C#N)=C/c1ccc(OCc2ccccc2)cc1]

Polymerizable polymer (X) (In the formulae, the numerical value described in each repeating unit represents the content (% by mass) of each repeating unit with respect to all the repeating units).

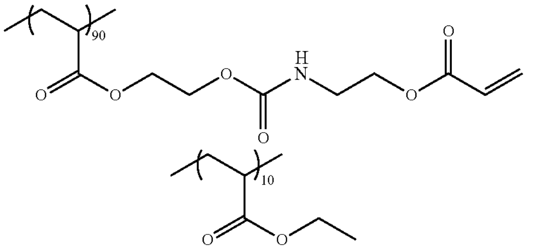

Polymer (A) (In the formulae, the numerical value described in each repeating unit represents the content (% by mass) of each repeating unit with respect to all the repeating units).

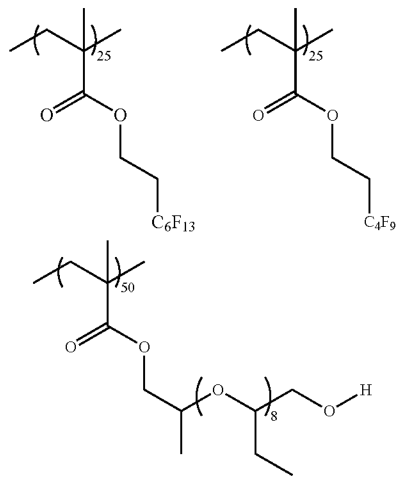

The optical film (A) prepared above was cut in parallel with the rubbing direction, and the optically anisotropic layer was observed from the cross-sectional direction with a polarization microscope. The optically anisotropic layer was composed of two layers exhibiting different optical anisotropy, in which the layer on the cellulose acylate film side (first layer) in the optically anisotropic layer was a layer having a thickness (d1) of 1,310 nm and formed by fixing a liquid crystal compound homogeneously aligned, and the layer on the air side (second layer) in the optically anisotropic layer was a layer having a thickness (d2) of 1,390 nm and formed by fixing a liquid crystal compound twist-aligned with a thickness direction as a helical axis.

The optical properties of the optical film (A) were determined using Axoscan of Axometrics, Inc. and analysis software (Multi-Layer Analysis) of Axometrics, Inc. In the first layer, the product ($\Delta n1d1$) of $\Delta n1$ at a wavelength of 550 nm and a thickness d1 was 173 nm, the twisted angle of the liquid crystal compound was 0°, and the alignment axial angle of the liquid crystal compound with respect to the longitudinal direction of the film was −10° on the side in contact with the substrate and −10° on the side in contact with the second layer.

In addition, in the second layer, the product ($\Delta n2d2$) of $\Delta n2$ at a wavelength of 550 nm and a thickness d2 was 184 nm, the twisted angle of the liquid crystal compound was 75°, and the alignment axial angle of the liquid crystal compound with respect to the longitudinal direction of the film was −10° on the side in contact with the first layer and −85° on the air side.

The alignment axial angle of the liquid crystal compound contained in the optically anisotropic layer is expressed as negative in a case where it is clockwise (right-handed turning) and positive in a case where it is counterclockwise (left-handed turning) with the longitudinal direction of the film as a reference of 0°, upon observing the substrate from the surface side of the optically anisotropic layer.

In addition, the twisted structure of the liquid crystal compound here is expressed as negative in a case where the alignment direction of the liquid crystal compound on the substrate side (back side) is clockwise (right-handed turning) and positive in a case where it is counterclockwise (left-handed turning) with reference to the alignment direction of the liquid crystal compound on the surface side (front side), upon observing the substrate from the surface side of the optically anisotropic layer.

(Preparation of Circularly Polarizing Plate)

A polyvinyl alcohol (PVA) film having a thickness of 80 μm was dyed by immersing it in an iodine aqueous solution having an iodine concentration of 0.05% by mass at 30° C. for 60 seconds. Next, the obtained film was machine-direction stretched 5 times its original length while immersed in a boric acid aqueous solution having a boric acid concentration of 4% by mass for 60 seconds, and then dried at 50° C. for 4 minutes to obtain a polarizer having a thickness of 20 μm.

(Preparation of Polarizer Protective Film)

A commercially available cellulose acylate-based film "TD80UL" (manufactured by FUJIFILM Corporation) was prepared and immersed in a sodium hydroxide aqueous solution at 1.5 mol/liter at 55° C., and then the sodium hydroxide was thoroughly washed away with water. Then, the film was immersed in a dilute sulfuric acid aqueous solution at 0.005 mol/liter at 35° C. for 1 minute, and then immersed in water to thoroughly wash away the dilute sulfuric acid aqueous solution. Finally, the obtained film was sufficiently dried at 120° C. to prepare a polarizer protective film.

The above prepared polarizer protective film was bonded to one side of the above prepared polarizer with a polyvinyl alcohol-based adhesive to prepare a laminate including a polarizer and a polarizer protective film disposed on one side of the polarizer.

A pressure sensitive adhesive (SK-2057, manufactured by Soken Chemical & Engineering Co., Ltd.) was applied to the polarizer side (side with no polarizer protective film) in the above prepared laminate to form a pressure sensitive adhesive layer, and the above prepared optical film (A) was bonded thereto such that the pressure sensitive adhesive layer and the cellulose acylate film were in close contact with each other. The angle formed by the absorption axis of the polarizer and the in-plane slow axis of the surface of the optically anisotropic layer in the optical film (A) on the polarizer side was 10°.

Next, a pressure sensitive adhesive was applied onto the optical film (A) in the obtained laminate to form a pressure sensitive adhesive layer.

An elongated circularly polarizing plate (A) in which a polarizer protective film, a polarizer, a cellulose acylate film, an optically anisotropic layer, and a pressure sensitive adhesive layer were disposed in this order was prepared by the above procedure.

Example 2

An optical film (B) and a circularly polarizing plate (B) were prepared in the same manner as in Example 1, except that the output was adjusted so that the maximum value of the in-plane irradiation amount was 13.3 mJ/$cm^2$ and the minimum value of the in-plane irradiation amount was 12.7 mJ/$cm^2$ in a case of irradiation with light from a 365 nm LED lamp (manufactured by AcroEdge Co., Ltd.).

Example 3

(Formation of Optically Anisotropic Layer)

The cellulose acylate film prepared in Example 1 was continuously subjected to a rubbing treatment. At this time, the longitudinal direction and the transport direction of the elongated film were parallel, and the angle formed by the film longitudinal direction (transport direction) and the rubbing roller rotation axis was 90°.

The following composition (B) for forming an optically anisotropic layer containing a rod-like liquid crystal compound was applied onto the rubbing-treated film using a geeser coating machine to form a composition layer.

Next, the obtained composition layer was heated at 100° C. for 80 seconds. This heating resulted in alignment of the rod-like liquid crystal compound of the composition layer in a predetermined direction.

Then, the composition layer was irradiated with ultraviolet rays for 1 second using a 365 nm LED lamp (manufactured by AcroEdge Co., Ltd.) at 40° C. under oxygen-containing air (oxygen concentration: about 20% by volume). At this time, the maximum value of the in-plane irradiation amount was 16.2 mJ/$cm^2$, and the minimum value of the in-plane irradiation amount was 15.8 mJ/$cm^2$.

Subsequently, the obtained composition layer was heated at 90° C. for 10 seconds.

Then, the composition layer was irradiated with ultraviolet rays (irradiation amount: 500 mJ/$cm^2$) using a metal halide lamp (manufactured by Eye Graphics Co., Ltd.) at 55° C. in a nitrogen atmosphere to form an optically anisotropic layer in which an alignment state of a liquid crystal compound was fixed, whereby an optical film (C) was prepared.

| Composition (B) for forming optically anisotropic layer | |
|---|---|
| Rod-like liquid crystal compound (A) given above | 80 parts by mass |
| Rod-like liquid crystal compound (B) given above | 10 parts by mass |
| Rod-like liquid crystal compound (C) given above | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Chiral agent (A) given above | 0.44 parts by mass |
| Chiral agent (B) given above | 0.31 parts by mass |
| Polymerizable polymer (X) given above | 0.5 parts by mass |
| Polymer (A) given above | 0.08 parts by mass |
| Methyl isobutyl ketone | 117 parts by mass |
| Ethyl propionate | 39 parts by mass |

The optical film (C) prepared above was cut in parallel with the rubbing direction, and the optically anisotropic layer was observed from the cross-sectional direction with a polarization microscope. The optically anisotropic layer was composed of two layers exhibiting different optical anisotropy, in which the layer on the cellulose acylate film side (first layer) in the optically anisotropic layer was a layer having a thickness (d1) of 2,090 nm and formed by fixing a liquid crystal compound twist-aligned with a thickness direction as a helical axis, and the layer on the air side (second layer) in the optically anisotropic layer was a layer having a thickness (d2) of 1,050 nm and formed by fixing a liquid crystal compound twist-aligned with a thickness direction as a helical axis.

The optical properties of the optical film (C) were determined using Axoscan of Axometrics, Inc. and analysis software (Multi-Layer Analysis) of Axometrics, Inc. In the first layer, the product (Δn1d1) of Δn1 at a wavelength of 550 nm and a thickness d1 was 275 nm, the twisted angle of the liquid crystal compound was 26°, and the alignment axial angle of the liquid crystal compound with respect to the longitudinal direction of the film was 0° on the side in contact with the substrate and −26° on the side in contact with the second layer.

In addition, in the second layer, the product (Δn2d2) of Δn2 at a wavelength of 550 nm and a thickness d2 was 138 nm, the twisted angle of the liquid crystal compound was 78°, and the alignment axial angle of the liquid crystal compound with respect to the longitudinal direction of the film was −26° on the side in contact with the first layer and −104° on the air side.

The alignment axial angle of the liquid crystal compound contained in the optically anisotropic layer is expressed as negative in a case where it is clockwise (right-handed turning) and positive in a case where it is counterclockwise (left-handed turning) with the longitudinal direction of the film as a reference of 0°, upon observing the substrate from the surface side of the optically anisotropic layer.

In addition, the twisted structure of the liquid crystal compound here is expressed as negative in a case where the alignment direction of the liquid crystal compound on the substrate side (back side) is clockwise (right-handed turning) and positive in a case where it is counterclockwise (left-handed turning) with reference to the alignment direction of the liquid crystal compound on the surface side (front side), upon observing the substrate from the surface side of the optically anisotropic layer.

(Preparation of Circularly Polarizing Plate)

The above prepared polarizer protective film was bonded to one side of the above prepared polarizer with a polyvinyl alcohol-based adhesive to prepare a laminate including a polarizer and a polarizer protective film disposed on one side of the polarizer.

A pressure sensitive adhesive (SK-2057, manufactured by Soken Chemical & Engineering Co., Ltd.) was applied to the polarizer side (side with no polarizer protective film) in the above prepared laminate to form a pressure sensitive adhesive layer, and the above prepared optical film (C) was bonded thereto such that the pressure sensitive adhesive layer and the cellulose acylate film were in close contact with each other. The absorption axis of the polarizer and the in-plane slow axis of the surface of the first layer of the optically anisotropic layer in the optical film (C) on the substrate side were parallel to each other.

Next, a pressure sensitive adhesive was applied onto the optical film (C) in the obtained laminate to form a pressure sensitive adhesive layer.

An elongated circularly polarizing plate (C) in which a polarizer protective film, a polarizer, a cellulose acylate film, an optically anisotropic layer, and a pressure sensitive adhesive layer were disposed in this order was prepared by the above procedure.

Example 4

(Alkali Saponification Treatment)

After passing the cellulose acylate film prepared by the method described in Example 1 through a dielectric heating roll at a temperature of 60° C. to raise the film surface temperature to 40° C., an alkaline solution having the composition shown below was applied onto a band surface of the film using a bar coater at a coating amount of 14 ml/m$^2$, followed by heating to 110° C., and transportation under a steam type far-infrared heater manufactured by Noritake Co., Limited for 10 seconds. Subsequently, pure water was applied at 3 ml/m$^2$ using the same bar coater. Then, after repeating washing with water with a fountain coater and draining with an air knife three times, the film was transported to a drying zone at 70° C. for 10 seconds and dried to prepare a cellulose acylate film subjected to an alkali saponification treatment.

| Alkaline solution | |
|---|---|
| Potassium hydroxide | 4.7 parts by mass |
| Water | 15.8 parts by mass |
| Isopropanol | 63.7 parts by mass |
| Surfactant: $C_{14}H_{29}O(CH_2CH_2O)_{20}H$ | 1.0 parts by mass |
| Propylene glycol | 14.8 parts by mass |

(Formation of Alignment Film)

An alignment film coating liquid having the following composition was continuously applied onto the surface of the cellulose acylate film that had been subjected to the alkali saponification treatment with a #14 wire bar. The film was dried with hot air at 60° C. for 60 seconds and further with hot air at 100° C. for 120 seconds.

| Alignment film coating liquid | |
|---|---|
| Modified polyvinyl alcohol given below | 28 parts by mass |
| Citric acid ester (AS3, manufactured by Sankyo Kagaku Yakuhin Co., Ltd.) | 1.2 parts by mass |
| Photopolymerization initiator (IRGACURE 2959, manufactured by BASF SE) | 0.84 parts by mass |
| Glutaraldehyde | 2.8 parts by mass |
| Water | 699 parts by mass |
| Methanol | 226 parts by mass |

(Modified Polyvinyl Alcohol)

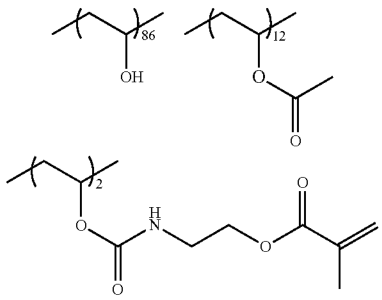

(Formation of Optically Anisotropic Layer)

The alignment film prepared above was continuously subjected to a rubbing treatment. At this time, the longitudinal direction and the transport direction of the elongated film were parallel, and the angle between the film longitudinal direction (transport direction) and the rubbing roller rotation axis was 45°. In a case where the film longitudinal direction (transport direction) is 90° and the clockwise direction is represented by a positive value with reference to a film width direction as a reference (0°) in a case of being observed from the film side, the rotation axis of the rubbing roller is at 135°. In other words, the position of the rotation axis of the rubbing roller is a position rotated by 45° counterclockwise with reference to the longitudinal direction of the film.

Using the rubbing-treated cellulose acylate film with an alignment film as a substrate, a composition (C) for forming an optically anisotropic layer containing a rod-like liquid crystal compound having the following composition was applied using a geeser coating machine to form a composition layer (corresponding to the step 1C).

Next, the obtained composition layer was heated at 120° C. for 80 seconds (corresponding to the step 2C). This heating resulted in alignment of the rod-like liquid crystal compound of the composition layer in a predetermined direction.

Then, the composition layer was irradiated with ultraviolet rays for 1 second using a 365 nm LED lamp (manufactured by AcroEdge Co., Ltd.) at 40° C. under oxygen-containing air (oxygen concentration: about 20% by volume) (corresponding to the step 3C). At this time, the maximum value of the in-plane irradiation amount was 16.8 mJ/cm$^2$, and the minimum value of the in-plane irradiation amount was 16.3 mJ/cm$^2$.

Subsequently, the obtained composition layer was heated at 90° C. for 10 seconds (corresponding to the step 4C).

Then, the composition layer was irradiated with ultraviolet rays (irradiation amount: 500 mJ/cm$^2$) using a metal halide lamp (manufactured by Eye Graphics Co., Ltd.) at 55° C. in a nitrogen atmosphere to form an optically anisotropic layer in which an alignment state of a liquid crystal compound was fixed (corresponding to the step 5C), whereby an optical film (D) was prepared.

| Composition (C) for forming optically anisotropic layer | |
|---|---|
| Rod-like liquid crystal compound (D) given below | 40 parts by mass |
| Rod-like liquid crystal compound (E) given below | 40 parts by mass |
| Rod-like liquid crystal compound (A) given above | 20 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Polymerizable polymer (X) given above | 0.5 parts by mass |
| Polymer (A) given above | 0.08 parts by mass |
| Ionic compound (A) given below | 3.0 parts by mass |
| Photosensitive compound (A) given below | 0.4 parts by mass |
| Methyl ethyl ketone | 156 parts by mass |

Rod-Like Liquid Crystal Compound (D)

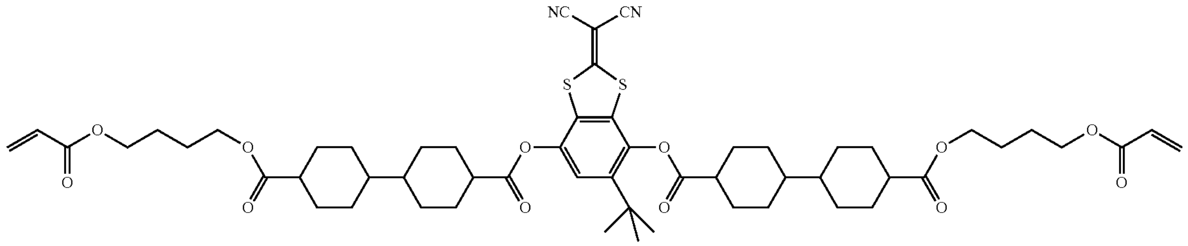 [SMILES: C=CC(=O)OCCCCOC(=O)C1CCC(C2CCC(C(=O)Oc3cc(C(C)(C)C)c(OC(=O)C4CCC(C5CCC(C(=O)OCCCCOC(=O)C=C)CC5)CC4)c4c3SC(=C(C#N)C#N)S4)CC2)CC1]

Rod-Like Liquid Crystal Compound (E)

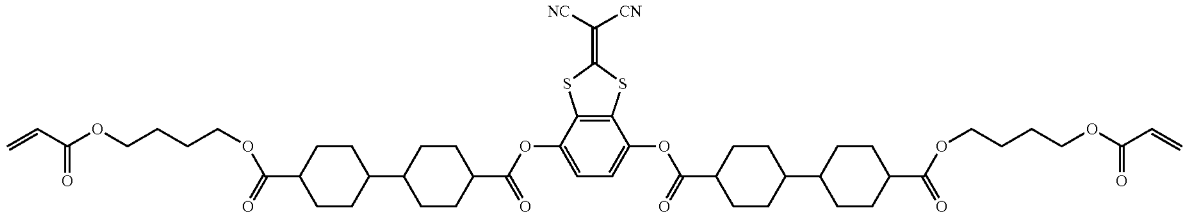 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c3SC(=C(C#N)C#N)S4)CC2)CC1]

Ionic Compound (A)

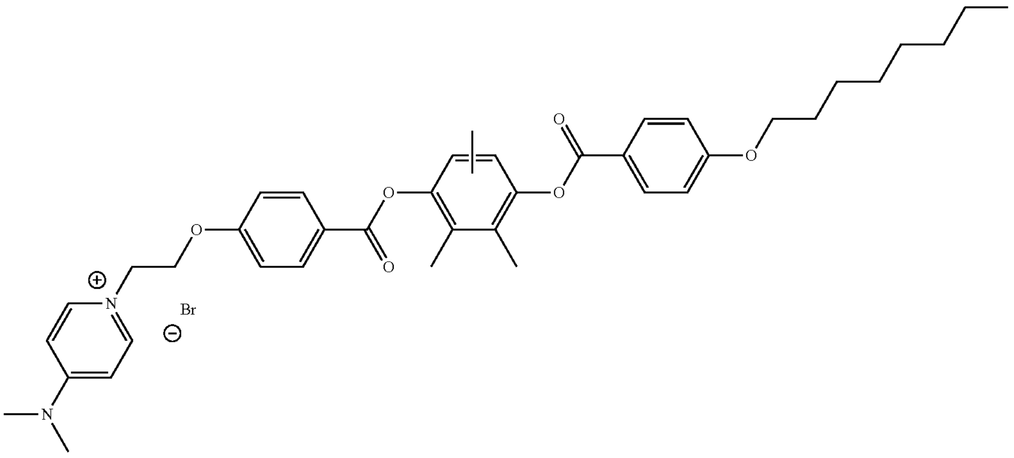

Photosensitive Compound (A)

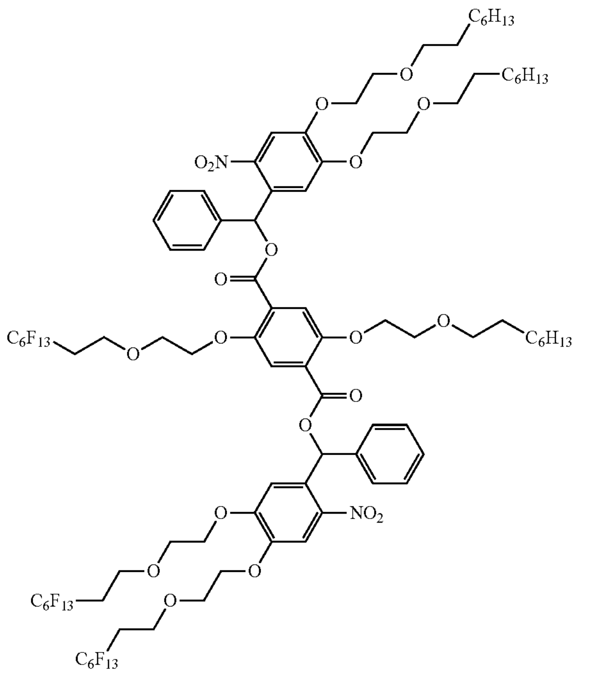

In a case where the fluorine-containing compound (A) in the composition (C) for forming an optically anisotropic layer was irradiated with light of 365 nm (16.6 mJ/$cm^2$), a decomposition product (A) having a hydrophilic carboxyl group was produced.

Decomposition Product (A)

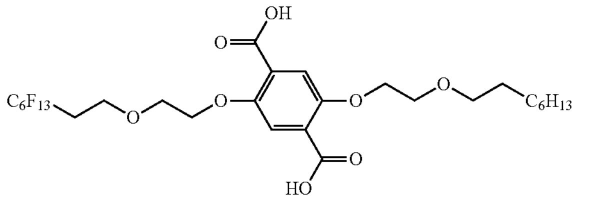

The optical film (D) prepared above was cut in parallel with the rubbing direction, and the optically anisotropic layer was observed from the cross-sectional direction with a polarization microscope. The optically anisotropic layer was composed of two layers exhibiting different optical anisotropy, in which the layer on the cellulose acylate film side (first layer) in the optically anisotropic layer was a layer having a thickness (d1) of 3,000 nm and formed by fixing a liquid crystal compound homogeneously aligned, and the layer on the air side (second layer) in the optically anisotropic layer was a layer having a thickness (d2) of 1,300 nm and formed by fixing a liquid crystal compound homeotropically aligned.

The optical properties of the optical film (D) were determined using Axoscan of Axometrics, Inc. and analysis software (Multi-Layer Analysis) of Axometrics, Inc. The first layer had a product (Δn1d1) of Δn1 at a wavelength of 550 nm and d1 of 140 nm, and an angle of an in-plane slow axis of −45° with respect to the longitudinal direction of the film.

In addition, the second layer had a product (Δn2d2) of Δn2 at a wavelength of 550 nm and d2 of 0 nm, and a thickness direction retardation of −60 nm at a wavelength of 550 nm.

The angle of the in-plane slow axis is expressed as negative in a case where it is clockwise (right-handed turning) and positive in a case where it is counterclockwise (left-handed turning) with the longitudinal direction of the film as a reference of 0°, upon observing the substrate from the surface side of the optically anisotropic layer.

(Preparation of Circularly Polarizing Plate)

The above prepared polarizer protective film was bonded to one side of the above prepared polarizer with a polyvinyl alcohol-based adhesive to prepare a laminate including a polarizer and a polarizer protective film disposed on one side of the polarizer.

A pressure sensitive adhesive (SK-2057, manufactured by Soken Chemical & Engineering Co., Ltd.) was applied to the polarizer side (side with no polarizer protective film) in the above prepared laminate to form a pressure sensitive adhesive layer, and the above prepared optical film (D) was bonded thereto such that the pressure sensitive adhesive layer and the cellulose acylate film were in close contact with each other. The angle formed by the absorption axis of the polarizer and the in-plane slow axis of the optically anisotropic layer in the optical film (D) was 45°.

Next, a pressure sensitive adhesive was applied onto the optical film (D) in the obtained laminate to form a pressure sensitive adhesive layer.

An elongated circularly polarizing plate (D) in which a polarizer protective film, a polarizer, a cellulose acylate film, an optically anisotropic layer, and a pressure sensitive adhesive layer were disposed in this order was prepared by the above procedure.

Example 5

(Formation of Optically Anisotropic Layer)

The cellulose acylate film prepared in Example 1 was continuously subjected to a rubbing treatment. At this time, the longitudinal direction and the transport direction of the elongated film were parallel, and the angle formed by the film longitudinal direction (transport direction) and the rubbing roller rotation axis was 90°.

Using the rubbing-treated cellulose acylate film as a substrate, a composition (D) for forming an optically anisotropic layer containing a rod-like liquid crystal compound having the following composition was applied using a geeser coating machine to form a composition layer (corresponding to the step 1B). The absolute value of the helical twisting power of the chiral agent in the composition layer in the step 1B was 31 $\mu m^{-1}$.

Next, the obtained composition layer was heated at 100° C. for 80 seconds (corresponding to the step 2B). This heating resulted in alignment of the rod-like liquid crystal compound of the composition layer in a predetermined direction.

Then, the composition layer was irradiated with ultraviolet rays for 1 second using a 365 nm LED lamp (manufactured by AcroEdge Co., Ltd.) at 40° C. under oxygen-containing air (oxygen concentration: about 20% by volume) (corresponding to the step 3B). At this time, the maximum value of the in-plane irradiation amount was 13.4 mJ/$cm^2$, and the minimum value of the in-plane irradiation amount was 13.1 mJ/$cm^2$.

Subsequently, the obtained composition layer was heated at 90° C. for 10 seconds (corresponding to the step 4B).

Then, the composition layer was irradiated with ultraviolet rays (irradiation amount: 500 mJ/$cm^2$) using a metal halide lamp (manufactured by Eye Graphics Co., Ltd.) at 55° C. in a nitrogen atmosphere to form an optically anisotropic layer in which an alignment state of a liquid crystal compound was fixed (corresponding to the step 5B), whereby an optical film (E) was prepared.

| Composition of composition (D) for forming optically anisotropic layer | |
|---|---|
| Rod-like liquid crystal compound (A) given above | 80 parts by mass |
| Rod-like liquid crystal compound (B) given above | 10 parts by mass |
| Rod-like liquid crystal compound (C) given above | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Chiral agent (B) given above | 11 parts by mass |
| Polymerizable polymer (X) given above | 0.5 parts by mass |
| Polymer (A) given above | 0.08 parts by mass |
| Methyl isobutyl ketone | 117 parts by mass |
| Ethyl propionate | 39 parts by mass |

The optical film (E) prepared above was cut in parallel with the rubbing direction, and the optically anisotropic layer was observed from the cross-sectional direction with SEM. The optically anisotropic layer was composed of two layers exhibiting different optical anisotropy, in which the layer on the cellulose acylate film side (first layer) in the optically anisotropic layer had a thickness (d1) of 1,800 nm, the layer on the air side (second layer) in the optically anisotropic layer had a thickness (d2) of 1,800 nm, and the first layer and the second layer had cholesteric alignment having different helical pitches.

The spectral reflection properties of the optical film (E) were determined using an integrated reflectometer. It was confirmed that the optical film (E) was a two-band cholesteric liquid crystal film having a reflection band centered at 450 nm derived from the first layer and a reflection band centered at 650 nm derived from the second layer.

Example 6

(Formation of Optically Anisotropic Layer)

The cellulose acylate film prepared in Example 1 was continuously subjected to a rubbing treatment. At this time, the longitudinal direction and the transport direction of the elongated film were parallel to each other, and the angle formed by the longitudinal direction (transport direction) of the film and the rotation axis of the rubbing roller was 45°. The rotation axis of the rubbing roller was 135° in a case where the longitudinal direction (transport direction) of the film was defined as 90°, and the counterclockwise direction was represented by a positive value with reference to the width direction of the cellulose acylate film (0°), upon observing the film from the cellulose acylate film side. In other words, the position of the rotation axis of the rubbing roller was a position rotated by 45° clockwise with reference to the longitudinal direction of the cellulose acylate film.

Using the rubbing-treated cellulose acylate film as a substrate, a composition (E) for forming an optically anisotropic layer containing a rod-like liquid crystal compound having the following composition was applied using a geeser coating machine to form a composition layer (corresponding to the step 1D).

Next, the obtained composition layer was heated at 80° C. for 60 seconds (corresponding to the step 2D). This heating resulted in alignment of the rod-like liquid crystal compound of the composition layer in a predetermined direction.

Then, the composition layer was irradiated with ultraviolet rays for 1 second using a 365 nm LED lamp (manufactured by AcroEdge Co., Ltd.) at 40° C. under oxygen-containing air (oxygen concentration: about 20% by volume) (corresponding to the step 3B). At this time, the maximum value of the in-plane irradiation amount was 11.9 $mJ/cm^2$, and the minimum value of the in-plane irradiation amount was 11.6 $mJ/cm^2$.

Subsequently, the obtained composition layer was heated at 130° C. for 10 seconds (corresponding to the step 4D). The phase transition temperature of the rod-like liquid crystal compound in the composition (D) for forming an optically anisotropic layer to an isotropic phase was 110° C.

Then, the composition layer was irradiated with ultraviolet rays (irradiation amount: 500 $mJ/cm^2$) using a metal halide lamp (manufactured by Eye Graphics Co., Ltd.) at 130° C. in a nitrogen atmosphere to form an optically anisotropic layer in which an alignment state of a liquid crystal compound was fixed (corresponding to the step 5D), whereby an optical film (F) was prepared.

| Composition (E) for forming optically anisotropic layer | |
|---|---|
| Rod-like liquid crystal compound (A) given above | 80 parts by mass |
| Rod-like liquid crystal compound (B) given above | 10 parts by mass |
| Rod-like liquid crystal compound (C) given above | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Polymerizable polymer (X) given above | 0.5 parts by mass |
| Polymer (A) given above | 0.08 parts by mass |
| Methyl isobutyl ketone | 117 parts by mass |
| Ethyl propionate | 39 parts by mass |

The optical film (F) prepared above was cut in parallel with the rubbing direction, and the optically anisotropic layer was observed from the cross-sectional direction with a polarization microscope. The optically anisotropic layer was composed of two layers exhibiting different optical anisotropy, in which the layer on the cellulose acylate film side (first layer) in the optically anisotropic layer was a layer having a thickness (d1) of 1,100 nm and formed by fixing a liquid crystal compound homogeneously aligned, and the layer on the air side (second layer) in the optically anisotropic layer had a thickness (d2) of 1,600 nm, with the liquid crystal compound being in an isotropic state (isotropic phase).

The optical properties of the optical film (F) were determined using Axoscan of Axometrics, Inc. and analysis software (Multi-Layer Analysis) of Axometrics, Inc. The first layer had a product (Δn1d1) of Δn1 at a wavelength of 550 nm and a thickness d1 of 140 nm, and an in-plane slow axis of −45°. In addition, the second layer had a product (Δn2d2) (in-plane retardation at a wavelength of 550 nm) of Δn2 at a wavelength of 550 nm and a thickness d2 of 0 nm, and a thickness direction retardation of 0 nm at a wavelength of 550 nm.

The angle of the in-plane slow axis is expressed as negative in a case where it is clockwise (right-handed turning) and positive in a case where it is counterclockwise (left-handed turning) with the longitudinal direction of the film as a reference of 0°, upon observing the substrate from the surface side of the optically anisotropic layer.

(Preparation of Circularly Polarizing Plate)

The above prepared polarizer protective film was bonded to one side of the above prepared polarizer with a polyvinyl alcohol-based adhesive to prepare a laminate including a polarizer and a polarizer protective film disposed on one side of the polarizer.

A pressure sensitive adhesive (SK-2057, manufactured by Soken Chemical & Engineering Co., Ltd.) was applied to the polarizer side (side with no polarizer protective film) in the above prepared laminate to form a pressure sensitive adhesive layer, and the above prepared optical film (F) was bonded thereto such that the pressure sensitive adhesive layer and the cellulose acylate film were in close contact with each other. The angle formed by the absorption axis of the polarizer and the in-plane slow axis of the optically anisotropic layer in the optical film (F) was 45°.

Next, a pressure sensitive adhesive was applied onto the optical film (F) in the obtained laminate to form a pressure sensitive adhesive layer.

An elongated circularly polarizing plate (F) in which a polarizer protective film, a polarizer, a cellulose acylate film, an optically anisotropic layer, and a pressure sensitive adhesive layer were disposed in this order was prepared by the above procedure.

Comparative Example 1

(Formation of Optically Anisotropic Layer)

The cellulose acylate film prepared above was continuously subjected to a rubbing treatment. At this time, the longitudinal direction and the transport direction of the elongated film were parallel, and the angle formed by the film longitudinal direction (transport direction) and the rubbing roller rotation axis was 72°. The rotation axis of the rubbing roller was 18° in a case where the longitudinal direction (transport direction) of the film was defined as 90°, and the counterclockwise direction was represented by a positive value with reference to the width direction of the cellulose acylate film (0°), upon observing the film from the cellulose acylate film side. In other words, the position of the rotation axis of the rubbing roller was a position rotated by 72° clockwise with reference to the longitudinal direction of the cellulose acylate film.

Using the rubbing-treated cellulose acylate film as a substrate, a composition (F) for forming an optically anisotropic layer containing a rod-like liquid crystal compound having the following composition was applied using a geeser coating machine to form a composition layer.

Next, the obtained composition layer was heated at 100° C. for 80 seconds.

Thereafter, the composition layer was irradiated (irradiation amount: 500 mJ/$cm^2$) with light from a metal halide lamp (manufactured by Eye Graphics Co., Ltd.) at 55° C. in a nitrogen atmosphere to immobilize the liquid crystal compound to form an optically anisotropic layer.

Then, a composition (G) for forming an optically anisotropic layer containing a rod-like liquid crystal compound having the following composition was applied onto the optically anisotropic layer prepared above using a geeser coating machine to form a composition layer.

Next, the obtained composition layer was heated at 100° C. for 80 seconds.

Then, the composition layer was irradiated (irradiation amount: 500 mJ/$cm^2$) with light from a metal halide lamp (manufactured by Eye Graphics Co., Ltd.) at 55° C. in a nitrogen atmosphere to immobilize the liquid crystal compound to form an optically anisotropic layer, resulting in the preparation of an optical film (G).

| Composition (F) for forming optically anisotropic layer | |
|---|---|
| Rod-like liquid crystal compound (A) given above | 80 parts by mass |
| Rod-like liquid crystal compound (B) given above | 10 parts by mass |
| Rod-like liquid crystal compound (C) given above | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Polymerizable polymer (X) given above | 0.5 parts by mass |
| Methyl isobutyl ketone | 117 parts by mass |
| Ethyl propionate | 39 parts by mass |

| Composition (G) for forming optically anisotropic layer | |
|---|---|
| Rod-like liquid crystal compound (A) given above | 80 parts by mass |
| Rod-like liquid crystal compound (B) given above | 10 parts by mass |
| Rod-like liquid crystal compound (C) given above | 10 parts by mass |
| Ethylene oxide-modified trimethylolpropane triacrylate (V# 360, manufactured by Osaka Organic Chemical Industry Ltd.) | 4 parts by mass |
| Photopolymerization initiator (IRGACURE 819, manufactured by BASF Japan Ltd.) | 3 parts by mass |
| Chiral agent (A) given above | 0.6 parts by mass |
| Polymer (A) given above | 0.08 parts by mass |
| Methyl ethyl ketone | 156 parts by mass |

The optical film (G) prepared above was cut in parallel with the rubbing direction, and the optically anisotropic layer was observed from the cross-sectional direction with a polarization microscope. The optically anisotropic layer was composed of two layers exhibiting different optical anisotropy, in which the layer on the cellulose acylate film side (first layer) in the optically anisotropic layer was a layer having a thickness (d1) of 1,310 nm and formed by fixing a liquid crystal compound homogeneously aligned, and the layer on the air side (second layer) in the optically anisotropic layer was a layer having a thickness (d2) of 1,390 nm and formed by fixing a liquid crystal compound twist-aligned with a thickness direction as a helical axis.

The optical properties of the optical film (A) were determined using Axoscan of Axometrics, Inc. and analysis software (Multi-Layer Analysis) of Axometrics, Inc. In the first layer, the product ($\Delta n1d1$) of $\Delta n1$ at a wavelength of 550 nm and a thickness d1 was 173 nm, the twisted angle of the liquid crystal compound was 0°, and the alignment axial angle of the liquid crystal compound with respect to the longitudinal direction of the film was −10° on the side in contact with the substrate and −10° on the side in contact with the second layer.

In addition, in the second layer, the product ($\Delta n2d2$) of $\Delta n2$ at a wavelength of 550 nm and a thickness d2 was 184 nm, the twisted angle of the liquid crystal compound was 75°, and the alignment axial angle of the liquid crystal compound with respect to the longitudinal direction of the film was −10° on the side in contact with the first layer and −85° on the air side.

The alignment axial angle of the liquid crystal compound contained in the optically anisotropic layer is expressed as negative in a case where it is clockwise (right-handed turning) and positive in a case where it is counterclockwise (left-handed turning) with the longitudinal direction of the film as a reference of 0°, upon observing the substrate from the surface side of the optically anisotropic layer.

In addition, the twisted structure of the liquid crystal compound here is expressed as negative in a case where the alignment direction of the liquid crystal compound on the substrate side (back side) is clockwise (right-handed turning) and positive in a case where it is counterclockwise (left-handed turning) with reference to the alignment direction of the liquid crystal compound on the surface side (front side), upon observing the substrate from the surface side of the optically anisotropic layer.

(Preparation of Circularly Polarizing Plate)

A circularly polarizing plate (G) was prepared in the same manner as in Example 1, except that the optical film (G) was used instead of the optical film (A).

Comparative Example 2

An optical film (H) and a circularly polarizing plate (H) were prepared in the same manner as in Example 1, except that the output was adjusted so that the maximum value of the in-plane irradiation amount was 13.7 mJ/cm$^2$ and the minimum value of the in-plane irradiation amount was 12.4 mJ/cm$^2$ in a case of irradiation with light from a 365 nm LED lamp (manufactured by AcroEdge Co., Ltd.).

A: No unevenness is visible (acceptable)

B: Although unevenness is visible, it is very slight (acceptable).

C: Unevenness is visible, which is unacceptable.

(Evaluation of Visibility of Unevenness Under Diffuse Light Source (Evaluation of Reflection))

The prepared optical film (E) was placed under a diffuse light source, and the visibility of the reflected color unevenness was evaluated.

A: No unevenness is visible (acceptable)

B: Although unevenness is visible, it is very slight (acceptable).

C: Unevenness is visible, which is unacceptable.

In Table 1, the "Homogeneous" means that a liquid crystal compound is homogeneously aligned. The "Twisted" means that a liquid crystal compound is twist-aligned along a helical axis extending along a thickness direction. The "Homeotropic" means that a liquid crystal compound is homeotropically aligned. The "Cholesteric" means that a liquid crystal compound is cholesterically aligned. The "Isotropic phase" means that a liquid crystal compound is in a state of exhibiting an isotropic phase.

TABLE 1

| | Alignment state | | | Irradiation amount | | | X | | | Visibility of unevenness | |
|---|---|---|---|---|---|---|---|---|---|---|---|
| | First layer | Second layer | Number of applications | In-plane maximum [mJ/cm$^2$] | In-plane minimum [mJ/cm$^2$] | Maximum/minimum | Xmax | Xmin | Xmax/Xmin | Evaluation of OLED mounting | Evaluation of reflection |
| Example 1 | Homogeneous | Twisted | Once | 13.2 | 12.9 | 1.03 | 0.495 | 0.475 | 1.04 | A | — |
| Example 2 | Homogeneous | Twisted | Once | 13.3 | 12.7 | 1.05 | 0.505 | 0.465 | 1.09 | B | — |
| Example 3 | Twisted | Twisted | Once | 16.2 | 15.8 | 1.03 | 0.678 | 0.654 | 1.04 | A | — |
| Example 4 | Homogeneous | Homeotropic | Once | 16.8 | 16.3 | 1.03 | 0.713 | 0.687 | 1.04 | A | — |
| Example 5 | Cholesteric | Cholesteric | Once | 13.4 | 13.1 | 1.03 | 0.510 | 0.490 | 1.04 | — | A |
| Example 6 | Homogeneous | Isotropic phase | Once | 11.9 | 11.6 | 1.03 | 0.416 | 0.398 | 1.04 | A | — |
| Comparative Example 1 | Homogeneous | Twisted | Twice | — | — | — | 0.530 | 0.430 | 1.23 | C | — |
| Comparative Example 2 | Homogeneous | Twisted | Once | 13.7 | 12.4 | 1.11 | 0.544 | 0.463 | 1.17 | C | — |

<Evaluation>

(Measurement of Thickness Unevenness of Optically Anisotropic Layer)

According to the procedure described above, in each of the sub-regions of 64 squares obtained by equally dividing a maximum square that can be taken on the surface of the optically anisotropic layer in the prepared optical films (A) to (H) into 8 vertically and horizontally, the optically anisotropic layer was cut parallel to the rubbing direction through the center of the sub-region, the thickness d1 of the first layer and the thickness d2 of the second layer were measured from the exposed cross section, and then a maximum value of a ratio X (=d1/(d1+d2)) of thickness d1 to total layer thickness (d1+d2) (Xmax), a minimum value of X (Xmin), and a ratio of Xmax to Xmin (Xmax/Xmin) were calculated.

(Evaluation of Visibility of Unevenness in OLED Mounting Form (Evaluation of OLED Mounting))

The OLED55B8PJA (manufactured by LG Electronics Co., Ltd.) equipped with an organic EL panel (an organic EL display element) was disassembled, a touch panel with a circularly polarizing plate was peeled off from the organic EL display device, and each of the circularly polarizing plates (A) to (D) and (F) to (H) prepared above was bonded to the display device so as not to allow air to enter, whereby an organic EL display device was prepared. Then, the visibility of tint unevenness was evaluated.

As shown in the above table, the optically anisotropic layer according to the embodiment of the present invention exhibited a desired effect.

Above all, from a comparison between Example 1 and Example 2, it was confirmed that a more excellent effect was obtained in a case where the relationship of Expression (2B) was satisfied.

EXPLANATION OF REFERENCES

10, 100, 200, 300, 400, 500, 600: optically anisotropic layer
12, 102, 200A, 300A, 400A, 500A, 600A: first layer
14, 104, 200B, 300B, 400B, 500B, 600B: second layer
16: sub-region
18: substrate
22: another optically anisotropic layer
24: laminate
26: polarizer
28: optically anisotropic layer with a polarizer
202, 302, 402, 502, 602: composition layer
202A, 302A, 402A, 502A, 602A: lower region
202B, 302B, 402B, 502B, 602B: upper region

What is claimed is:

1. An optically anisotropic layer formed of a liquid crystal compound, wherein the optically anisotropic layer has a first layer and a second layer in direct contact with the first layer along a thickness direction, an alignment state of the liquid crystal compound in the first layer is different from an alignment state of the liquid crystal compound in the second layer, the first layer is a layer formed by fixing an alignment state of the liquid crystal compound homogeneously aligned, the second layer is a layer formed by fixing an alignment state of the liquid crystal compound homeotropically aligned, and the optically anisotropic layer satisfies a relationship of Expression (2A) in a case where a region within a square having a largest size that can be drawn on a surface of the optically anisotropic layer is subdivided into 64 square-shaped sub-regions having the same area, a thickness d1 of the first layer and a thickness d2 of the second layer at a center position of the sub-region are obtained, X represented by Expression (1) for each sub-region is calculated, and among the calculated 64 X's, a maximum value is defined as Xmax and a minimum value is defined as Xmin, $$X=d1/(d1+d2) \quad \text{Expression (1)}$$

$$Xmax/Xmin<1.10. \quad \text{Expression (2A)}$$

2. The optically anisotropic layer according to claim 1, wherein the optically anisotropic layer satisfies a relationship of Expression (2B), $$Xmax/Xmin<1.09. \quad \text{Expression (2B)}$$

3. The optically anisotropic layer according to claim 1, wherein the ratio of the thicknesses of the first layer to the thicknesses of the second layer (thickness of the first layer/thickness of the second layer) is 0.1 to 5.0.

4. The optically anisotropic layer according to claim 1, wherein in a case where the thickness of the first layer is defined as d1 and the in-plane refractive index anisotropy of the first layer measured at a wavelength of 550 nm is defined as Δn1, the first layer satisfies Expression (1C-1), $$100\ \text{nm} \le \Delta n1d1 \le 180\ \text{nm}. \quad \text{Expression (1C-1)}$$

5. The optically anisotropic layer according to claim 1, wherein the thickness direction retardation of the second layer at a wavelength of 550 nm is −150 to −20 nm.

6. The optically anisotropic layer according to claim 1, wherein the optically anisotropic layer exhibits reverse wavelength dispersibility.

7. A circularly polarizing plate comprising the optically anisotropic layer according to claim 1.

8. An image display apparatus comprising the optically anisotropic layer according to claim 1.

* * * * *